US009574697B1

(12) United States Patent
Wisehart

(10) Patent No.: US 9,574,697 B1
(45) Date of Patent: Feb. 21, 2017

(54) PIPE MACHINING APPARATUSES AND METHODS

(71) Applicant: Chris Wisehart, Mooreland (IN)

(72) Inventor: Chris Wisehart, Mooreland (IN)

(*) Notice: Subject to any disclaimer, the term of this patent is extended or adjusted under 35 U.S.C. 154(b) by 469 days.

(21) Appl. No.: 13/773,046

(22) Filed: Feb. 21, 2013

Related U.S. Application Data

(60) Provisional application No. 61/601,381, filed on Feb. 21, 2012.

(51) Int. Cl.
B29D 23/00 (2006.01)
F16L 55/18 (2006.01)
(Continued)

(52) U.S. Cl.
CPC .............. F16L 55/18 (2013.01); B23C 3/122 (2013.01); B23C 9/00 (2013.01)

(58) Field of Classification Search
CPC ... F16L 55/18; B23B 5/16; B23B 5/48; B23B 5/161; B23B 5/162; B23B 5/163; B23B 2226/61; B23B 2260/0725; B23B 2270/20; B23B 2270/22; B23C 7/007; B23C 1/005; B23C 1/20; B23C 3/02; B23C 3/12; B23C 3/122; B23C 3/124; B23C 9/00; B23C 2220/36; E21B 29/00; E21B 29/002; E21B 29/007; E21B 29/08; B23P 15/34;
(Continued)

(56) References Cited

U.S. PATENT DOCUMENTS 738,503 A 9/1903 Waters
1,985,541 A * 12/1934 Hoefer .................. B23D 21/04
30/97
(Continued)

FOREIGN PATENT DOCUMENTS

WO 8501094 3/1985
WO 9721953 6/1997
(Continued)

OTHER PUBLICATIONS

Baldor VS1 MD AC Microdrive Installation and Operating Manual, pp. 1-204, Oct. 2010.
(Continued)

Primary Examiner — David Bryant
Assistant Examiner — Steven A Maynard
(74) Attorney, Agent, or Firm — John V. Daniluck; Bingham Greenebaum Doll LLP

(57) ABSTRACT

Pipe machining apparatuses and methods are disclosed. Embodiments include placing a clamp around a plastic pipe and attaching a cutting tool to the clamp, the cutting tool moving around the clamp and around the pipe as the cutting tool shapes the pipe end by removing portions of the pipe end. Further embodiments include forming a male portion of a snap coupling on one pipe and forming a female portion of a snap coupling on another pipe and pressing the two coupling portions together until the two pipes associated with the coupling portions snap together. Still further embodiments include rotating the pipe as the cutting tool travels around the pipe. Additional embodiments include an adjustment mechanism that adjusts the radial and/or axial location of the cutting head with respect to the clamp and with respect to the pipe.

11 Claims, 31 Drawing Sheets

(51) Int. Cl.
*B23C 3/12* (2006.01)
*B23C 9/00* (2006.01)

(58) Field of Classification Search
CPC ..... B23P 15/40; B23Q 9/0021; B23Q 9/0035; B23Q 9/0057; B23G 1/22; Y10T 29/49995; Y10T 82/20; Y10T 82/22; Y10T 408/36; Y10T 408/90473; Y10T 409/300672; Y10T 409/304424; Y10T 409/306384; Y10T 409/30644
See application file for complete search history.

(56) References Cited

U.S. PATENT DOCUMENTS

| | | | |
|---|---|---|---|
| 3,243,206 A | 3/1966 | Samer | |
| 3,594,023 A | 7/1971 | Yano | |
| 3,784,235 A | 1/1974 | Kessler et al. | |
| 3,984,007 A | 10/1976 | Birdwell | |
| 4,130,034 A * | 12/1978 | Benoit | B23B 5/163 82/113 |
| 4,318,391 A | 3/1982 | Wachs et al. | |
| 4,402,136 A * | 9/1983 | Rast | B23D 21/08 30/101 |
| 4,428,604 A | 1/1984 | Conner | |
| 4,456,288 A | 6/1984 | Conner | |
| 4,490,909 A * | 1/1985 | Wachs | B23D 21/04 266/56 |
| 4,543,861 A | 10/1985 | Kwech et al. | |
| 4,655,108 A | 4/1987 | Galos | |
| 4,677,884 A | 7/1987 | Kwech et al. | |
| 4,762,038 A | 8/1988 | Olson | |
| 4,779,902 A | 10/1988 | Lee | |
| 4,791,842 A * | 12/1988 | Olson | B23D 21/04 403/330 |
| 4,813,314 A * | 3/1989 | Kwech | B23B 5/163 30/97 |
| 4,863,199 A | 9/1989 | Hojo et al. | |
| 4,875,714 A | 10/1989 | Lee | |
| 4,939,964 A * | 7/1990 | Ricci | B23B 5/168 30/97 |
| 5,015,014 A | 5/1991 | Sweeney | |
| 5,054,342 A | 10/1991 | Swiatowy et al. | |
| 5,662,360 A | 9/1997 | Guzowski | |
| 5,669,284 A | 9/1997 | Fish | |
| 5,921,591 A | 7/1999 | Argent | |
| 6,263,747 B1 | 7/2001 | Carson et al. | |
| 6,409,221 B1 | 6/2002 | Robinson | |
| 6,520,547 B2 | 2/2003 | Robinson | |
| 6,938,313 B2 * | 9/2005 | Viola | B23B 31/202 29/27 C |
| 7,011,345 B2 | 3/2006 | Foos | |
| 2010/0059995 A1 | 3/2010 | Ciprich et al. | |

FOREIGN PATENT DOCUMENTS

| | | |
|---|---|---|
| WO | 2004113777 | 12/2004 |
| WO | 2005106311 | 11/2005 |

OTHER PUBLICATIONS

E.H. Wachs Trav-L-Cutter Model E (Pneumatic), Model HE (Hydraulic) brochure available at http://www.ehwachs.com/Industrial-Products/productcategory/102i-Trav-L-Cutter-69/107i-Trav-L-Cutter-43/Trav-L-Cutter-Model-E-Air-Kit-124.html, last accessed Feb. 21, 2013; actual publication date unknown.
E.H. Wachs Trav-L-Cutter Model E & HE Standard & Atmospheric 02-000-01, -02, -03, -04 User's Manual, Revised May, 2010, pp. 1-56.
ISCO 2009 SnapTite Design Guide, p. 1-45, 2009.
ISCO SnapTite Sales Sheet, p. 1-2. Publication date unkown. Document downloaded Jun. 29, 2010.

* cited by examiner

Leave clearance
O.D. cut if required

PIPE MACHINING APPARATUSES AND METHODS

This application claims the benefit of U.S. Provisional Application No. 61/601,381, filed Feb. 21, 2012, the entirety of which is hereby incorporated herein by reference.

FIELD

Various embodiments of the present invention pertain to apparatuses and methods for machining large cylindrical structures, and some embodiments pertain to various portable apparatus for machining pipe in the field.

BACKGROUND

Pipes, such as those situated underground, can deteriorate over time. Replacing the pipe can be difficult, especially if structures, such as buildings or roadways, have been built above or around the deteriorating pipe. One solution is to reline the pipe by installing another pipe within the deteriorating pipe.

SUMMARY

Embodiments of the present disclosure provide improved pipe machining, cutting, and/or forming apparatuses and methods.

Further embodiments include pipe machining apparatuses and methods that utilize cutting heads that travel around a clamp attached to the pipe.

Still further embodiments include pipe machining apparatuses and methods whose cutting heads that connect directly to a pipe and travel around the pipe without the need for a clamp.

Further embodiments include pipe machining apparatuses and methods that can form a pipe end into either a male and female coupling. After forming a female end on one pipe and a complimentary male end on the other pipe, the pipes may be coupled by inserting the male fitting into the female fitting until the fittings lock together. In some embodiments, this fitting provides pushing surfaces that are perpendicular to the pipe axis and create an ability for one pipe to push a second pipe to which the one pipe is coupled (and any additional pipes to which the second pipe is coupled) along a friction surface (such as the inside of a deteriorating pipe being lined) without the fittings moving beyond the coupling position. In some embodiments, these pushing surfaces are equal to one-half (½) of the pipe thickness, while in still further embodiments these pushing surfaces are equal to approximately three-quarters (¾) the pipe thickness. Still further embodiments include pushing surfaces that are perpendicular to the pipe axis and create an ability for one pipe to pull a second pipe to which the one pipe is coupled (and any additional pipes to which the second pipe is coupled) along a friction surface (such as the inside of a deteriorating pipe being lined) without the fittings uncoupling from one another.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein is not necessarily intended to address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

FIG. 1-1. The photo shows the major components of the end prep cutting device.

FIG. 1-2. Hand wheel drives allow you to position the tool head axially and radially.

FIG. 1-3. The manual drive screws have adjustable stop collars to set end stop positions. Loosen the screw in the collar, move it to the desired position, and retighten the screw.

FIG. 1-4. The clamping/tracking rings fit on the pipe to hold the cutting device and guide it as it travels around the pipe. Each ring is custom sized for the pipe it mounts on.

FIG. 1-5. The clamping rings are hinged on one side and held together with swing latches on the opposite side. Loosen the swing latches to open the clamping ring for mounting on the pipe.

FIG. 1-8. The machine operates in both directions. It will rotate clockwise for an O.D. (OUTSIDE) cut. It will rotate counter-clockwise for an I.D. (INSIDE) cut.

FIG. 1-9. The tool head is custom made for the cutting profile required. It consists of a body with spindle shaft and replaceable cutting inserts.

FIG. 3-1. Swing the latch bolts out to open the clamping/tracking ring.

FIG. 3-2. Open the clamping/tracking ring.

FIG. 3-3. Mount the ring close to the end of the pipe. Leave enough clearance between the ring and the pipe end for any required O.D. cut.

FIG. 3-4. Close the swing latch bolts.

FIG. 3-5. Turn the axial feed hand wheel to extend the axial drive all the way out.

FIG. 3-6. Position the V rollers on the tracking rails.

FIG. 3-7. Loosen the chain tension screw on the drive carriage.

FIG. 3-8. The drawing shows the bottom of the drive carriage. Wrap the travel chain beneath the rollers and up into the carriage.

FIG. 3-9. After wrapping the chain under the rollers, wrap it over the top of the sprocket on each side.

FIG. 3-10. Tighten the chain tension screw to tension the travel chain.

FIG. 3-11. Install the inserts on the tool head, and put the key in the keyway of the shaft.

FIG. 3-12. Insert the spindle shaft into the spindle, and tighten the drawbar nut to secure the tool head.

FIG. 3-13. Connect the power cables to the motors.

FIG. 3-14. Turn the radial hand wheel to position the tool head for either an O.D. cut or an I.D. cut.

FIG. 3-15. Use the axial hand wheel to move the tool head into position for the cut.

FIG. 3-16. Move the stop collars to both ends of the feed screw to hold the axial position.

FIG. 3-20. Turn the radial hand wheel to feed the tool to the required cutting depth.

FIG. 4-1. Set the spindle drive belt tension using the belt tension screw.

DETAILED DESCRIPTION OF THE ILLUSTRATED EMBODIMENTS

Figure 1:
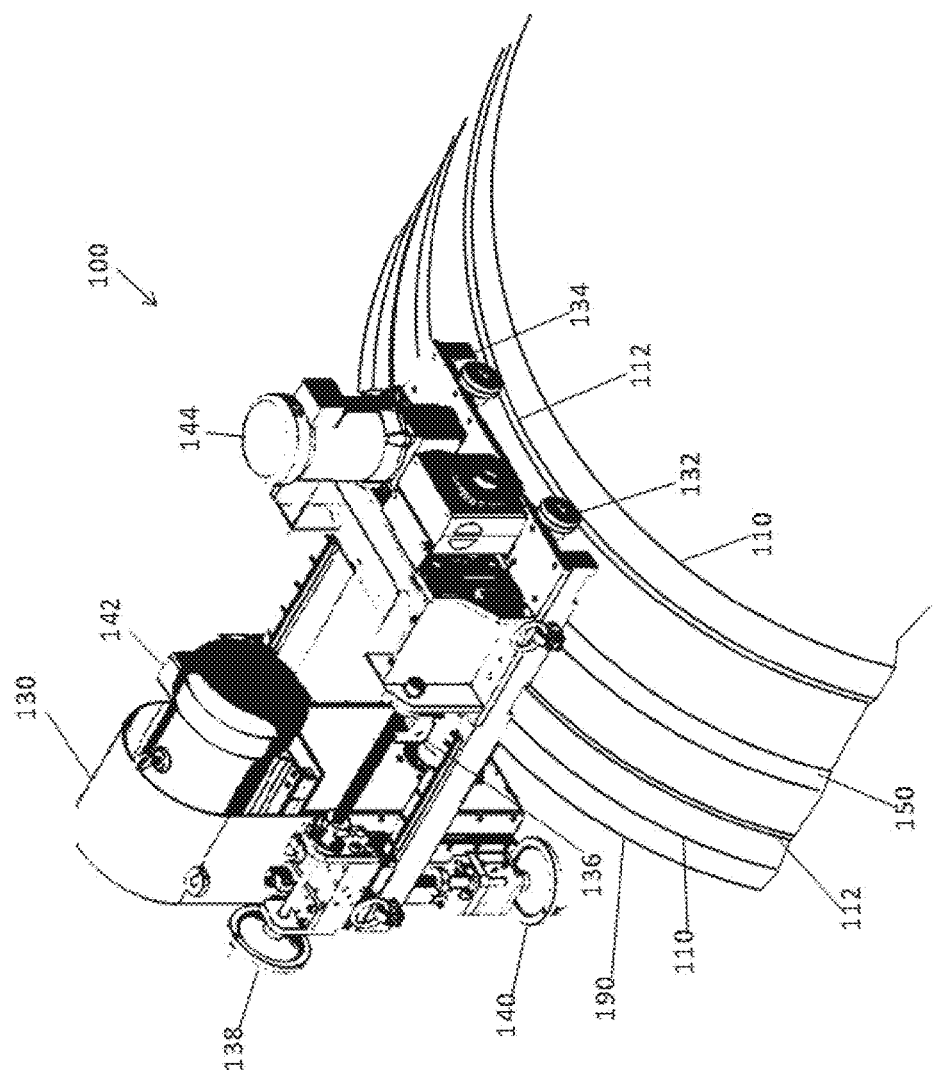
FIG. 1 is a perspective view of a pipe cutter mounted to a pipe according to one embodiment of the present disclosure.

For the purposes of promoting an understanding of the principles of the disclosure, reference will now be made to one or more embodiments illustrated in the drawings and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to "advantages" provided by some embodiments, other embodiments may not include those same advantages, or may include different advantages. Any advantages described herein are not to be construed as limiting to any of the claims.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Depicted in FIGS. 1-7 is a pipe cutter 100 according to one embodiment of the present disclosure. Pipe cutter 100 includes a clamp 110 and a cutting device 130. Clamp 110 securely mounts to the pipe that is being cut (pipe 190) and guides cutting device 130 as it travels radially around pipe 190. Although clamp 110 is depicted as connecting to the outer surface of 190, alternate embodiments provide a track that contacts the inner surface of pipe 190 and allows the cutting device 130 to move along the inner surface of pipe 190.

Clamp 110 can include two semicircular halves that are hinged to one another, and the non-hinged end of the each semicircular half may be connected to one another with a clamping mechanism that allows for secure attachment of clamp 110 to pipe 190. Clamp may be constructed of a sturdy material, such as sheet metal, to provide additional support to pipe 190 when clamp 110 is attached. Using a rigid clamp 110 can provide additional support to pipe 190, which may have particular benefits in situations where pipe 190 is manufacture from soft material, such as most plastics, and could otherwise bend while being shaped. Still other embodiments include alternate forms of clamp 110 that facilitate easy installation and removal of clamp 110 from pipe 190, such as clamps with more than two curved portions, or flexible clamps such as those manufacture from belt or chain type material.

In the illustrated embodiment, clamp 110 also includes optional guides 112 that maintain the location of cutting device 130 along the axis of pipe 190 as cutting device 130 rotates radially around pipe 190. In the illustrated embodiment guides 112 are raised sections that are received by guide rollers 132 on cutting device 130—the guide rollers 132 including complimentary grooves that receive guides 112. Alternate embodiments include other forms of guides, such as channels.

Cutting device 130 also includes a clamp connector 134 and a cutting head 136 (sometimes referred to as a milling head). Clamp connector 134 connects cutting device 130 to clamp 110, and cutting head 136 removes portions of pipe 190. Cutting device 130 may also include an axial adjustment 138 (sometimes referred to as a horizontal adjustment) and a radial adjustment 140 (sometimes referred to as a vertical adjustment) that moves cutting head 136 relative to connector 134 in the direction of the pipe's axis or in the direction of the pipe's radius, respectively.

Figure 6:
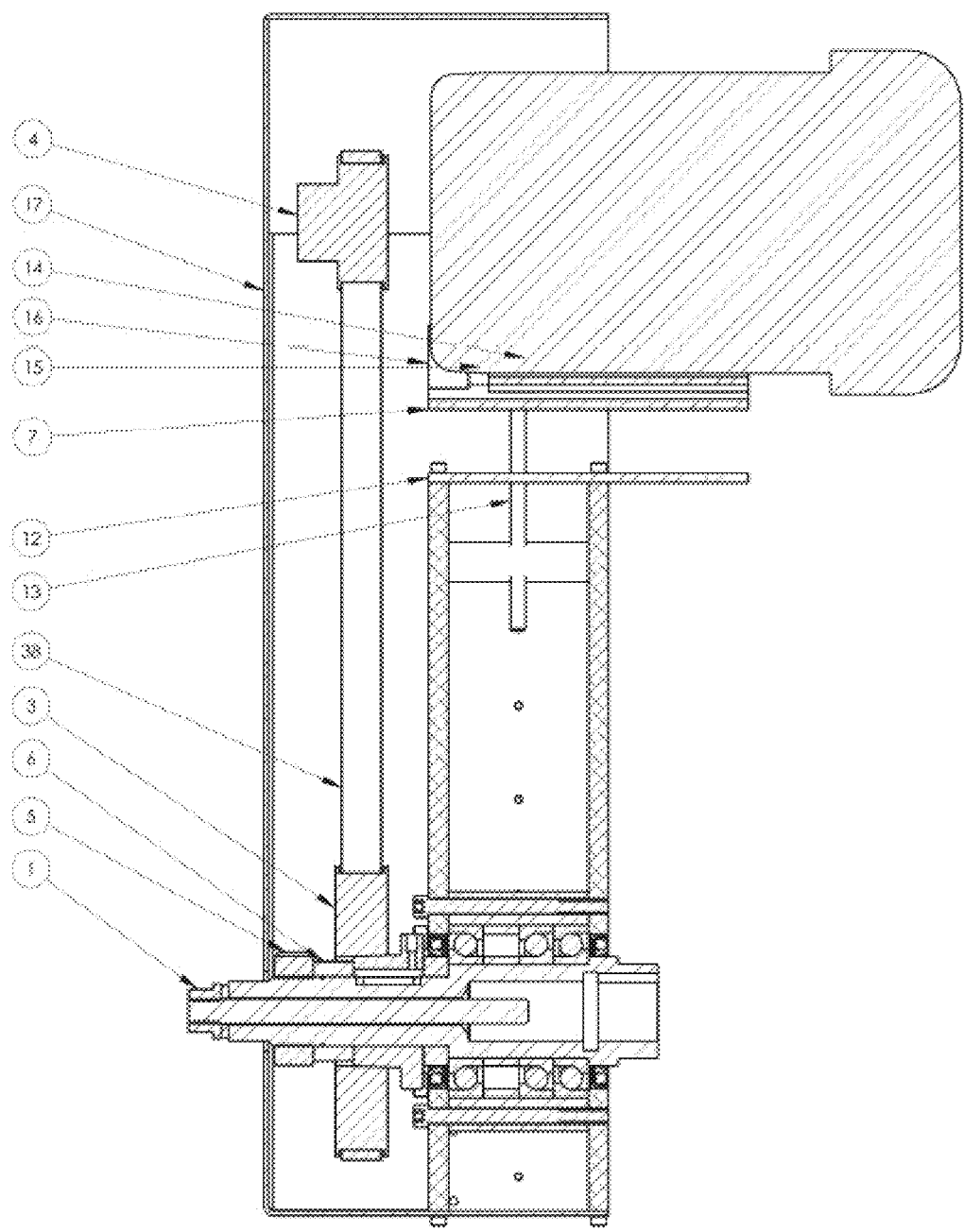
FIG. 6 is a sectional view of the cutting device portion depicted in FIG. 5.

Pipe cutter 100 also includes one or more motors for operating the cutting head 136 to remove portions of pipe 190 and moving cutting device 130 along clamp 110. Two separate motors (cutting tool motor 142 and travel motor 144) are depicted as being mounted to cutting device 130, although alternate embodiments include a single motor for both rotating cutting head 136 and moving cutting device 130 relative to clamp 110. FIG. 6 depicts the drive belt powered by cutting tool motor 142, which turns the cutting head 136 attachment mechanism and, as a result, turn the cutting head 136.

Also depicted in FIGS. 1-7 is a belt 150 that may be used in some embodiments to securely hold cutting device 130 to clamp 110 and allowing cutting device 130 to move along clamp 110. In the illustrated embodiment, belt 150 is constructed of metal links (and may be referred to as a chain), although in alternative embodiments belt 150 may be constructed of other types of materials that provide sufficient tensile strength to hold cutting device 130 to clamp 110, for example, various types of cables or cords that may or may not be coated with additional protective material such as those found in various types of engine and/or drive belts.

In use, clamp 110 is attached to pipe 190 with sufficient pressure to inhibit clamp 110 from moving with respect to pipe 190 as the cutting device 130 moves around clamp 110 (and, therefore pipe 190) and removes portions of pipe 190.

Figure 2:
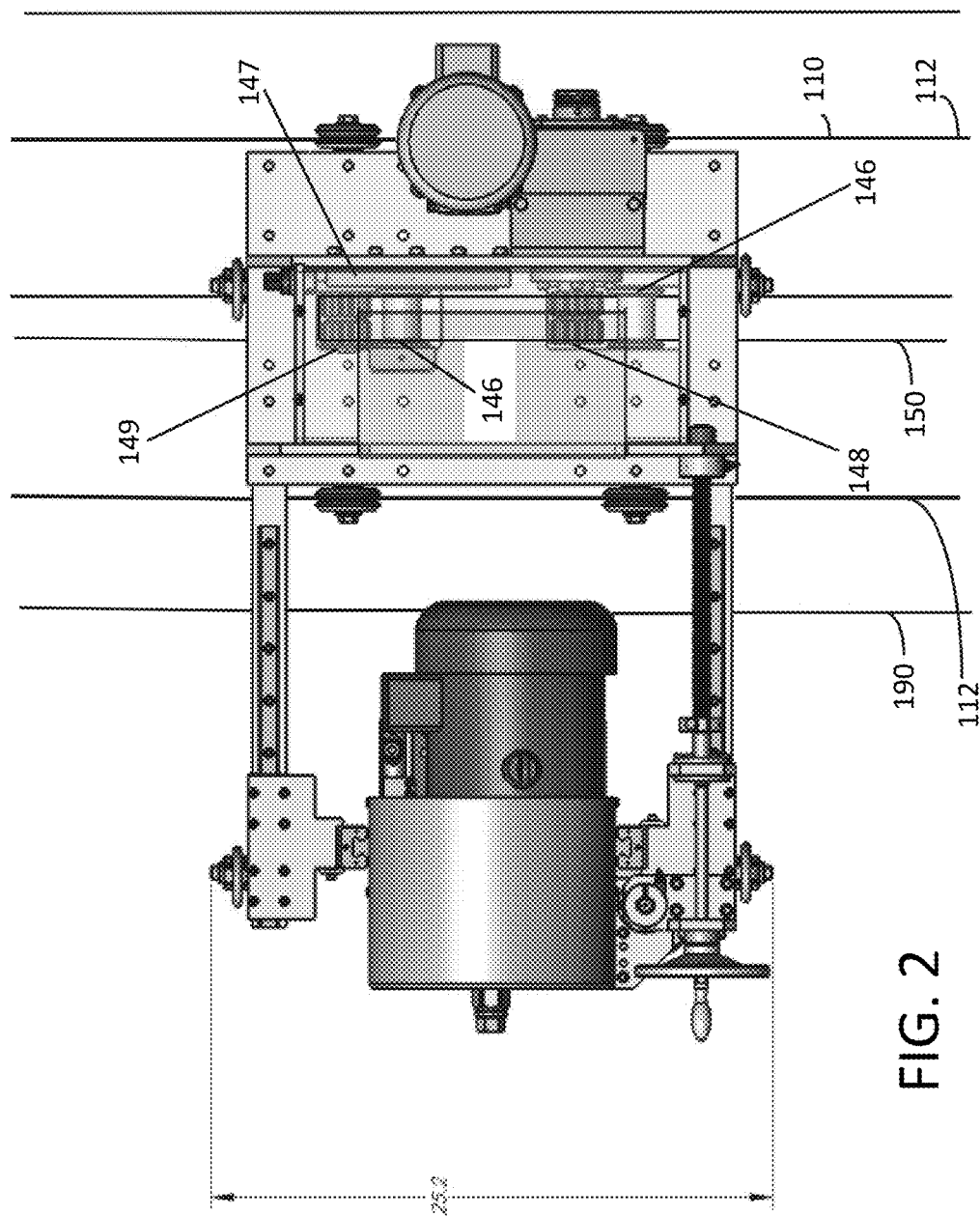
FIG. 2 is a top plan view of the pipe cutter depicted in FIG. 1.

The guide rollers 132 of cutting device 130 are registered with the corresponding guides 112 on clamp 110 and belt 150 is placed around clamp 110 and attached to cutting device 130. As an example of the connection between belt 150 and cutting device 130, belt 150 may be registered with drive gear 148 and tension sprocket 149 of cutting device 130 as depicted in FIG. 2. Belt 150 may also be fed around two rollers 146 (see FIG. 2). Tension sprocket 149 may be moved along tension track 147 until belt 150 is taught and holds cutting device 130 securely against clamp 110.

Once cutting device 130 is securely connected to clamp 110, an operator can move the axial adjustment 138 and the radial adjustment 140 to position cutting head 136 in an appropriate location to remove material from pipe 190. Cutting head 136 may be rotated while being positioned against pipe 190. Cutting head 136 is rotated about its axis 137 to remove material from pipe 190. Cutting head 136 is placed in the appropriate position to remove the desired amount of material from pipe 190 and, as cutting head 136 rotates about axis 137, the operator can engage the drive gear 148 and begin moving cutting device 130 along clamp 110 and around pipe 190. As cutting device 130 moves along clamp 110, the rotating cutting head 136 cuts away portions of pipe 190 to form the desired shape.

Depending on the location of cutting head 136 (as positioned using axial adjustment 138 and radial adjustment 140), cutting head 136 can remove material from the outer surface of pipe 190 (thereby forming the male end of a pipe fitting) or removing a portion of the inner surface of pipe 190 (thereby forming a female end of a pipe fitting).

Cutting head 136 may be removed and replaced by another cutting head with a different shape if a different shape is desired.

The shape of cutting head 136 determines the shape of the portion of the pipe shaped by cutting head 136. In at least one embodiment, the cutting head forms a multi-channeled surface. See, e.g., FIG. 3 and FIG. 3-11. In at least one embodiment, the multi-channeled surface is one portion of a snap fitting (also referred to as a snap coupling), wherein two pipe ends formed with complimentary portions of a snap fitting mate with one another and as the two pipes are moved together the force resisting the movement of the two pipes together increases (such as by the inner diameter of the female portion increasing and/or the outer diameter of the male portion decreasing) until the resistance rapidly decreases (or disappears) as the two pipes snap together. In some embodiments, the same cutting head may be used to form the male and female portions, the difference being whether the cutting head is positioned to remove material from the outer surface of the pipe to form a male portion or from the inner surface of the pipe to form a female portion. In other embodiments, one type of cutting head is used to form a male portion and another type of cutting head is used to form a female portion.

In the illustrated embodiment, cutting head 136 is a four-bladed cutting head. In alternate embodiments, cutting head may have more or less than four (4) blades. However, since many embodiments utilize cutting head 136 as a milling device (sometimes referred to as a router), cutting head 136 frequently has no more than eight (8) blades, and frequently has fewer blades than the number of teeth that would be used to cut through a pipe using a planar circular saw blade.

When cutting head is configured as a milling head (typically 16 or less blades), pipe 190 will typically be made of plastic or another type of relatively soft material that allows milling. Metal pipe (for example, steel or ductile iron) is frequently too robust of a material to lend itself to efficient milling.

Cutting device 130 may be attached to and operated on a stationary pipe (e.g., a pipe that does not rotate) with cutting device 130 moving radially around clamp 110 and pipe 190. Alternatively, pipe 190 may be rotated at the same speed that cutting device 130 is moving across the surface of pipe 190 to maintain cutting device 130 in the same radial and/or axial orientation with respect to pipe 190.

In at least one example embodiment, a mechanism to rotate pipe 190 includes a number of rollers supporting the bottom of pipe 190 with the rotational axis of the rollers being oriented parallel to the pipe axis. At least one of the rollers (which in some embodiments resemble wheels) may be powered such that rotation of the powered roller (wheel) rotates pipe 190. In still other embodiments, cutting device 130 may be held stationary (such as by connecting cutting device 130 to a rigid support member using a pole or rope) and allowing the travel motor 144 to rotate pipe 190.

Once pipe 190 has been cut/shaped to the desired configuration, pipe cutter 100 may be removed from pipe 190 by disconnecting belt 150, removing cutting device 130 and belt 150 from clamp 110, and removing clamp 110 from pipe 190. Pipe cutter 100 may then be attached to another pipe and the process repeated to cut and/or shape a second pipe.

At least one advantage realized by securely fastening clamp 110 to pipe 190 is that clamp 110 may serve as a stable reference for cutting device 130 as it travels along clamp 110 and pipe 190. This permits use of a relatively small and portable cutting device that may be easily moved to alternate locations. For example, pipe cutter 100 may easily be disassembled into the cutting device and the clamp 100, loaded on a truck and moved over the roadways to an alternate location without requiring additional expense and/or procedures that would be required when carrying an oversized load. With clamp 110 being securely fastened to pipe 190 and cutting device 130 being securely held to clamp 110, the shape cut by cutting head 136 may be accurately controlled facilitating a uniform profile around the entire circumference of the pipe. Moreover, since clamp 110 and cutting device 130 are mounted to the pipe, imperfections in the pipe's shape are automatically compensated, for example, cutting device 130 will provide a uniform shape on the end of pipe 190 even in situations where pipe 190 is not perfectly round. Moreover, when shaping soft materials such as plastic pipes, clamp 110 reinforces pipe 190 and increases the ability of pipe 190 to resist deformation as cutting head 136 is pressed against pipe 190, facilitating a more uniform shape since the removal of material is consistent around the pipe.

FIGS. 1-1 through 4-10 depict one or more embodiments of the present disclosure.

In FIG. 1-1, manual screw drives with hand wheels are provided for positioning the tool head radially and axially for the cut. Size-specific clamping/tracking rings are provided for each pipe size. These rings hold the HDPE pipe rigid when the machine is mounted, and guide the travel motion for a straight, accurate cut on the pipe end. Each clamping/tracking ring includes a travel chain that is the specific length required for the pipe size.

In FIG. 1-2, hand wheel drives allow you to position the tool/cutting head axially and radially.

Figure 3:
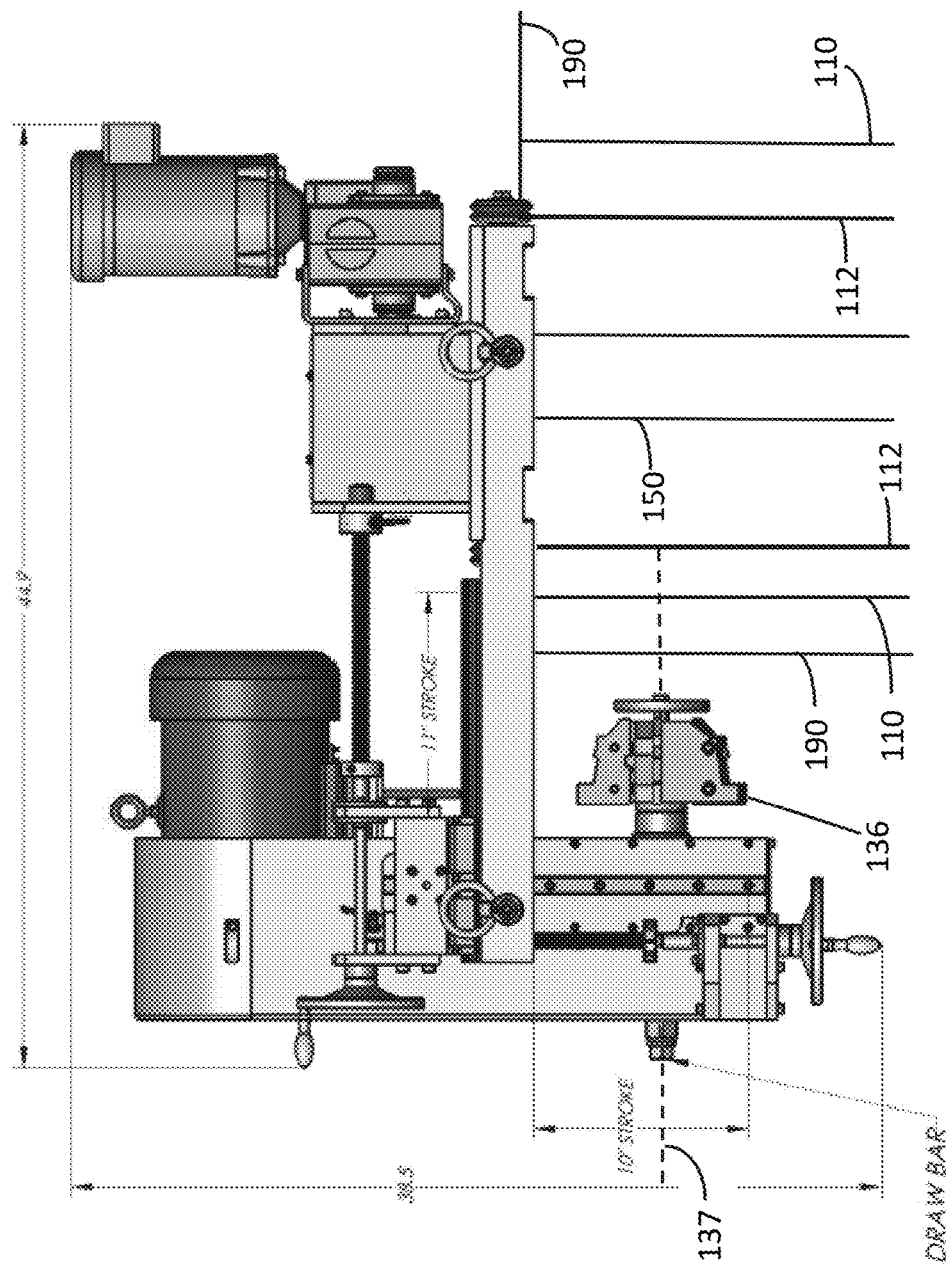
FIG. 3 is a side elevational view of the pipe cutter and pipe depicted in FIG. 1.

In FIG. 1-3, the manual drive screws may have adjustable stop collars to set end stop positions. The user can loosen the screw in the collar, move it to the desired position, and retighten the screw.

In FIG. 1-4, the clamping/tracking rings can fit on the pipe to hold the pipe cutter and guide it as it travels around the pipe. Each ring can be sized for the pipe it mounts on.

In FIG. 1-5, the clamping rings may be hinged on one side and held together with swing latches on the opposite side. A user may loosen the swing latches to open the clamping ring for mounting on the pipe.

In FIG. 1-6, an electric control panel can supply power to the cutting head and travel drives and each drive can have its own servo controller.

In FIG. 1-7, the control buttons on the panel may be used to operate the spindle and feed drives.

In FIG. 1-8, the machine can operate in both directions. It can rotate clockwise for an O.D. (OUTSIDE) cut. It can rotate counter-clockwise for an I.D. (INSIDE) cut.

In FIG. 1-9, the cutting head is made for the cutting profile required. The cutting head consists of a body with spindle shaft and replaceable cutting inserts.

In at least one embodiment, the clamp may be mounted to the pipe as follows:

1. Loosen the swing latch bolts and swing them open. See FIG. 3-1.
2. Open the clamping/tracking ring. See FIG. 3-2.
3. Using a lifting device, lift the clamping/tracking ring into place on the pipe. Position the ring near the end of the pipe. See FIG. 3-3. If you are making an O.D. cut, a user should generally place the ring far enough from the end to avoid contact with the tool head.
4. Close the clamping/tracking ring and swing the latches into place. See FIG. 3-4.
5. Tighten the swing bolts securely to clamp the ring on the pipe.

Important: Remove the tool head from the spindle before mounting the cutting device. The tool head could strike the pipe during mounting, causing damage to the head or other components.

In at least one embodiment, the cutting device may be mounted to the clamp as follows:

1. To mount the cutting device on the top of the pipe, a user can attach a lifting device (such as a winch) to lifting rings on the sides of the cutting device, at least one embodiment having four (4) lifting rings (one on each side).
2. To mount the cutting device on the side of the pipe, attach a lifting device (such as a winch) to the lifting rings on one side of the frame, at least one embodiment having two (2) lifting rings on one side of the cutting device.
3. Turn the axial hand wheel to extend the axial feed and the mount for the cutting head all the way out. This should provide adequate clearance for mounting the cutting head. See FIG. 3-5.
4. Lift the cutting device into place so that the guide rollers (V-rollers) are on the guides (tracking rails) on the clamp (which may be referred to as the clamping/tracking ring in some embodiments). See FIG. 3-6.
5. Loosen the chain (or belt) tension screw on the side of the drive carriage. See FIG. 3-7.
6. Remove the fasteners (e.g., 4 screws) holding the drive carriage guard in place. Remove the guard.
7. Select the correct length chain for the pipe size, and wrap it around the clamping/tracking ring under the drive carriage of the cutting device.
8. Pull the chain ends up into the drive carriage. Wrap the chain beneath the chain rollers and up into the carriage. See FIG. 3-8.
9. Connect the end links of the chain and insert a pin through the links to secure the chain.
10. Tighten the chain tension screw on the side of the drive carriage. See FIG. 3-10.
11. Replace the drive carriage guard. Insert and tighten the fasteners (e.g., 4 screws).
12. Remove the lifting device (e.g., winch) from the cutting device.

In at least one embodiment, the cutting head may be mounted to the cutting device as follows:

1. Assemble the tool inserts on the tool head as required. Put the key in the keyway in the spindle shaft. See FIG. 3-11.
2. Insert the spindle shaft of the tool head into the spindle, with the key aligned with the slot in the spindle. See FIG. 3-12.
3. Turn the drawbar nut to thread the drawbar into the spindle shaft. Hold the tool head and tighten the drawbar nut securely.

In at least one embodiment, the pipe cutter may be connected to the power as follows:

1. Turn the cabinet lock switch on the control panel to the OFF position.
2. Connect the control cabinet to electrical power. See FIG. 3-12.
3. Connect the power output cables from the control cabinet to the motors on the cutting device. (The cables may have different connectors and may not be interchangeable).
4. Position the control cabinet at a convenient location for operating the machine. Note that the power cables may wrap around the pipe during the cutting operation. Make sure the cabinet is close enough to the pipe to provide enough slack in the cables.

In at least one embodiment, the cutting head may be aligned as follows:

1. The user may turn the radial hand wheel to position the tool head. For an O.D. cut, move the tool head all the way past the O.D. of the pipe. For an I.D. cut, move the tool head all the way inside the I.D. of the pipe. See FIG. 3-14.
2. The user may turn the axial hand wheel to position the cutting head so that the cutter will contact the pipe at the required position for the profile being cut. The radial wheel may be used to move the cutting head close to the pipe to align the cutter. If an O.D. cut is being made, mount the clamp far enough back on the pipe so the tool head doesn't contact the clamp. See FIG. 3-15.
3. The user may move the stop collars on the axial feed screw to the ends of the screw and secure them. This inhibits the tool head from drifting during the cut. See FIG. 3-16.

In at least one embodiment, the end of the pipe may be machined as follows:

1. Engage and rotate the cutting head (also referred to as a spindle). In some embodiments, the spindle speed is pre-set, while in other embodiment the spindle speed is adjustable.
2. Turn the radial hand wheel to advance the cutting tool into the pipe surface. The tool will cut the pipe as the cutting tool is fed into the pipe. Feed the tool to the required depth. See FIG. 3-20.
3. Move the stop collars on the radial feed screw to the ends of the screw and secure them. This prevents the tool head from drifting during the cut.
4. Engage the travel drive and begin moving the cutting device along the clamp. In some embodiments the travel drive speed is preset, while in other embodiments it is adjustable.
5. When stopping the spindle, is may be advantageous to stop the movement of the cutting device before stopping the spindle. Operating the feed without spindle rotation can damage the pipe and/or the tool head. Some embodiments include an emergency stop that simultaneously stops cutting device movement and cutting head (spindle) rotation.

6. The cutting device is typically operated through a full rotation to fully form the shape. Overlapping the starting position can help ensure the proper shape is complete.

7. The user may then loosen the radial feed stop collars and use the radial feed wheel to retract the tool head from the surface of the pipe.

8. The user may then loosen the axial feed stop collars and use the axial hand wheel to retract the tool head from the pipe end.

9. If there is a need to perform another operation on the same pipe (for instance, both an O.D. and an I.D. prep), install the new tooling and set up the new position as described earlier.

In at least one embodiment, the pipe cutter may be removed from the pipe as follows:

1. Remove the tool head from the spindle. It may be important to ensure the machine is securely supported before loosening the chain tension screw—the machine could shift on the pipe or fall off, causing serious injury or death.

2. Attach a lifting device (e.g., winch) to the lifting rings on the cutting device frame. Raise the lift to support the weight of the cutting device.

3. Turn the belt tension screw to loosen it until the belt is loose on the clamping/tracking ring.

4. Remove the fasteners (e.g., 4 screws) holding the drive carriage guard in place and remove the guard.

5. Locate the chain link pin and remove it to disconnect the chain. Thread the chain back out of the drive carriage.

6. Lift the cutting device off the pipe and move it to its storage location.

7. Loosen the swing latch bolts on the clamping/tracking ring. Swing the latches out to release the ring.

8. Attach a lifting device to the clamping/tracking ring and lift the clamping/tracking ring off the pipe. Move the ring to its storage location and re-attach the swing latch bolts to hold it together.

Reference systems that may be used herein can refer generally to various directions (e.g., upper, lower, forward and rearward), which are merely offered to assist the reader in understanding the various embodiments of the disclosure and are not to be interpreted as limiting. Other reference systems may be used to describe various embodiments, such as referring to the direction of projectile movement as it exits the firearm as being up, down, rearward or any other direction.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Features of one embodiment may be used in combination with features of other embodiments as would be understood by one of ordinary skill in the art, whether or not explicitly described as such. One or more exemplary embodiments have been shown and described, and all changes and modifications that come within the spirit of the disclosure are desired to be protected.

What is claimed is:

1. A method, comprising:
  milling the end of a plastic pipe to form one half of a coupling that permits the two halves of the coupling to slide against one another and snap together to form a rigid coupling, wherein said milling includes
  attaching a clamp to the plastic pipe,
  attaching a milling tool to the clamp,
  contacting the pipe with the milling tool,
  moving the milling tool around the clamp, and
  forming a multi-channeled surface on the end of the plastic pipe during said moving, the multi-channeled surface including at least two channels of different depth, the shallower channel adjoining the end of the plastic pipe.

2. The method of claim 1, comprising:
  attaching a belt around the outer surface of the clamp,
  attaching the belt to the milling tool,
  adjusting the radial position of the milling tool with respect to the pipe while the milling tool is attached to the pipe,
  adjusting the axial position of the milling tool with respect to the pipe while the milling tool is attached to the pipe, and
  rotating the pipe during said moving.

3. The method of claim 1, comprising:
  adjusting the radial position of the milling tool with respect to the pipe after said attaching a clamp and after said attaching a milling tool.

4. The method of claim 1, comprising:
  adjusting the axial position of the milling tool with respect to the pipe after said attaching a clamp and after said attaching a milling tool.

5. The method of claim 1, comprising:
  rotating the pipe during said moving.

6. The method of claim 1, comprising:
  attaching a belt around the outer surface of the clamp, and attaching the belt to the milling tool.

7. The method of claim 1, comprising:
  milling the end of a second plastic pipe to form the other half of a coupling that permits the two pipe ends to slide against one another and snap together to form a rigid coupling, wherein said milling the end of a second plastic pipe includes
  attaching the clamp to the second plastic pipe,
  attaching a second milling tool to the clamp,
  contacting the second pipe with the second milling tool,
  moving the second milling tool around the clamp, and
  forming a multi-channeled surface on the end of the second plastic pipe during said moving the second milling tool.

8. The method of claim 7, comprising:
  sliding the multi-channeled pipe ends against one another, and
  snapping the two pipes together.

9. The method of claim 1, wherein said forming of the at least two channels occurs simultaneously.

10. The method of claim 1, wherein the deeper channel adjoins the shallower channel.

11. The method of claim 1, wherein:
  the milling tool is adjustable to selectively mill the outer surface or the inner surface of the plastic pipe while the milling tool is attached to the clamp,
  said contacting includes selectively contacting the outer surface or the inner surface of the pipe with the milling tool, and
  said forming includes forming a multi-channeled surface on the selected surface of the plastic pipe and adjacent the end of the plastic pipe during said moving.

* * * * *

UNITED STATES PATENT AND TRADEMARK OFFICE
CERTIFICATE OF CORRECTION

PATENT NO. : 9,574,697 B1
APPLICATION NO. : 13/773046
DATED : February 21, 2017
INVENTOR(S) : Wisehart It is certified that error appears in the above-identified patent and that said Letters Patent is hereby corrected as shown below:

Please delete in its entirety Patent No. 9,574,697 B1 and insert in its entirety Patent No. 9,574,697 B1 as shown on the attached pages.

Signed and Sealed this
Thirty-first Day of October, 2017

Joseph Matal
*Performing the Functions and Duties of the
Under Secretary of Commerce for Intellectual Property and
Director of the United States Patent and Trademark Office*

(12) United States Patent
Wisehart

(10) Patent No.: US 9,574,697 B1
(45) Date of Patent: Feb. 21, 2017

(54) PIPE MACHINING APPARATUSES AND METHODS

(71) Applicant: Chris Wisehart, Mooreland (IN)

(72) Inventor: Chris Wisehart, Mooreland (IN)

(*) Notice: Subject to any disclaimer, the term of this patent is extended or adjusted under 35 U.S.C. 154(b) by 469 days.

(21) Appl. No.: 13/773,046

(22) Filed: Feb. 21, 2013

Related U.S. Application Data

(60) Provisional application No. 61/601,381, filed on Feb. 21, 2012.

(51) Int. Cl.
  *B29D 23/00* (2006.01)
  *F16L 55/18* (2006.01)
  (Continued)

(52) U.S. Cl.
  CPC ............ *F16L 55/18* (2013.01); *B23C 3/122* (2013.01); *B23C 9/00* (2013.01)

(58) Field of Classification Search
  CPC ... F16L 55/18; B23B 5/16; B23B 5/48; B23B 5/161; B23B 5/162; B23B 5/163; B23B 2226/61; B23B 2260/0725; B23B 2270/20; B23B 2270/22; B23C 7/007; B23C 1/005; B23C 1/20; B23C 3/02; B23C 3/12; B23C 3/122; B23C 3/124; B23C 9/00; B23C 2220/36; E21B 29/00; E21B 29/002; E21B 29/007; E21B 29/08; B23P 15/34;
  (Continued)

(56) References Cited

U.S. PATENT DOCUMENTS

| 738,503 | A |  | 9/1903 | Waters |
| 1,985,541 | A | * | 12/1934 | Hoefer ............ B23D 21/04 30/97 |

(Continued)

FOREIGN PATENT DOCUMENTS

| WO | 8501094 | 3/1985 |
| WO | 9721953 | 6/1997 |

(Continued)

OTHER PUBLICATIONS

Baldor VS1 MD AC Microdrive Installation and Operating Manual, pp. 1-204, Oct. 2010.

(Continued)

*Primary Examiner* — David Bryant
*Assistant Examiner* — Steven A Maynard
(74) *Attorney, Agent, or Firm* — John V. Daniluck; Bingham Greenebaum Doll LLP

(57) ABSTRACT

Pipe machining apparatuses and methods are disclosed. Embodiments include placing a clamp around a plastic pipe and attaching a cutting tool to the clamp, the cutting tool moving around the clamp and around the pipe as the cutting tool shapes the pipe end by removing portions of the pipe end. Further embodiments include forming a male portion of a snap coupling on one pipe and forming a female portion of a snap coupling on another pipe and pressing the two coupling portions together until the two pipes associated with the coupling portions snap together. Still further embodiments include rotating the pipe as the cutting tool travels around the pipe. Additional embodiments include an adjustment mechanism that adjusts the radial and/or axial location of the cutting head with respect to the clamp and with respect to the pipe.

11 Claims, 27 Drawing Sheets

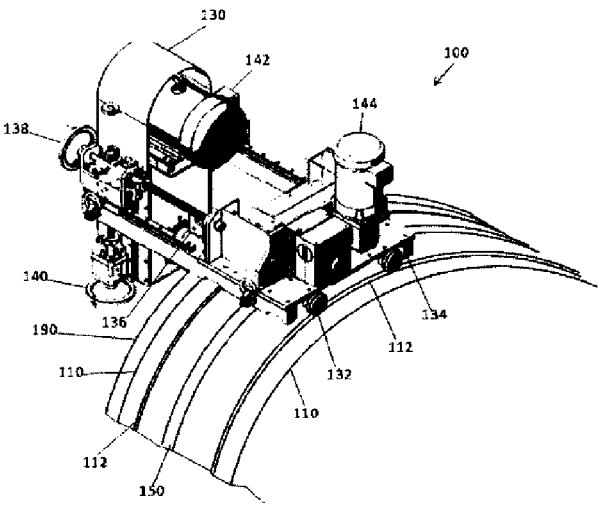

US 9,574,697 B1
Page 2

(51) Int. Cl.
*B23C 3/12* (2006.01)
*B23C 9/00* (2006.01)

(58) Field of Classification Search
CPC ..... B23P 15/40; B23Q 9/0021; B23Q 9/0035; B23Q 9/0057; B23G 1/22; Y10T 29/49995; Y10T 82/20; Y10T 82/22; Y10T 408/36; Y10T 408/90473; Y10T 409/300672; Y10T 409/304424; Y10T 409/306384; Y10T 409/30644
See application file for complete search history.

(56) References Cited

U.S. PATENT DOCUMENTS

| | | |
|---|---|---|
| 3,243,206 A | 3/1966 | Samer |
| 3,594,023 A | 7/1971 | Yano |
| 3,784,235 A | 1/1974 | Kessler et al. |
| 3,984,007 A | 10/1976 | Birdwell |
| 4,130,034 A * | 12/1978 | Benoit .............. B23B 5/163 82/113 |
| 4,318,391 A | 3/1982 | Wachs et al. |
| 4,402,136 A * | 9/1983 | Rast .............. B23D 21/08 30/101 |
| 4,428,604 A | 1/1984 | Conner |
| 4,456,288 A | 6/1984 | Conner |
| 4,490,909 A * | 1/1985 | Wachs .............. B23D 21/04 266/56 |
| 4,543,861 A | 10/1985 | Kwech et al. |
| 4,655,108 A | 4/1987 | Galos |
| 4,677,884 A | 7/1987 | Kwech et al. |
| 4,762,038 A | 8/1988 | Olson |
| 4,779,902 A | 10/1988 | Lee |
| 4,791,842 A * | 12/1988 | Olson .............. B23D 21/04 403/330 |
| 4,813,314 A * | 3/1989 | Kwech .............. B23B 5/163 30/97 |
| 4,863,199 A | 9/1989 | Hojo et al. |
| 4,875,714 A | 10/1989 | Lee |
| 4,939,964 A * | 7/1990 | Ricci .............. B23B 5/168 30/97 |
| 5,015,014 A | 5/1991 | Sweeney |
| 5,054,342 A | 10/1991 | Swiatowy et al. |
| 5,662,360 A | 9/1997 | Guzowski |
| 5,669,284 A | 9/1997 | Fish |
| 5,921,591 A | 7/1999 | Argent |
| 6,263,747 B1 | 7/2001 | Carson et al. |
| 6,409,221 B1 | 6/2002 | Robinson |
| 6,520,547 B2 | 2/2003 | Robinson |
| 6,938,313 B2 * | 9/2005 | Viola .............. B23B 31/202 29/27 C |
| 7,011,345 B2 | 3/2006 | Foos |
| 2010/0059995 A1 | 3/2010 | Ciprich et al. |

FOREIGN PATENT DOCUMENTS

| | | |
|---|---|---|
| WO | 2004113777 | 12/2004 |
| WO | 2005106311 | 11/2005 |

OTHER PUBLICATIONS

E.H. Wachs Trav-L-Cutter Model E (Pneumatic), Model HE (Hydraulic) brochure available at http://www.ehwachs.com/Industrial-Products/productcategory/102i-Trav-L-Cutter-69/107i-Trav-L-Cutter-43/Trav-L-Cutter-Model-E-Air-Kit-124.html, last accessed Feb. 21, 2013; actual publication date unknown.
E.H. Wachs Trav-L-Cutter Model E & HE Standard & Atmospheric 02-000-01, -02, -03, -04 User's Manual, Revised May, 2010, pp. 1-56.
ISCO 2009 SnapTite Design Guide, p. 1-45, 2009.
ISCO SnapTite Sales Sheet, p. 1-2. Publication date unkown. Document downloaded Jun. 29, 2010.

* cited by examiner

Leave clearance
O.D. cut if required

PIPE MACHINING APPARATUSES AND METHODS

This application claims the benefit of U.S. Provisional Application No. 61/601,381, filed Feb. 21, 2012, the entirety of which is hereby incorporated herein by reference.

FIELD

Various embodiments of the present invention pertain to apparatuses and methods for machining large cylindrical structures, and some embodiments pertain to various portable apparatus for machining pipe in the field.

BACKGROUND

Pipes, such as those situated underground, can deteriorate over time. Replacing the pipe can be difficult, especially if structures, such as buildings or roadways, have been built above or around the deteriorating pipe. One solution is to reline the pipe by installing another pipe within the deteriorating pipe.

SUMMARY

Embodiments of the present disclosure provide improved pipe machining, cutting, and/or forming apparatuses and methods.

Further embodiments include pipe machining apparatuses and methods that utilize cutting heads that travel around a clamp attached to the pipe.

Still further embodiments include pipe machining apparatuses and methods whose cutting heads that connect directly to a pipe and travel around the pipe without the need for a clamp.

Further embodiments include pipe machining apparatuses and methods that can form a pipe end into either a male and female coupling. After forming a female end on one pipe and a complimentary male end on the other pipe, the pipes may be coupled by inserting the male fitting into the female fitting until the fittings lock together. In some embodiments, this fitting provides pushing surfaces that are perpendicular to the pipe axis and create an ability for one pipe to push a second pipe to which the one pipe is coupled (and any additional pipes to which the second pipe is coupled) along a friction surface (such as the inside of a deteriorating pipe being lined) without the fittings moving beyond the coupling position. In some embodiments, these pushing surfaces are equal to one-half (½) of the pipe thickness, while in still further embodiments these pushing surfaces are equal to approximately three-quarters (¾) the pipe thickness. Still further embodiments include pushing surfaces that are perpendicular to the pipe axis and create an ability for one pipe to pull a second pipe to which the one pipe is coupled (and any additional pipes to which the second pipe is coupled) along a friction surface (such as the inside of a deteriorating pipe being lined) without the fittings uncoupling from one another.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein is not necessarily intended to address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

FIG. 1 is a perspective view of a pipe cutter mounted to a pipe according to one embodiment of the present disclosure.

FIG. 2 is a top plan view of the pipe cutter depicted in FIG. 1.

FIG. 3 is a side elevational view of the pipe cutter and pipe depicted in FIG. 1.

Figure 4:
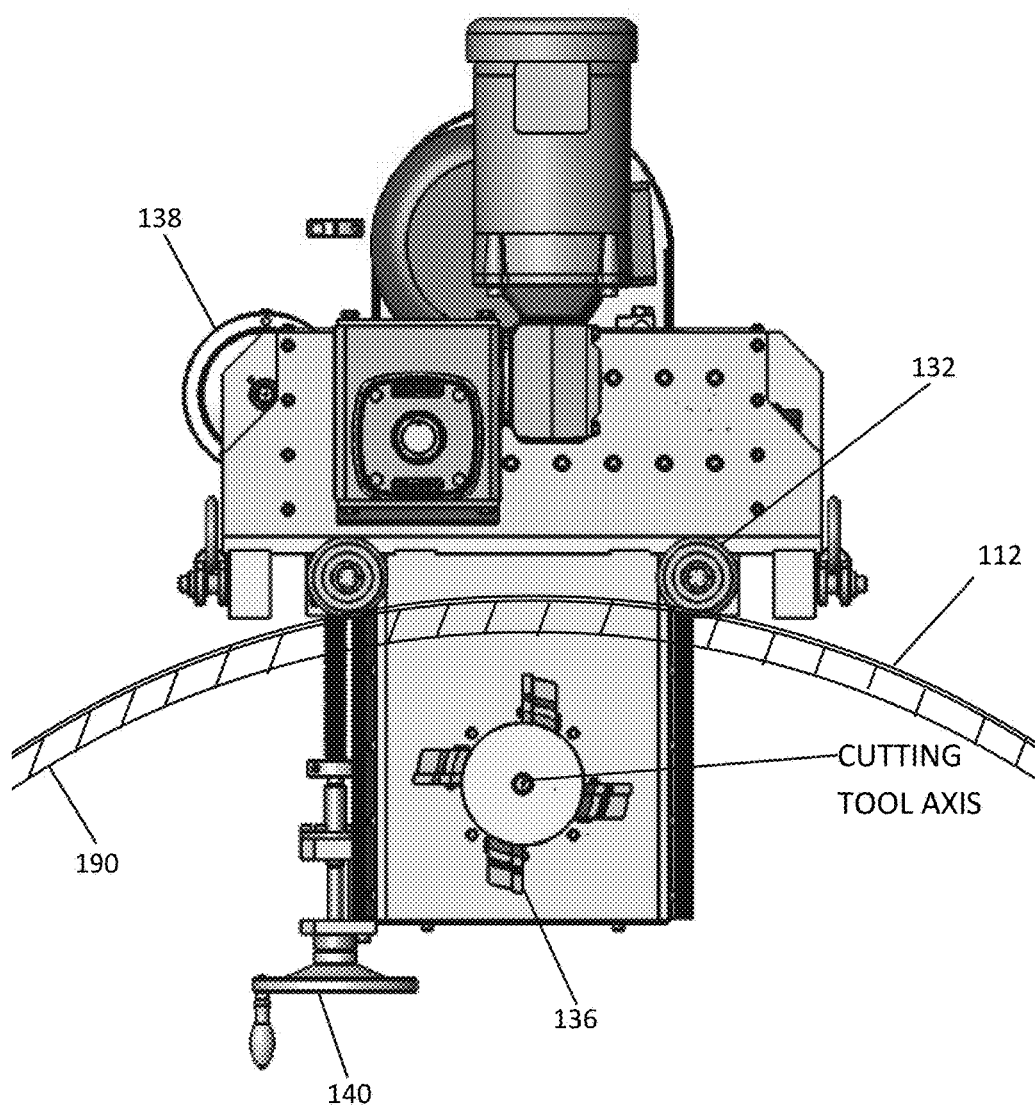
FIG. 4 is an alternate side elevational view of the pipe cutter and pipe depicted in FIG. 1 as viewed parallel to the pipe axis.

FIG. 4 is an alternate side elevational view of the pipe cutter and pipe depicted in FIG. 1 as viewed parallel to the pipe axis.

Figure 5:
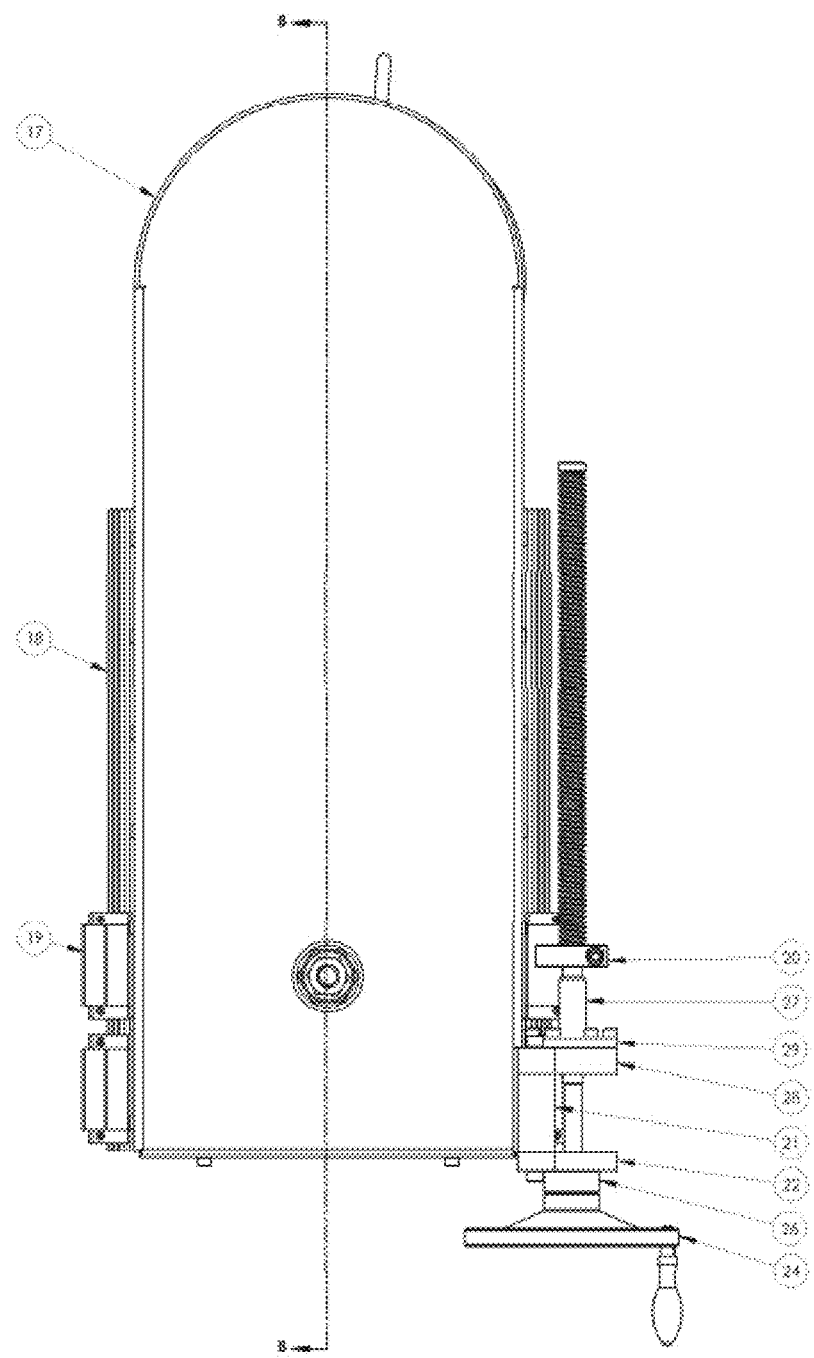
FIG. 5 is a partial side elevational view of the cutting device portion of the pipe cutter depicted in FIG. 1.

FIG. 5 is a partial side elevational view of the cutting device portion of the pipe cutter depicted in FIG. 1.

FIG. 6 is a sectional view of the cutting device portion depicted in FIG. 5.

Figure 7:
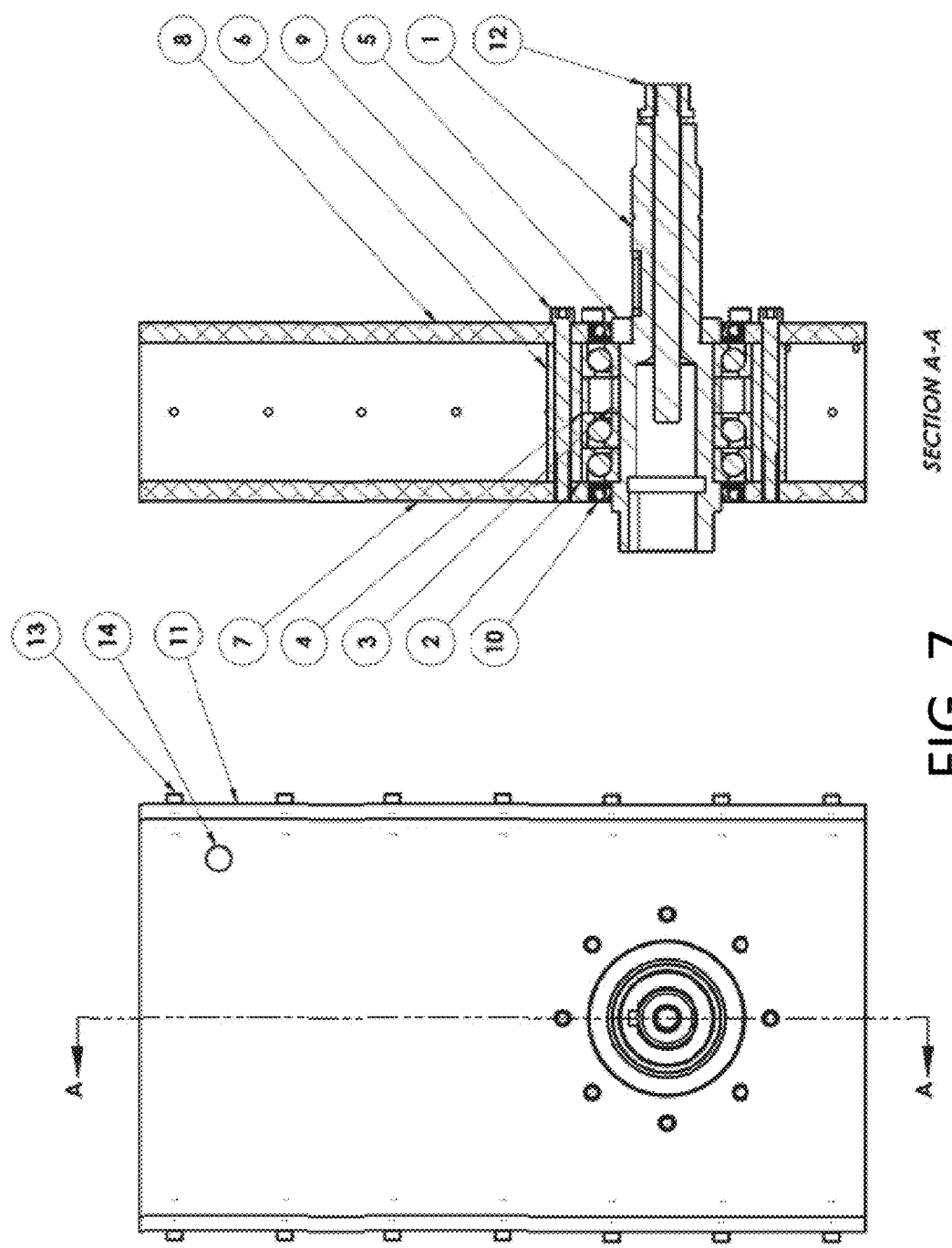
FIG. 7 is a fragmentary view of the mechanism for attaching a cutting head depicted in FIG. 6.

FIG. 7 is a fragmentary view of the mechanism for attaching a cutting head depicted in FIG. 6.

Figure 1:
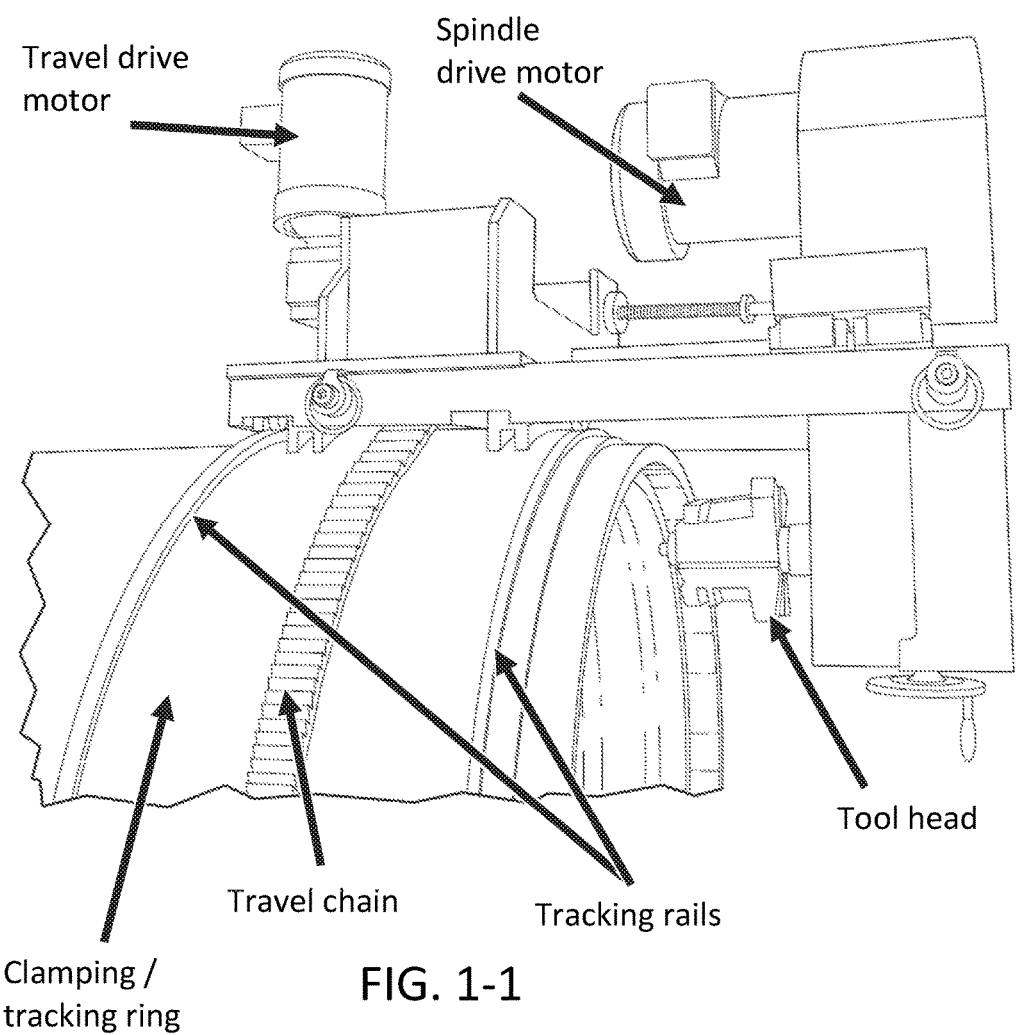
Figures 1, 2:
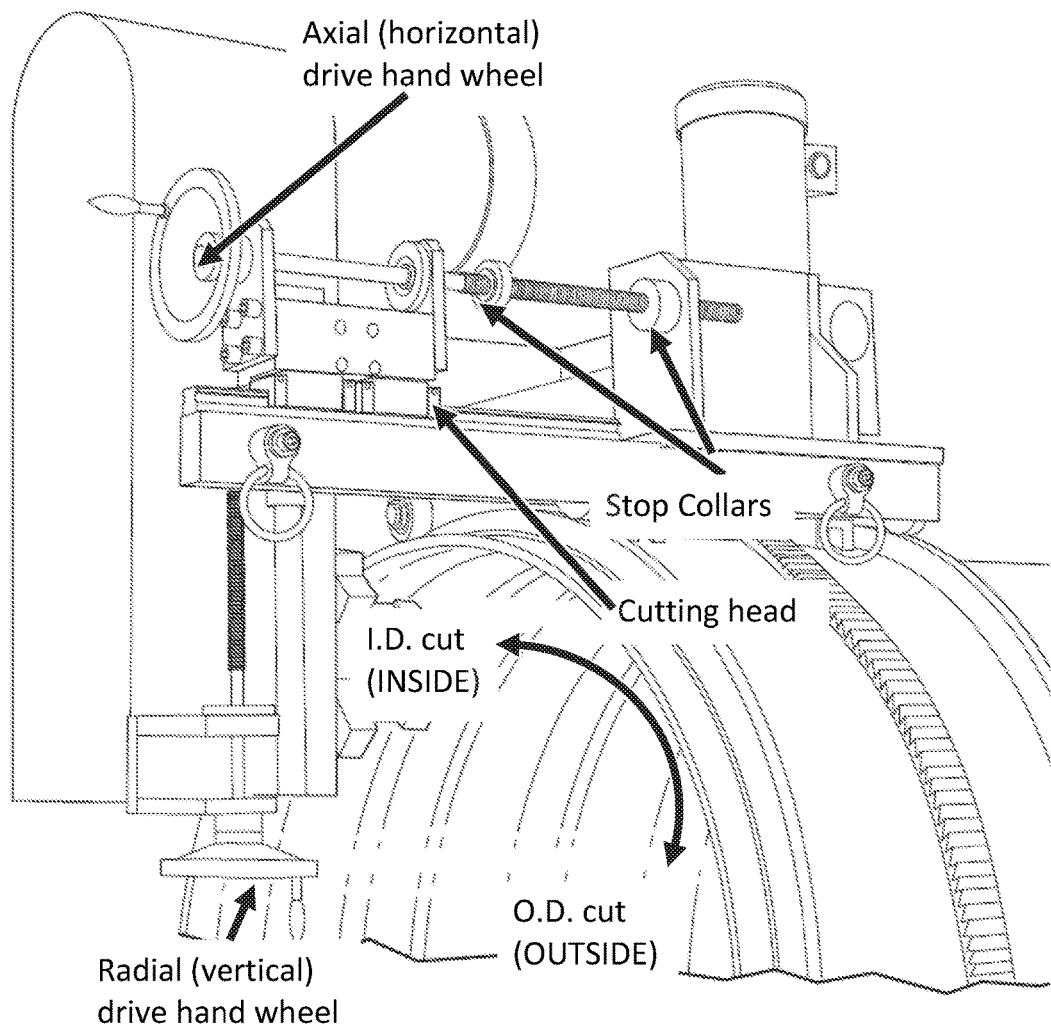
Figures 1, 2, 3:
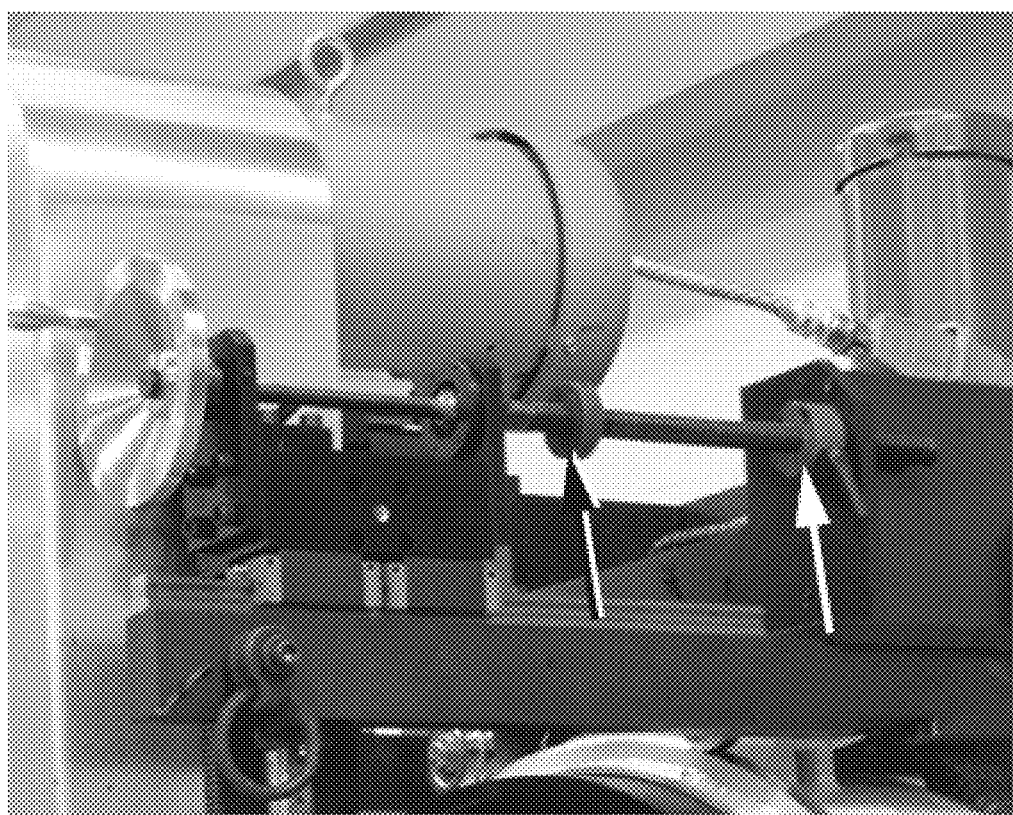
Figures 1, 2, 3, 4:
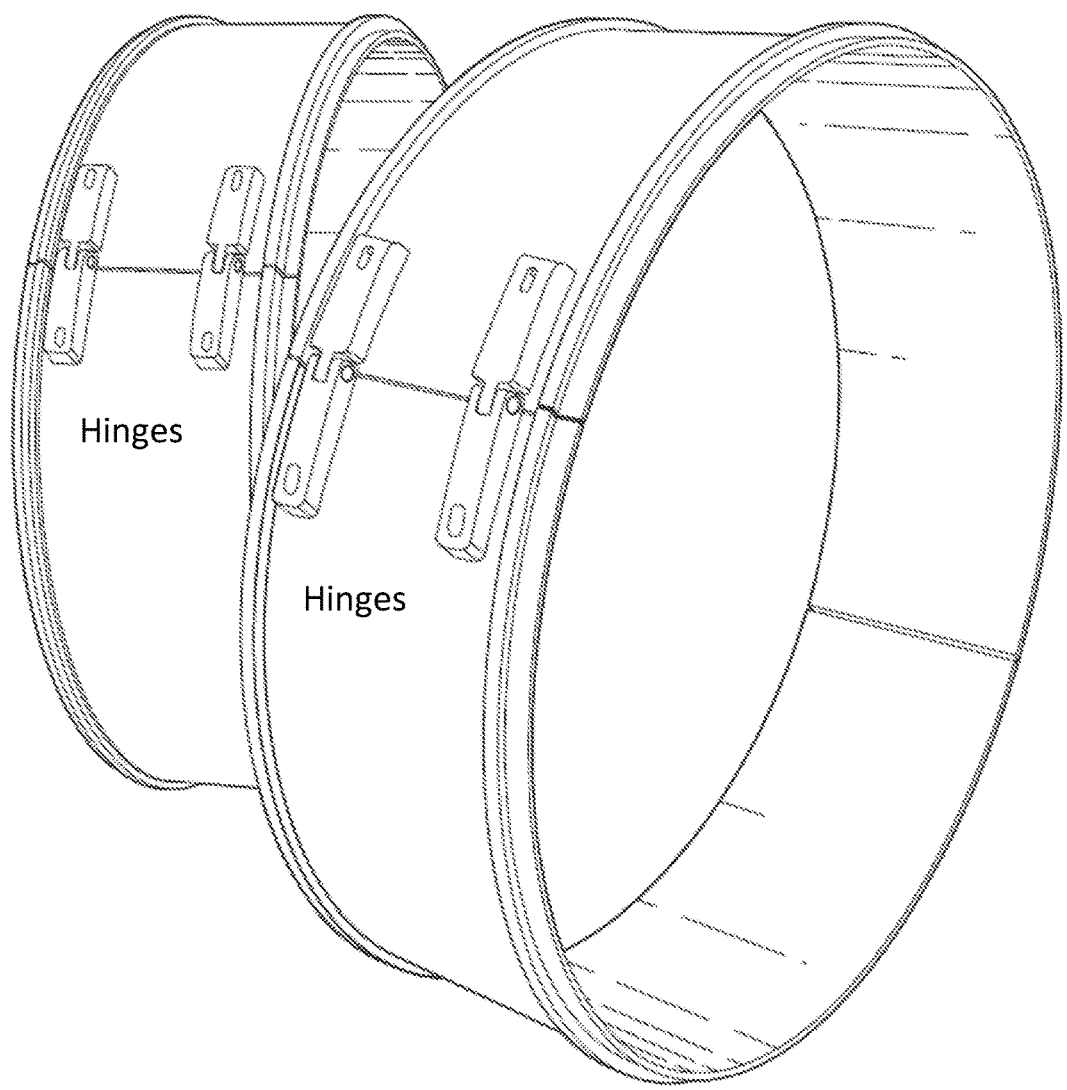
Figures 1, 2, 3, 4, 5:
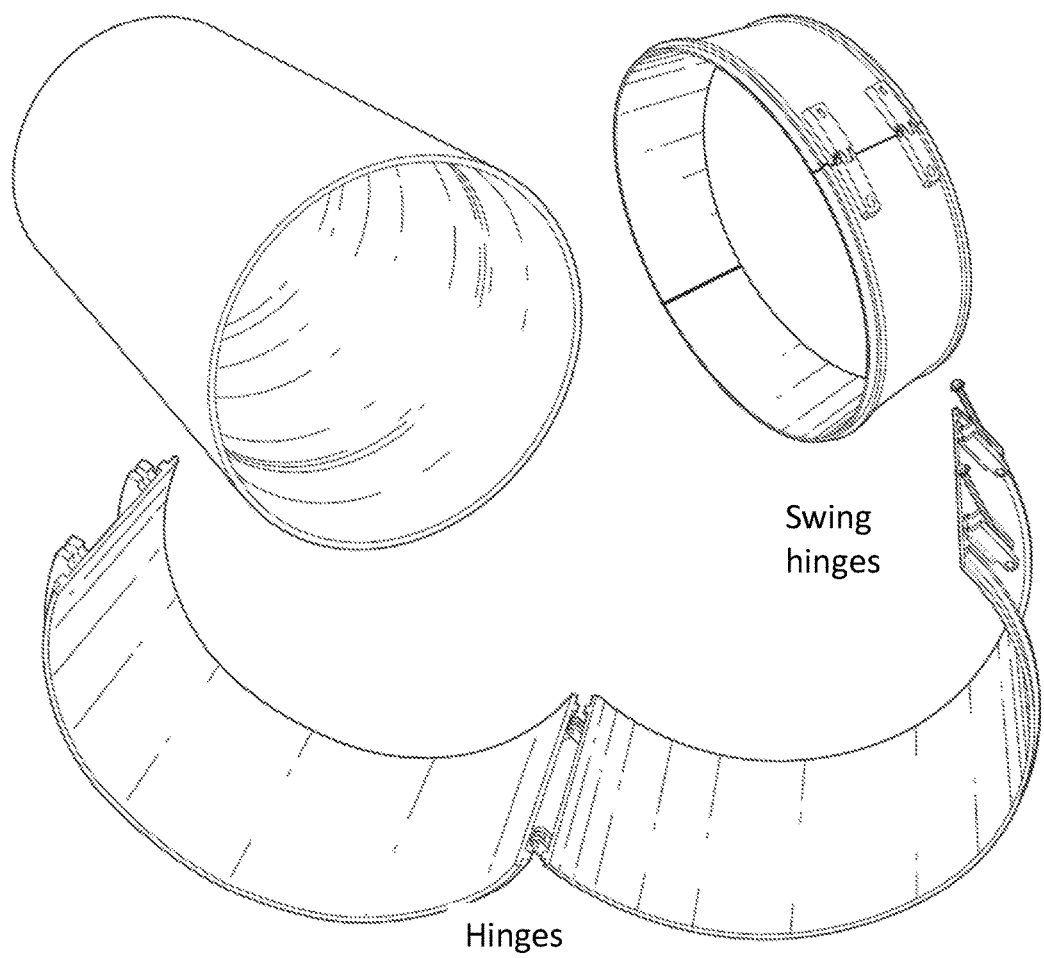
Figures 1, 2, 3, 4, 5, 6, 7, 8:
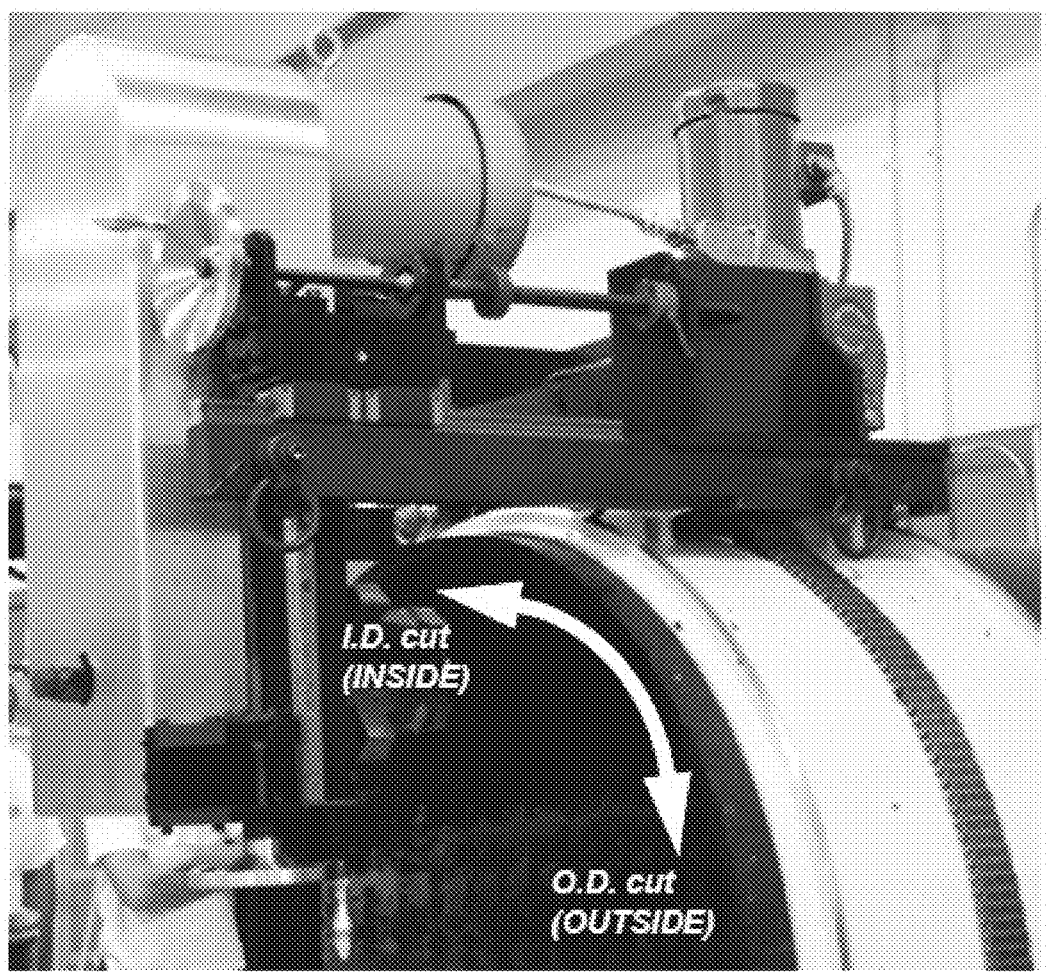

FIG. 8. The photo shows the major components of the end prep cutting device.

Figures 1, 2, 3, 4, 5, 6, 7, 8, 9:
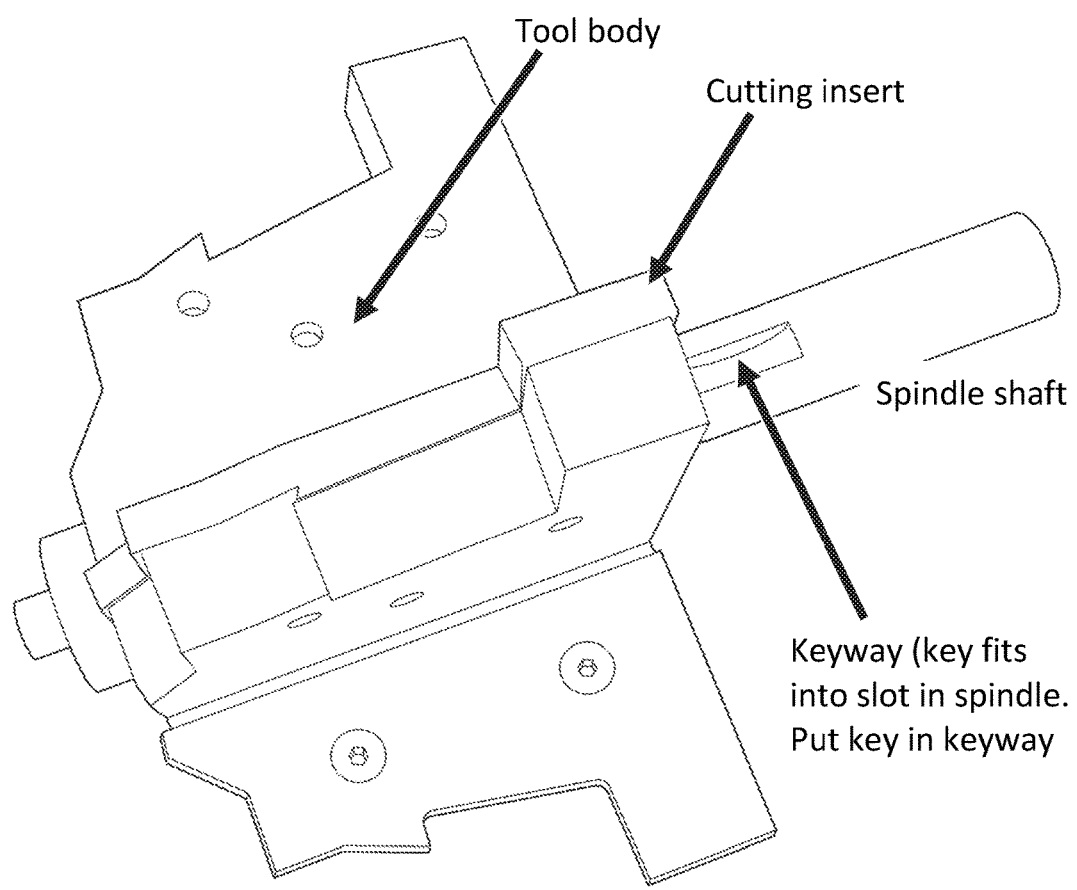

FIG. 9. Hand wheel drives allow you to position the tool head axially and radially. The manual drive screws have adjustable stop collars to set end stop positions. Loosen the screw in the collar, move it to the desired position, and retighten the screw. The machine operates in both directions. It will rotate clockwise for an O.D. (OUTSIDE) cut. It will rotate counter-clockwise for an I.D. (INSIDE) cut. Turn the axial feed hand wheel to extend the axial drive all the way out.

Figures 1, 3:
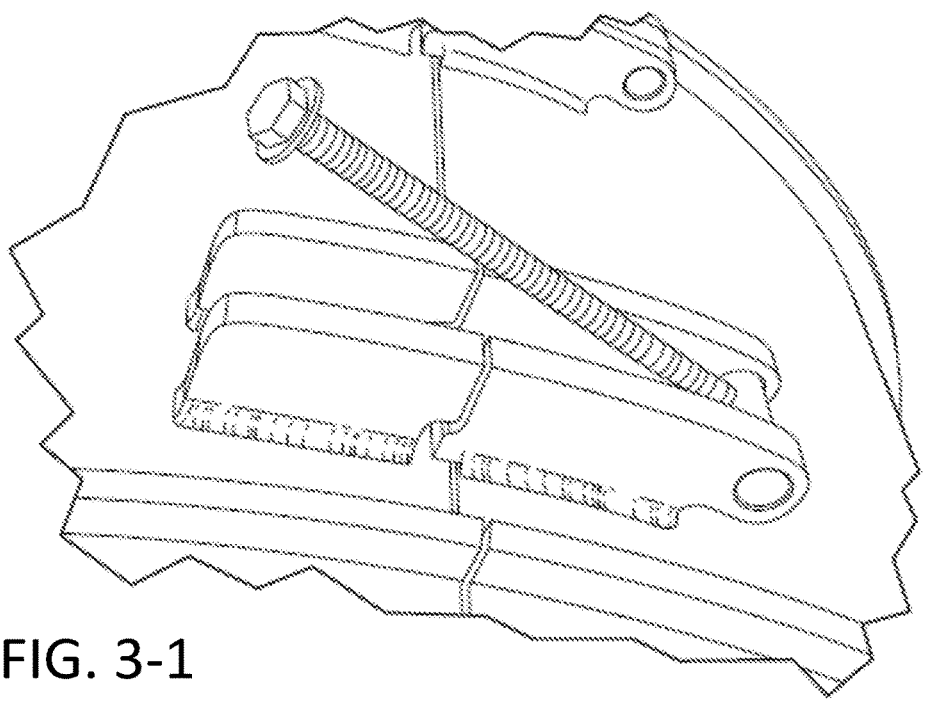
Figures 3, 4:
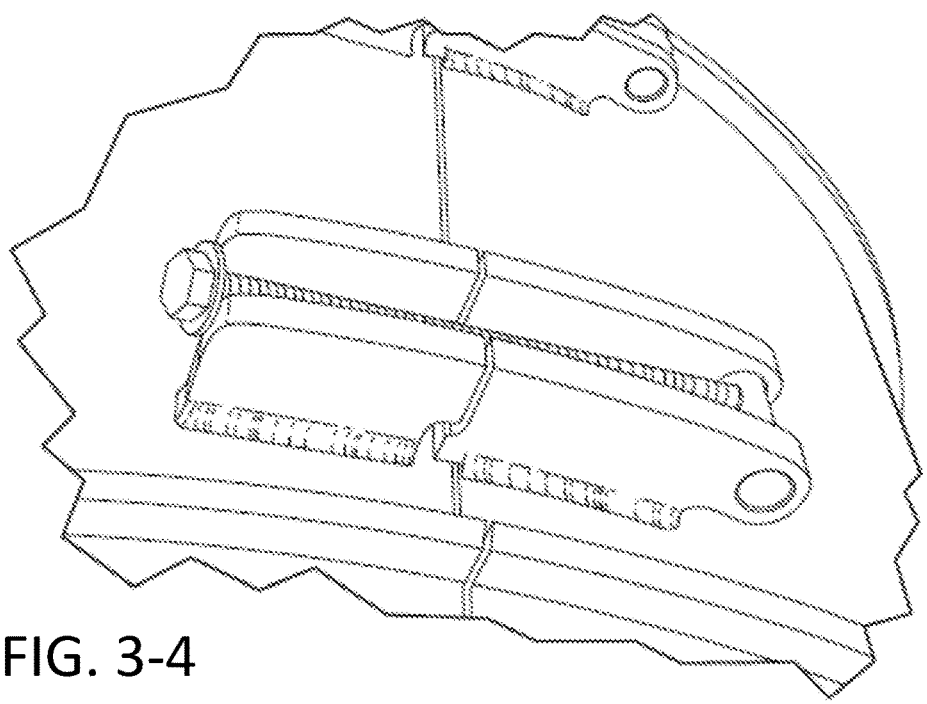
Figures 2, 3:
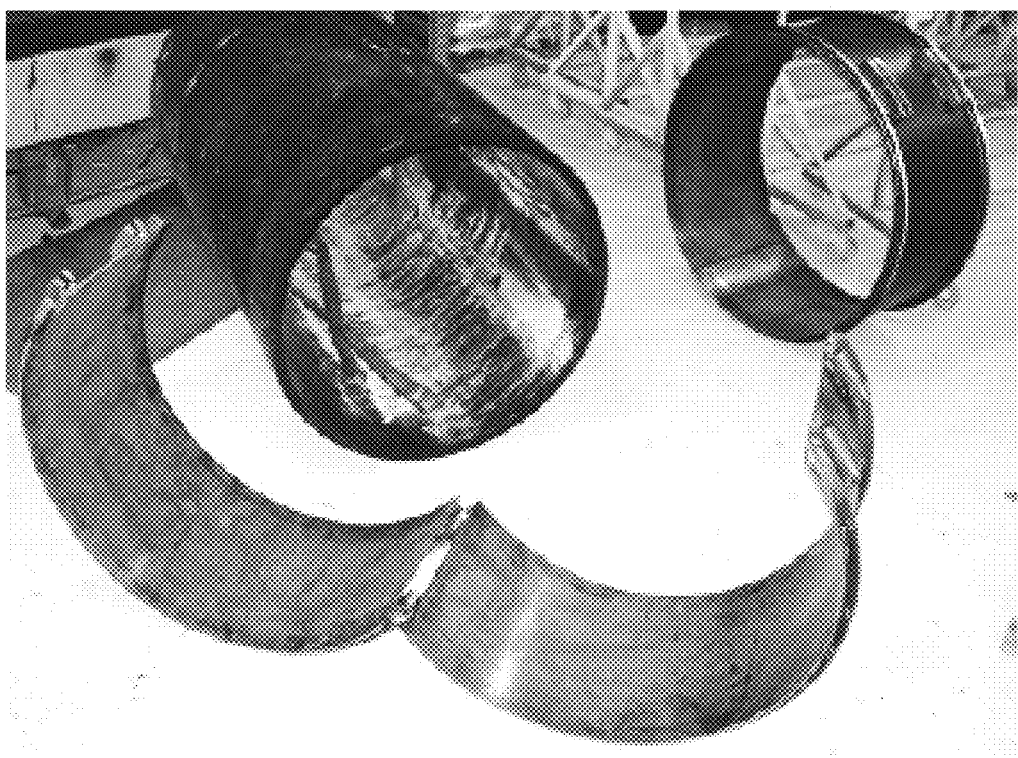
Figure 3:
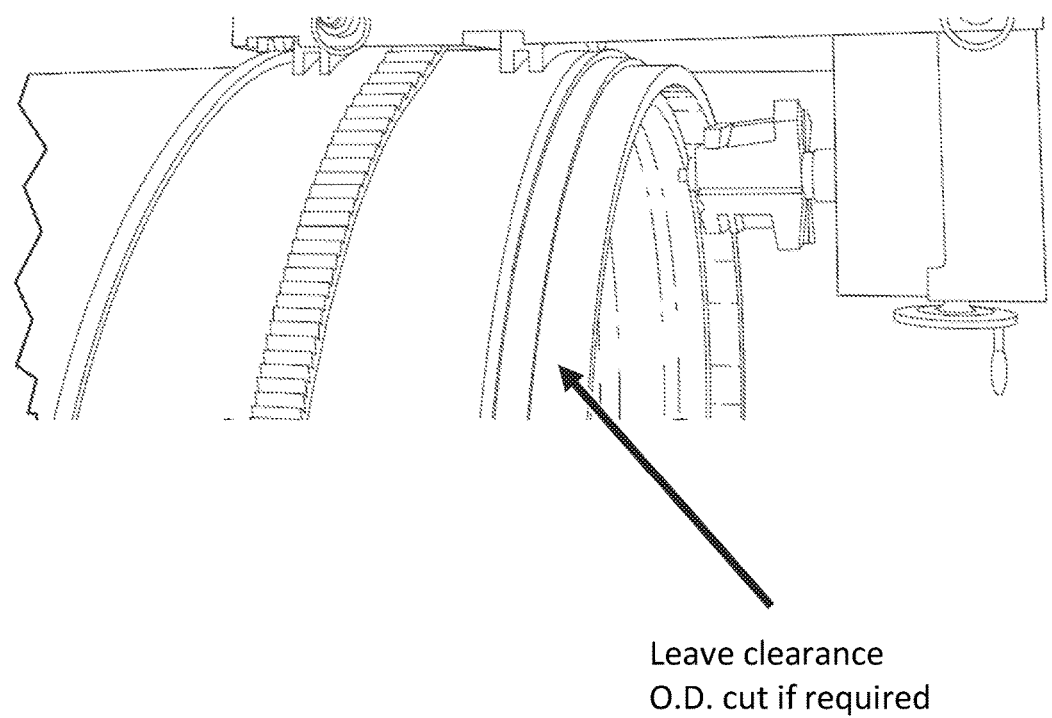
Figures 3, 4, 5:
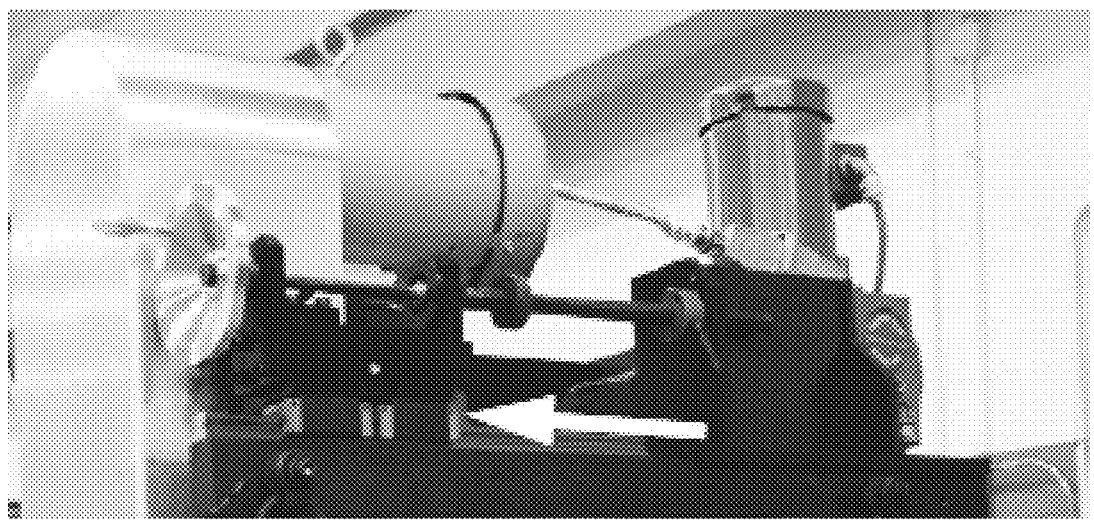
Figures 3, 4, 5, 6:
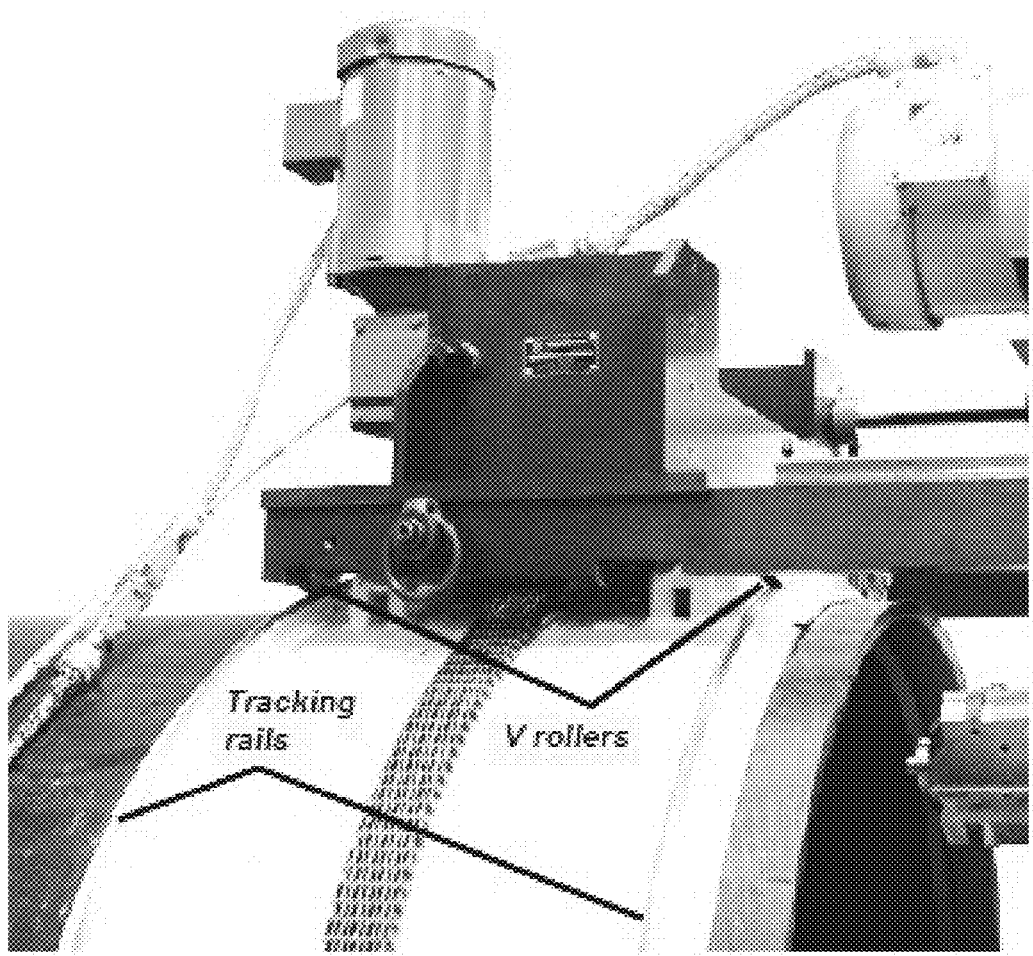
Figures 3, 4, 5, 6, 7:
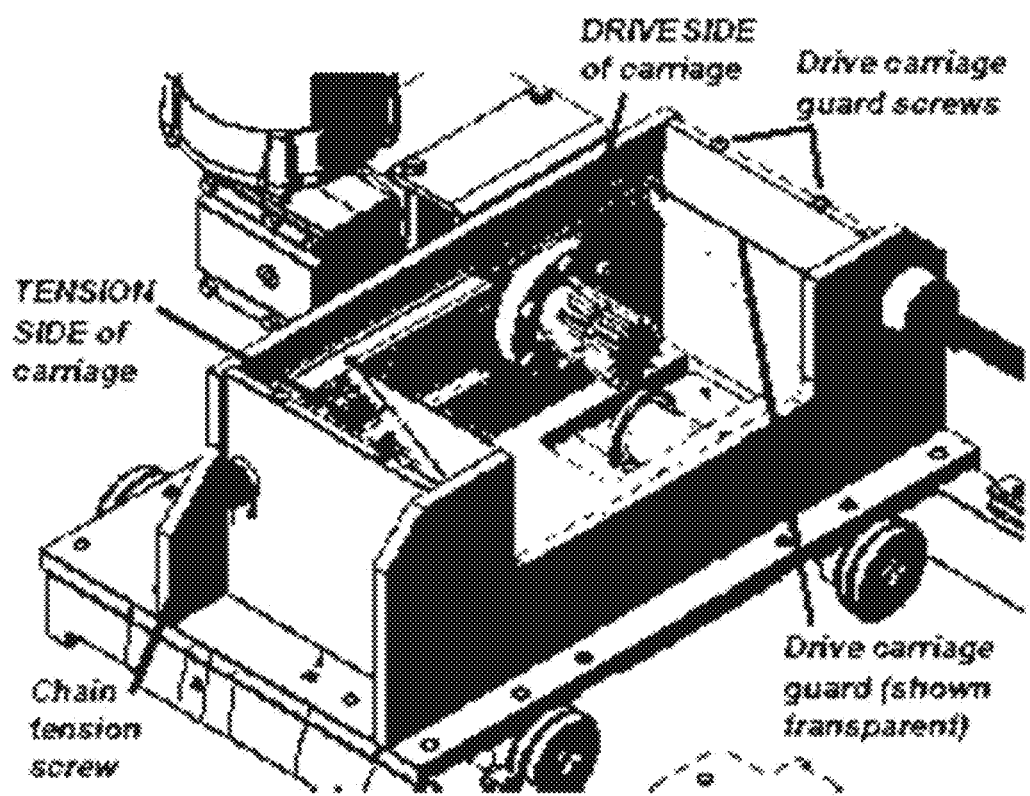
Figures 3, 4, 5, 6, 7, 8:
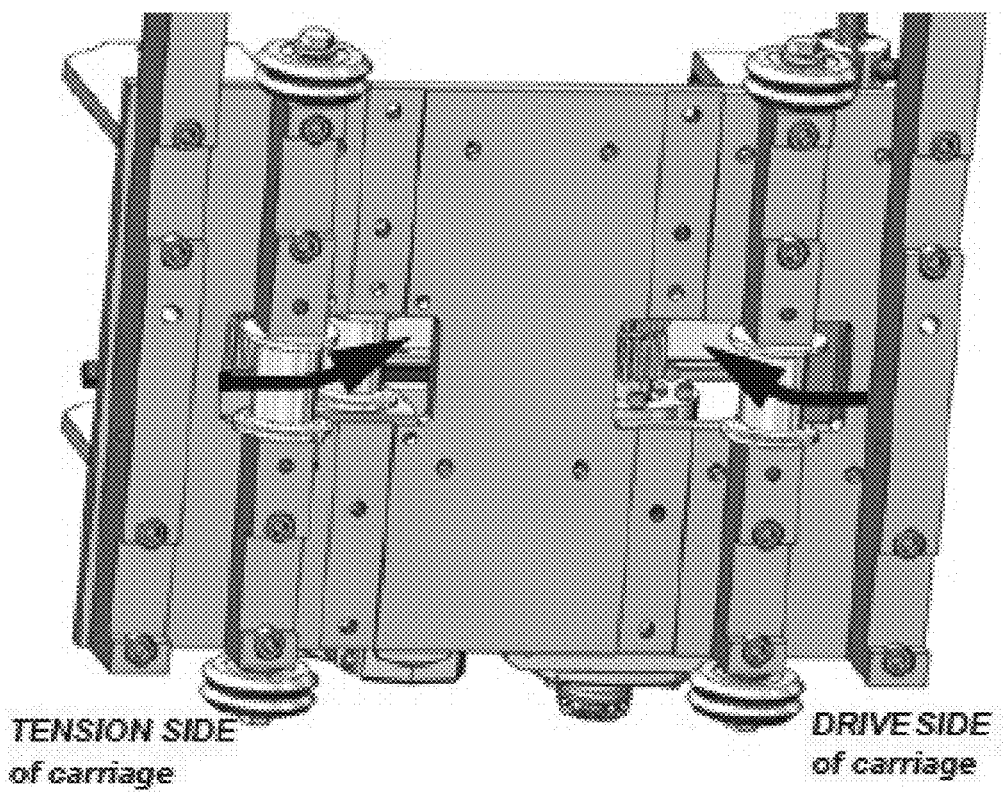
Figures 3, 4, 5, 6, 7, 8, 9:
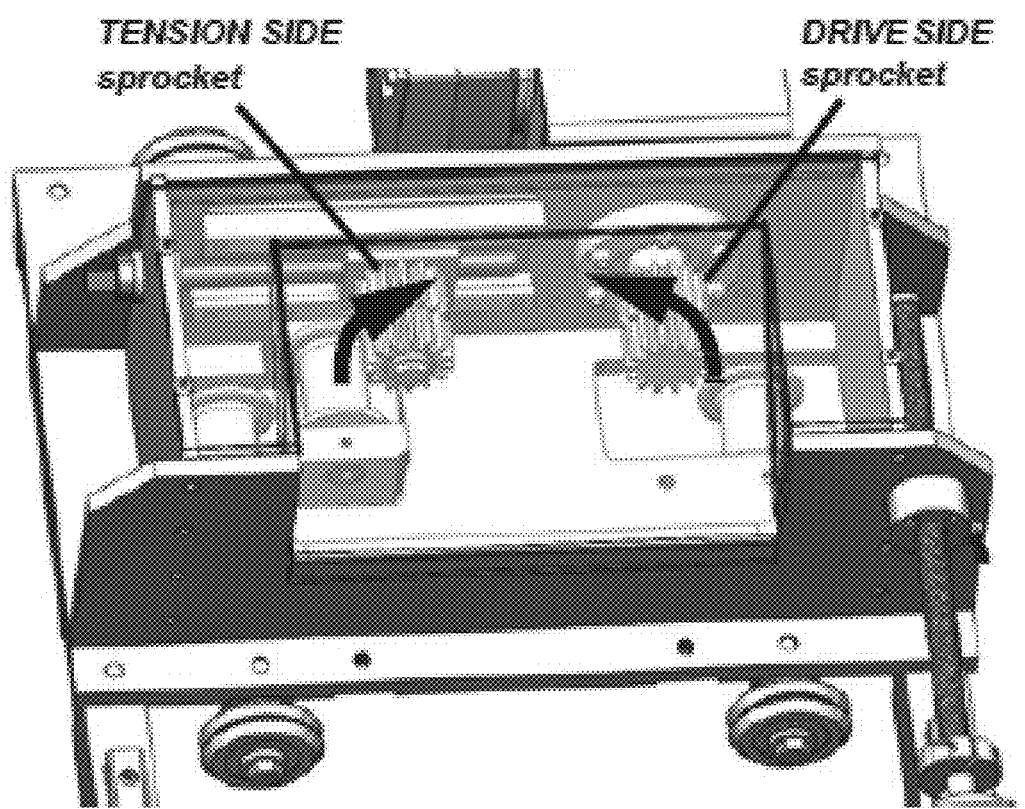
Figures 3, 4, 5, 6, 7, 8, 9, 10:
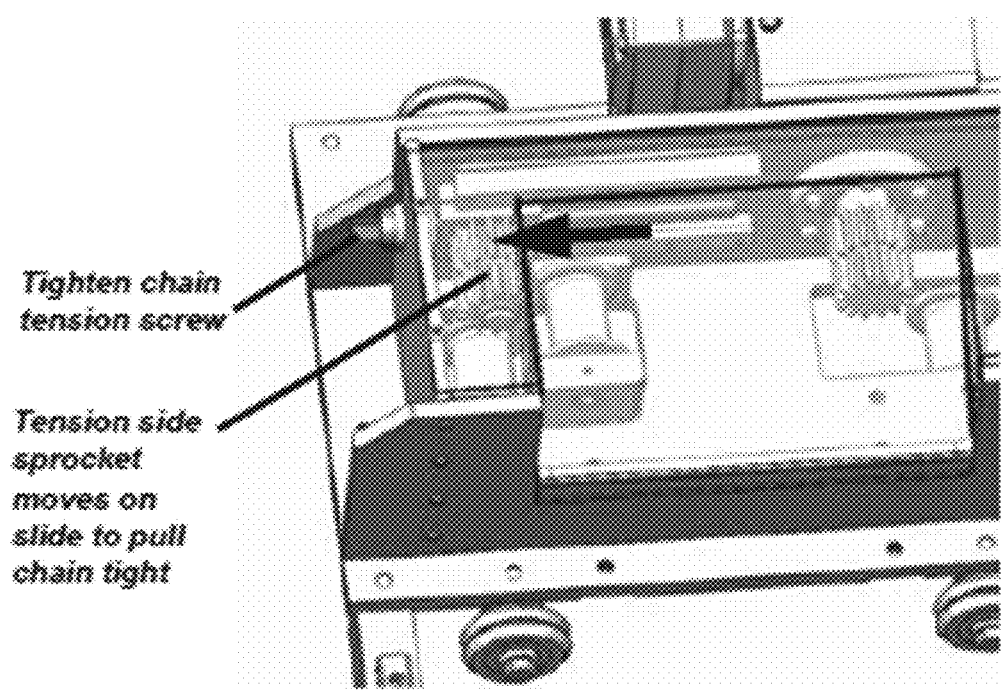

FIG. 10. The clamping/tracking rings fit on the pipe to hold the cutting device and guide it as it travels around the pipe. Each ring is custom sized for the pipe it mounts on.

Figures 3, 4, 5, 6, 7, 8, 9, 10, 11:
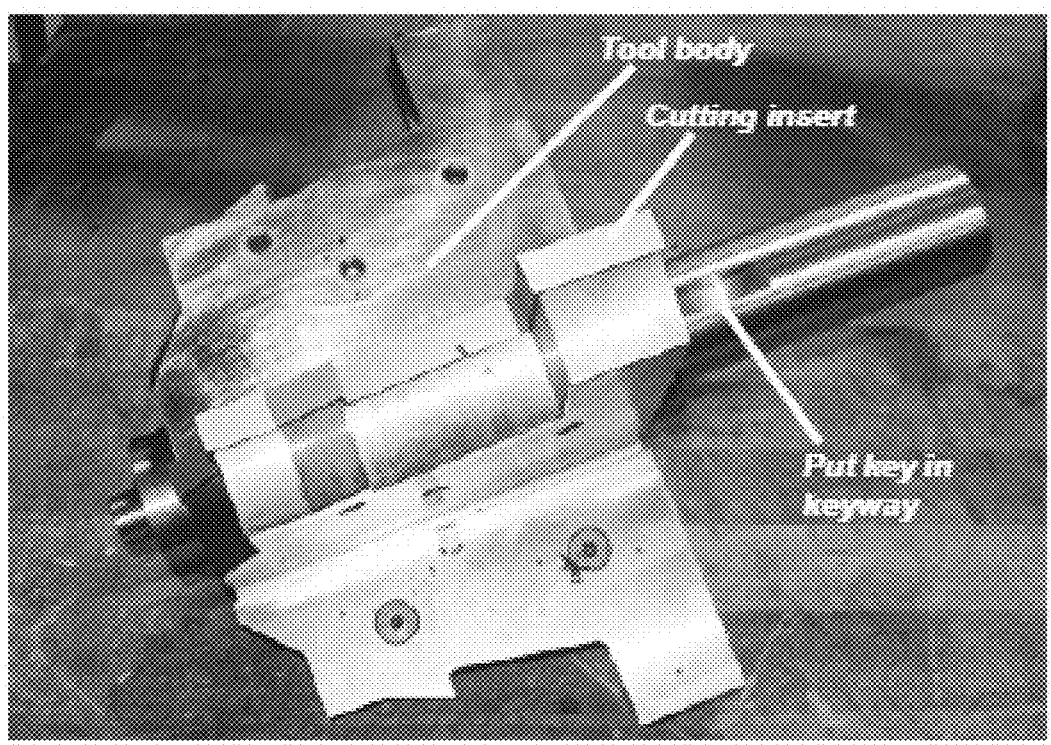

FIG. 11. The clamping rings are hinged on one side and held together with swing latches on the opposite side. Loosen the swing latches to open the clamping ring for mounting on the pipe. Open the clamping/tracking ring.

Figures 3, 4, 5, 6, 7, 8, 9, 10, 11, 12:
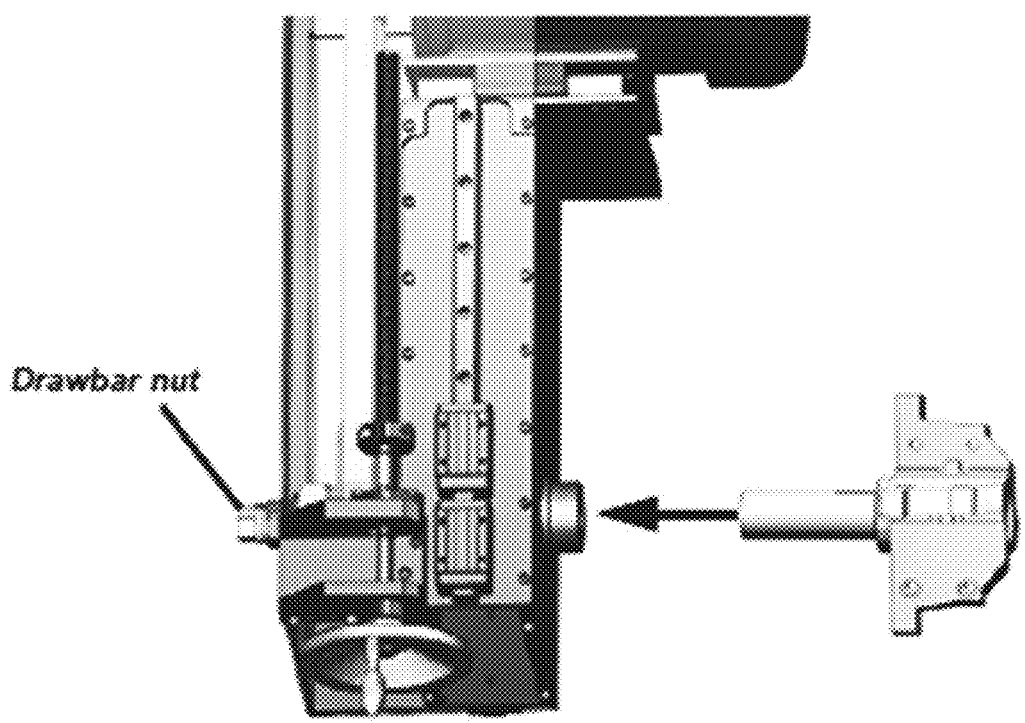

FIG. 12. The tool head is custom made for the cutting profile required. It consists of a body with spindle shaft and replaceable cutting inserts. Install the inserts on the tool head, and put the key in the keyway of the shaft.

Figures 3, 4, 5, 6, 7, 8, 9, 10, 11, 12, 13:
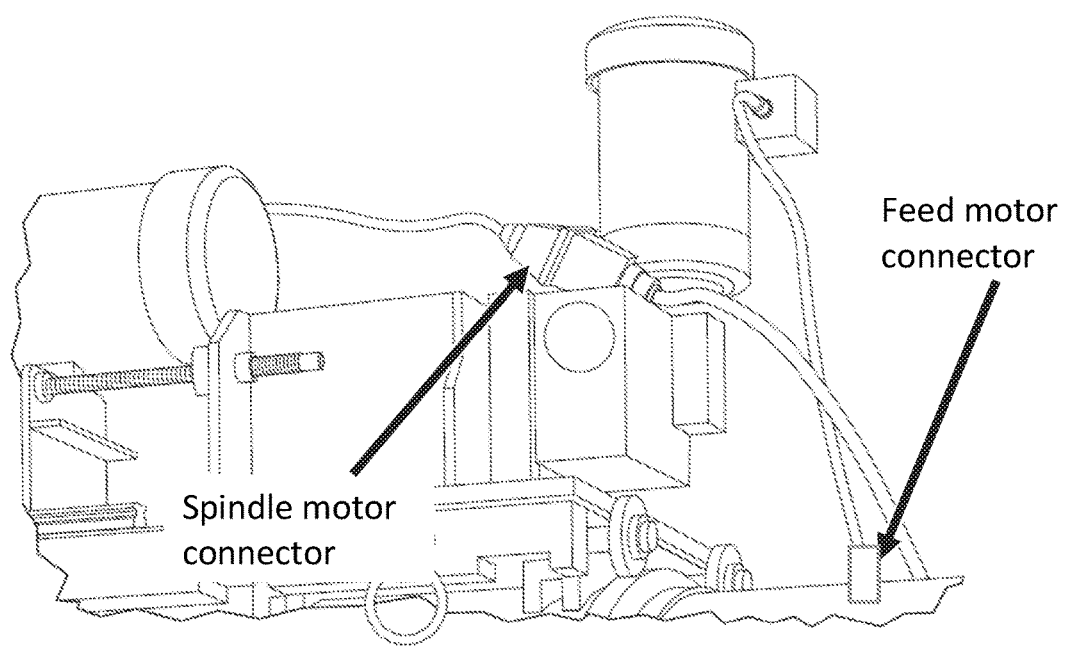

FIG. 13. Swing the latch bolts out to open the clamping/tracking ring.

Figures 3, 4, 5, 6, 7, 8, 9, 10, 11, 12, 13, 14:
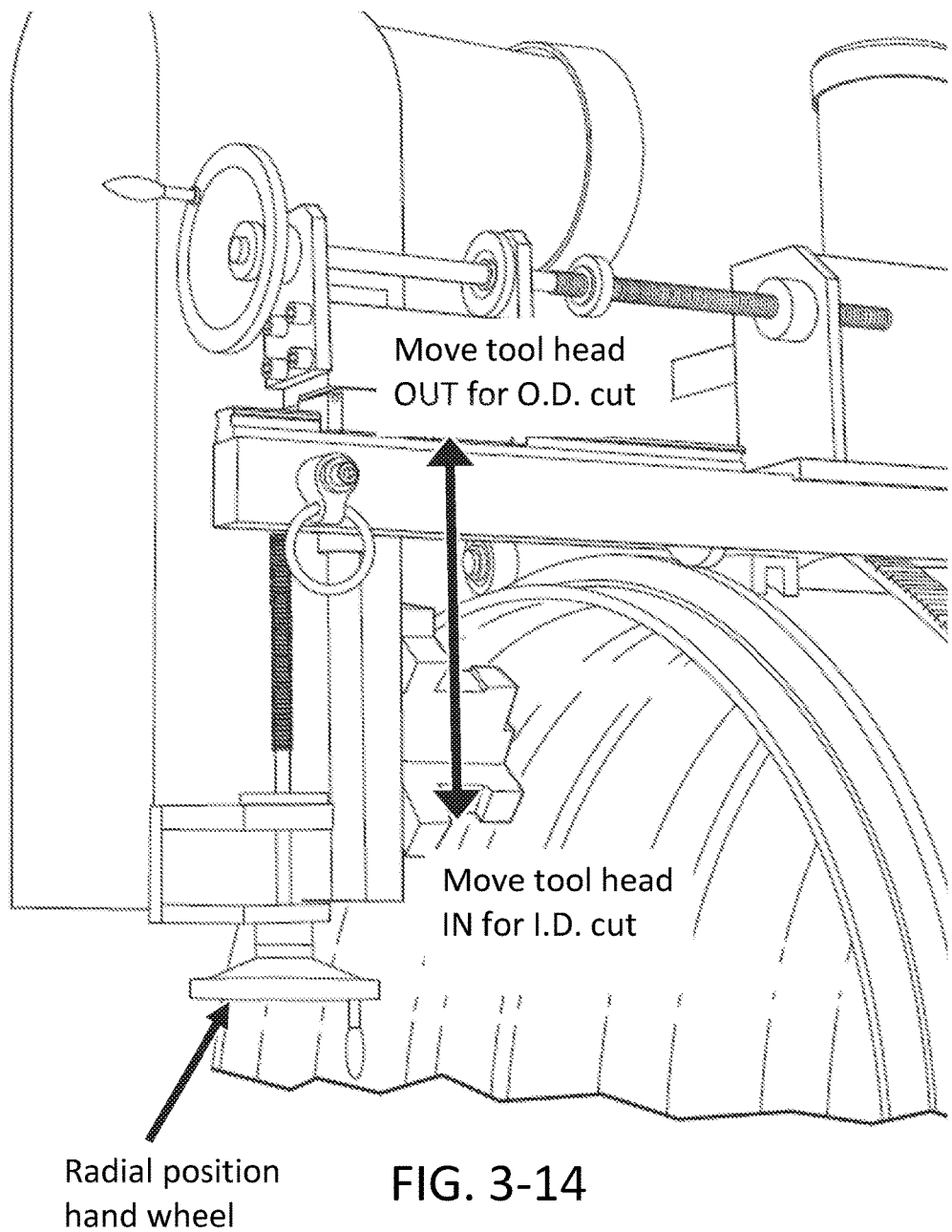

FIG. 14. Mount the ring close to the end of the pipe. Leave enough clearance between the ring and the pipe end for any required O.D. cut.

Figures 3, 4, 5, 6, 7, 8, 9, 10, 11, 12, 13, 14, 15:
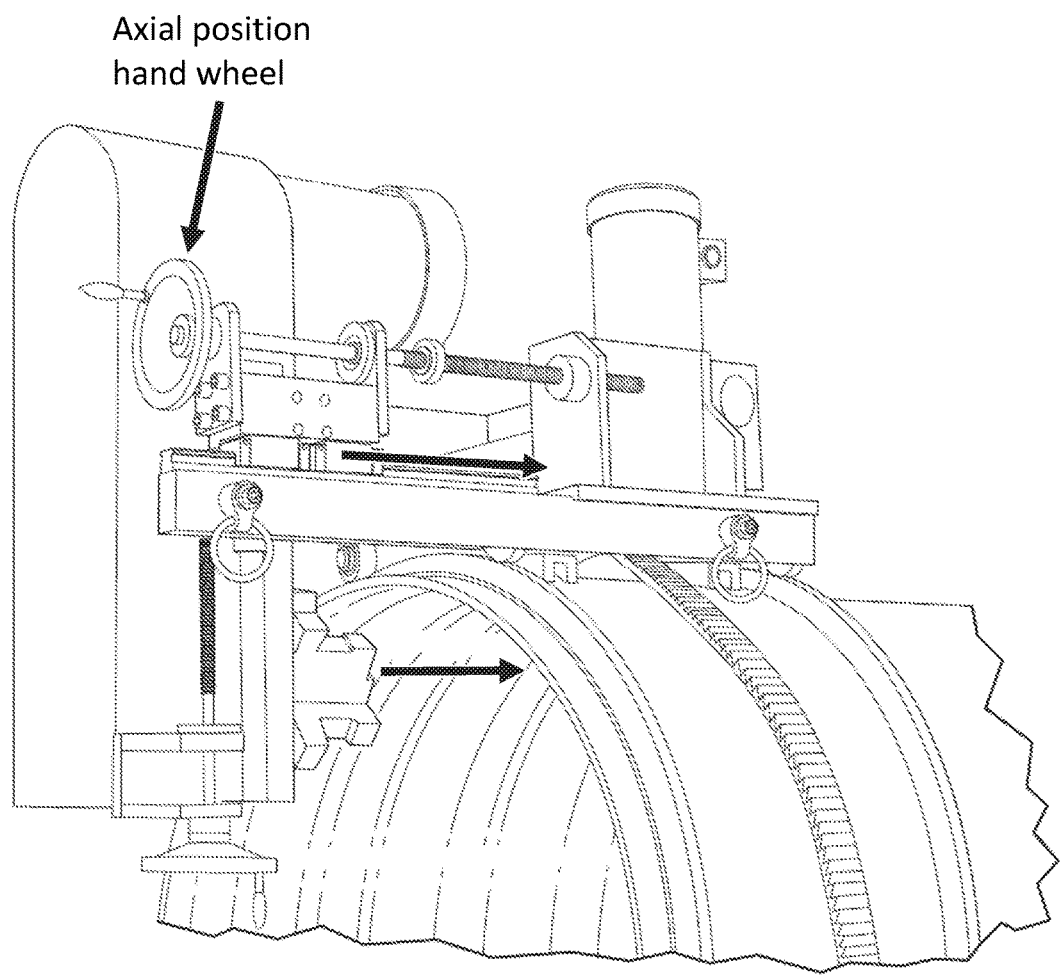

FIG. 15. Close the swing latch bolts.

Figures 3, 4, 5, 6, 7, 8, 9, 10, 11, 12, 13, 14, 15, 16:
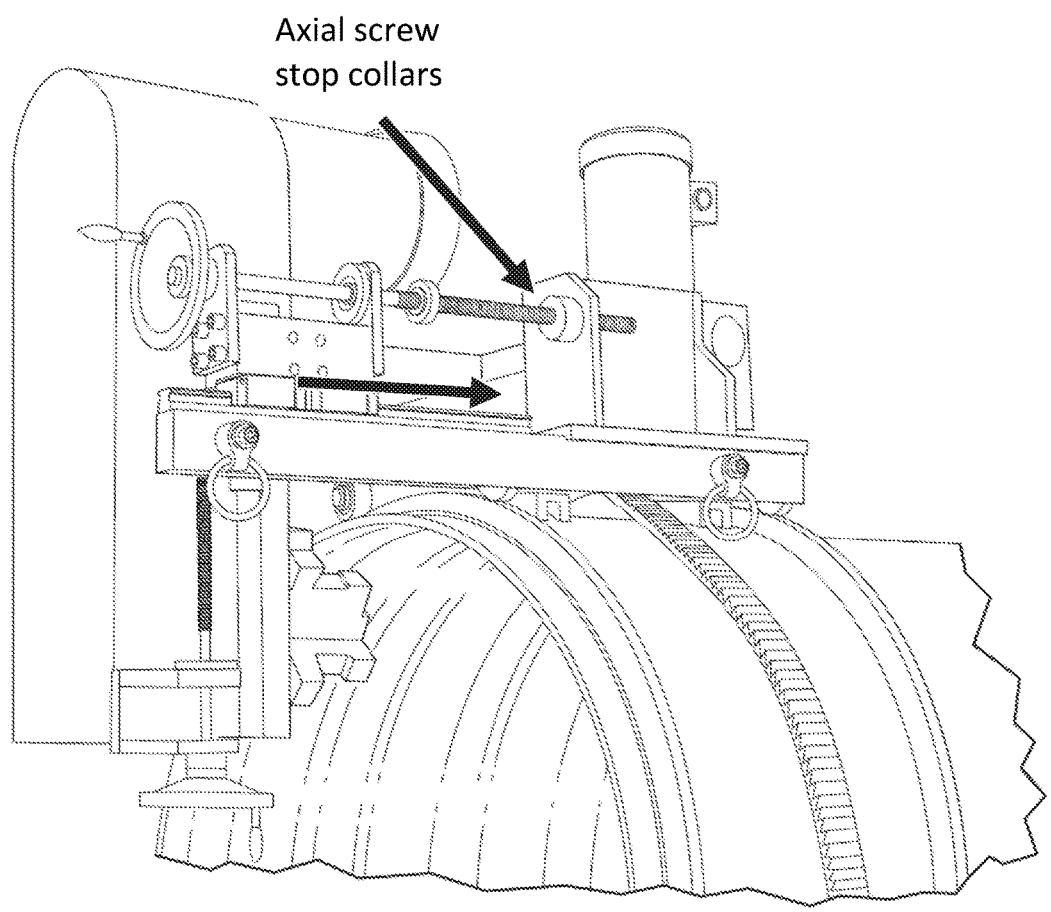

FIG. 16. Position the V rollers on the tracking rails.

Figures 3, 4, 5, 6, 7, 8, 9, 10, 11, 12, 13, 14, 15, 16, 17, 18, 19, 20:
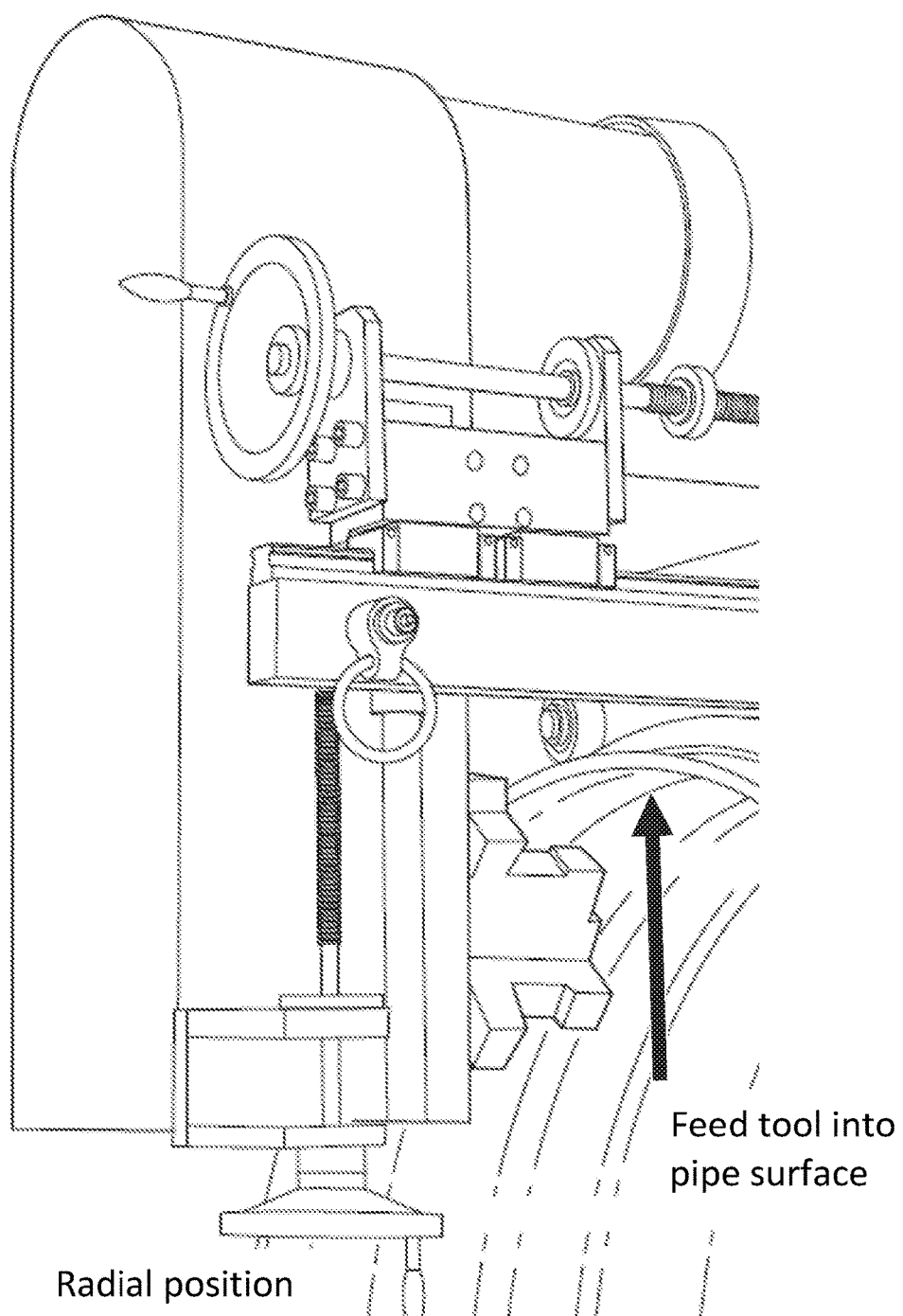
Figures 1, 4:
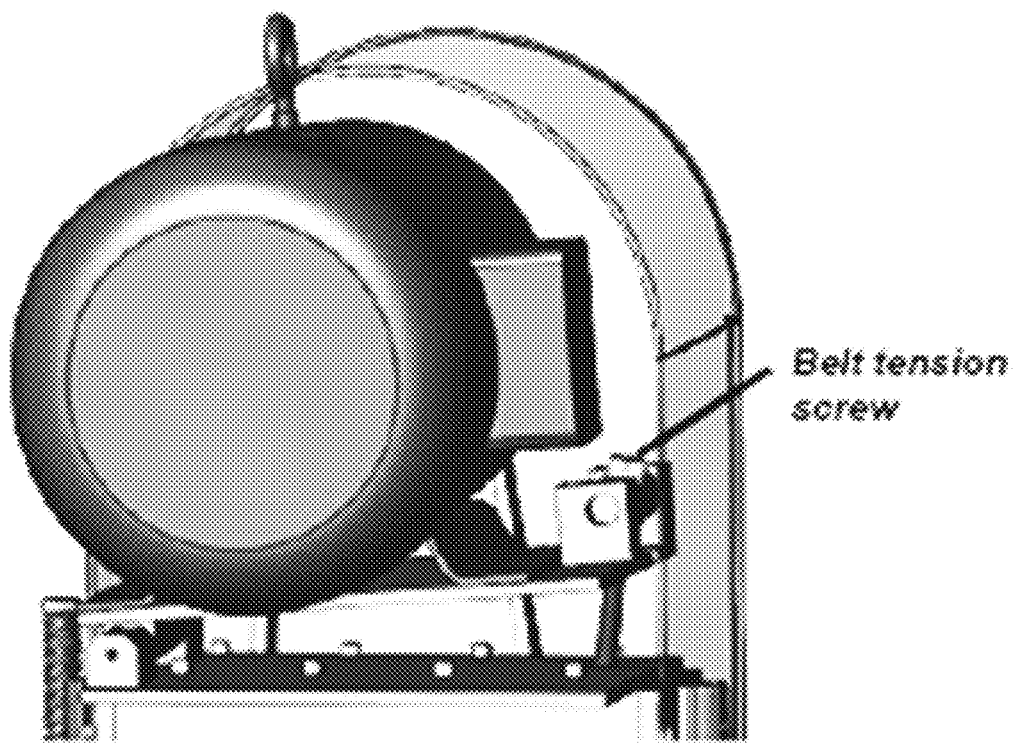
Figure 1:
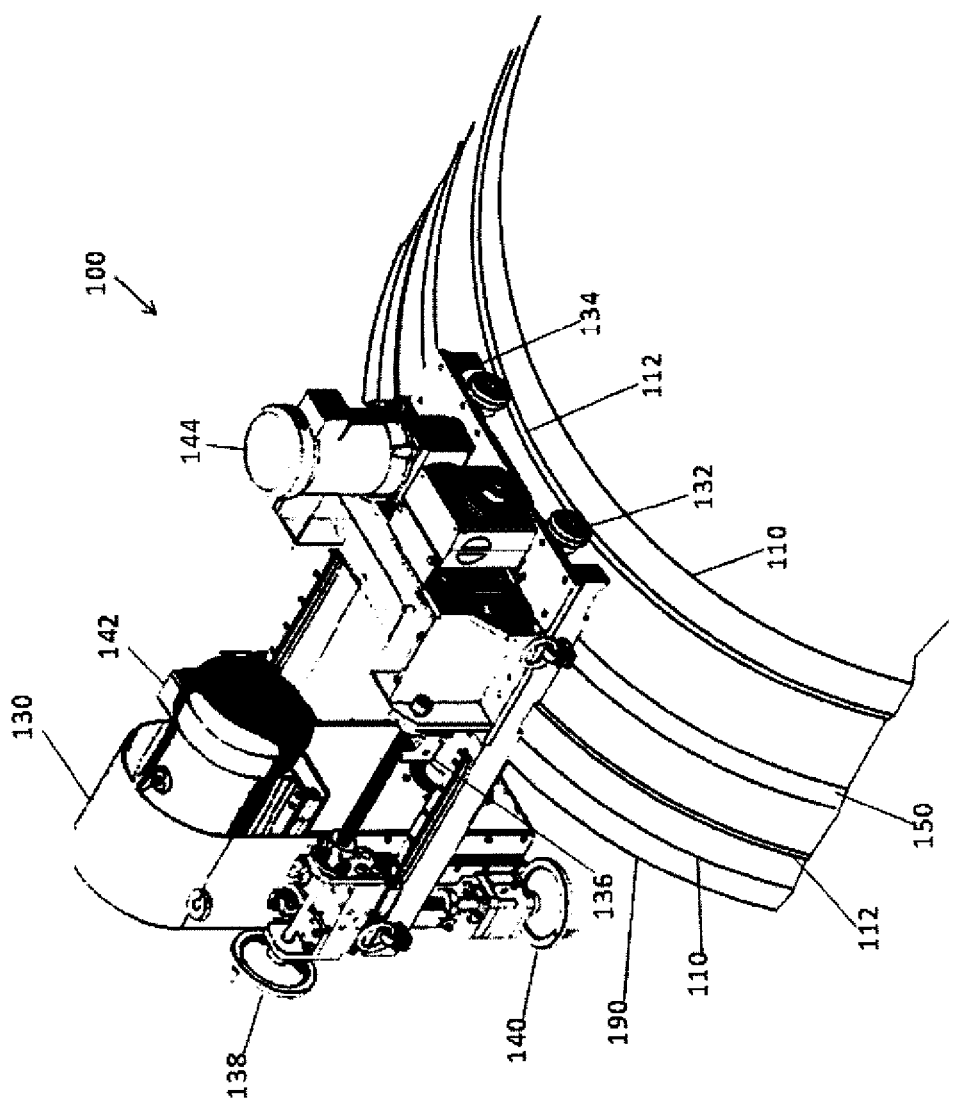
Figure 2:
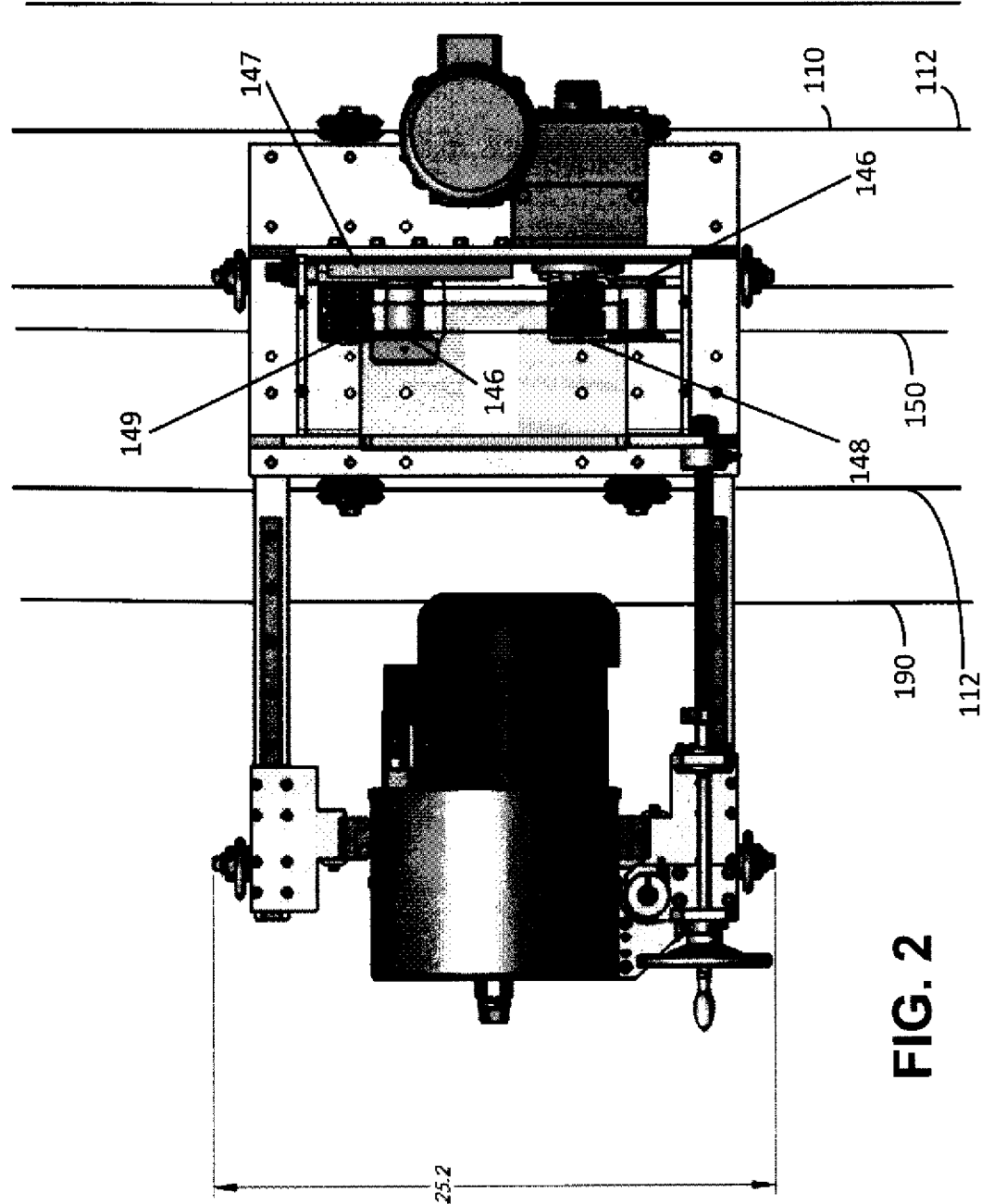
Figure 3:
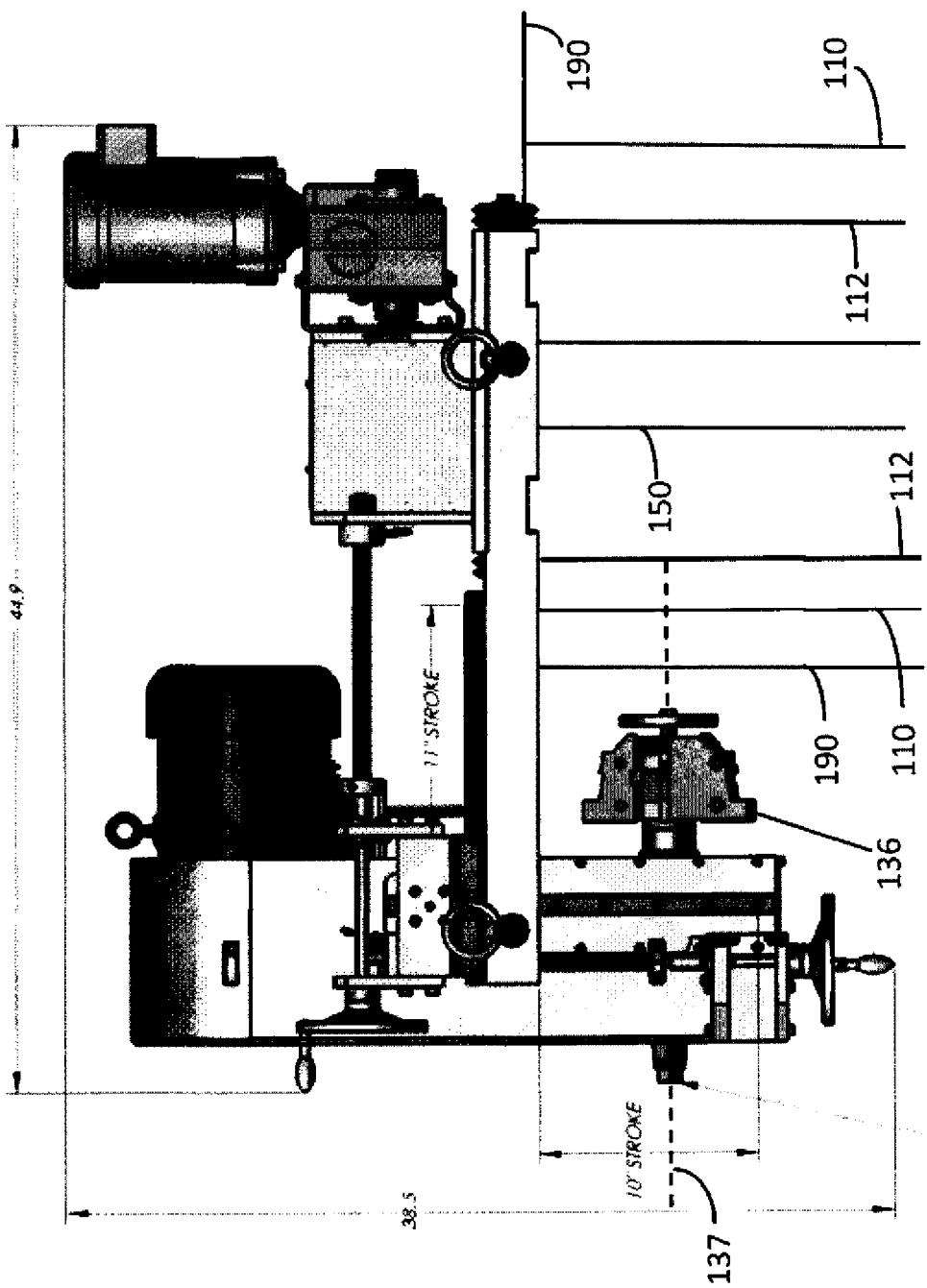
Figure 4:
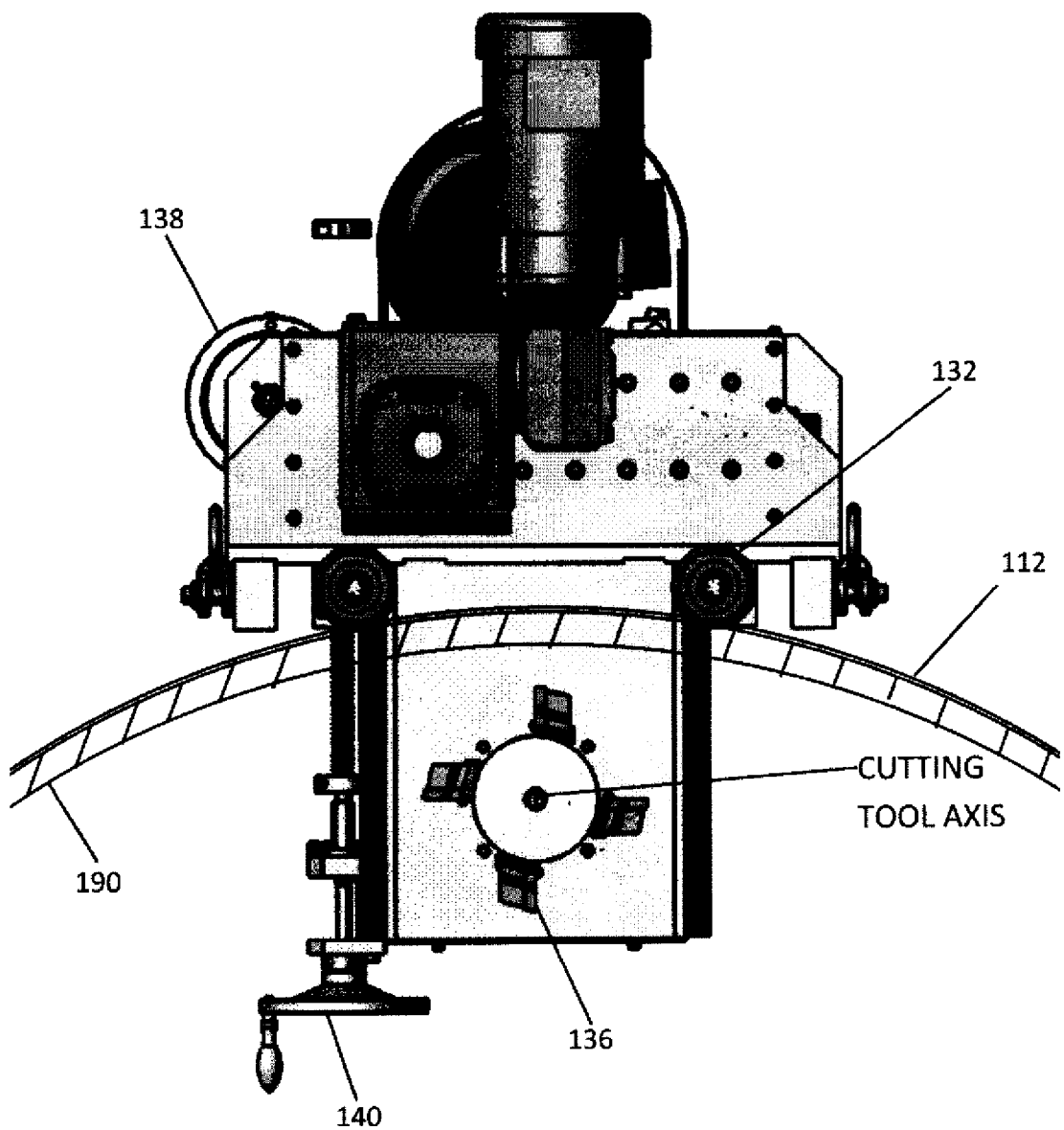
Figure 5:
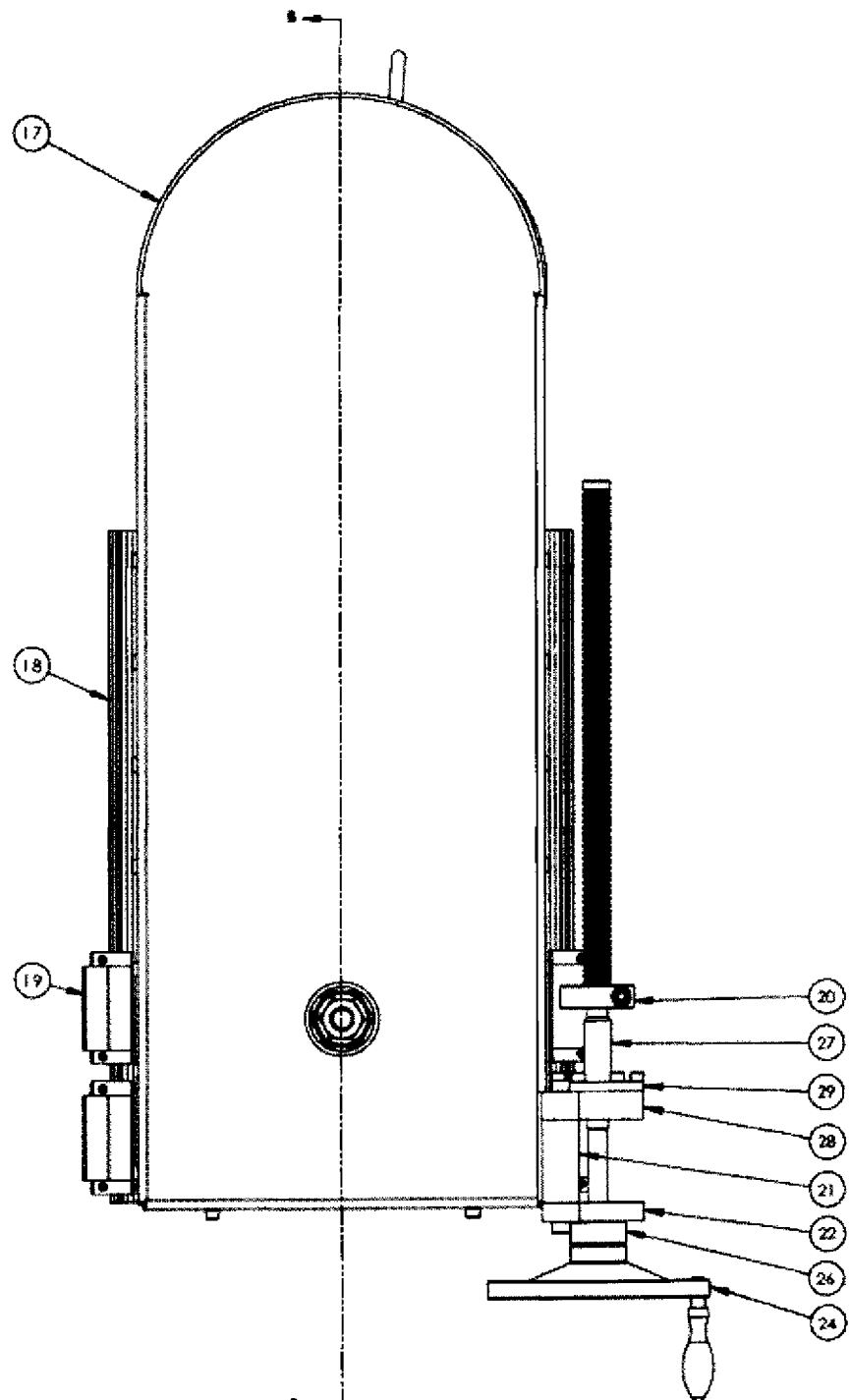
Figure 6:
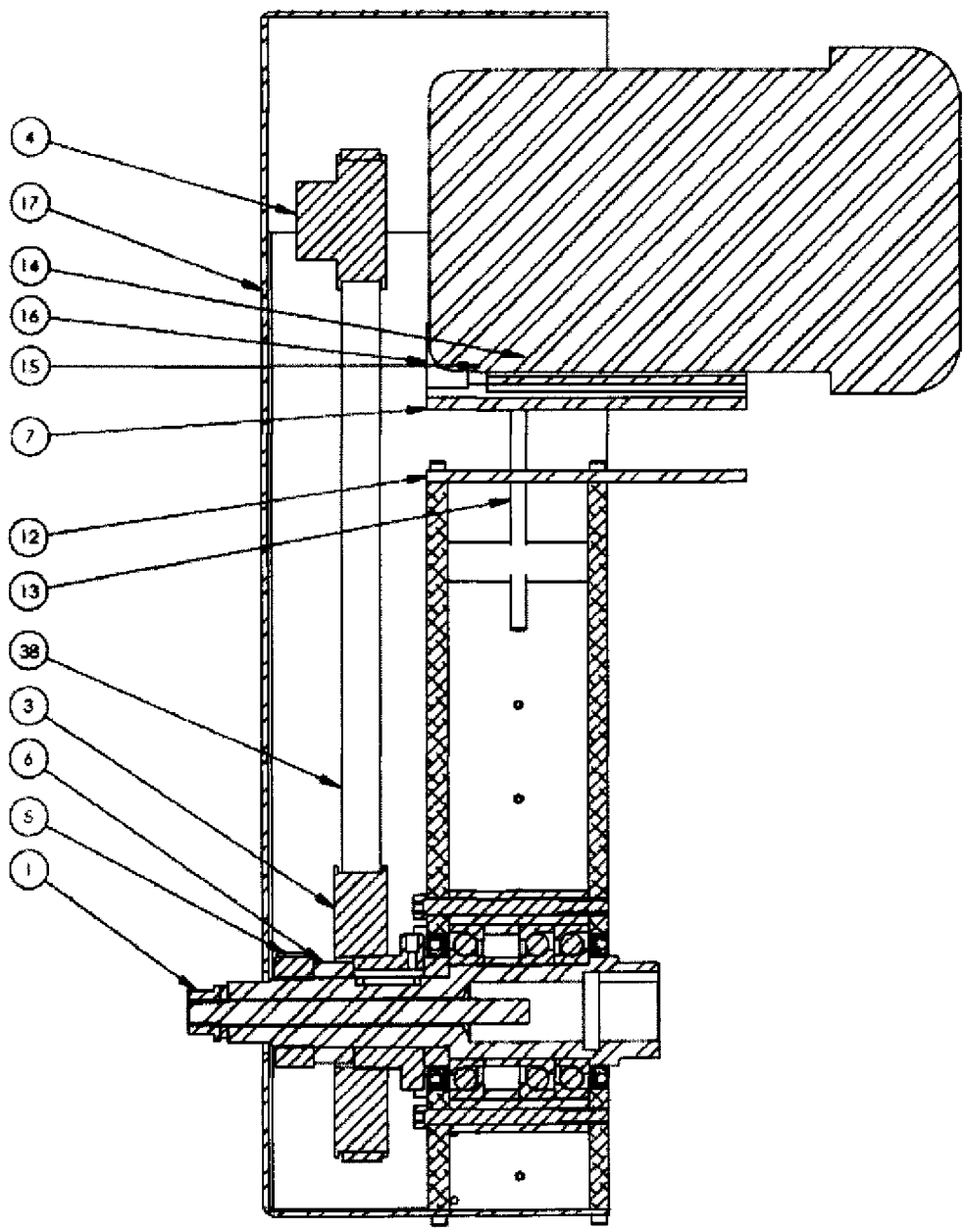
Figure 7:
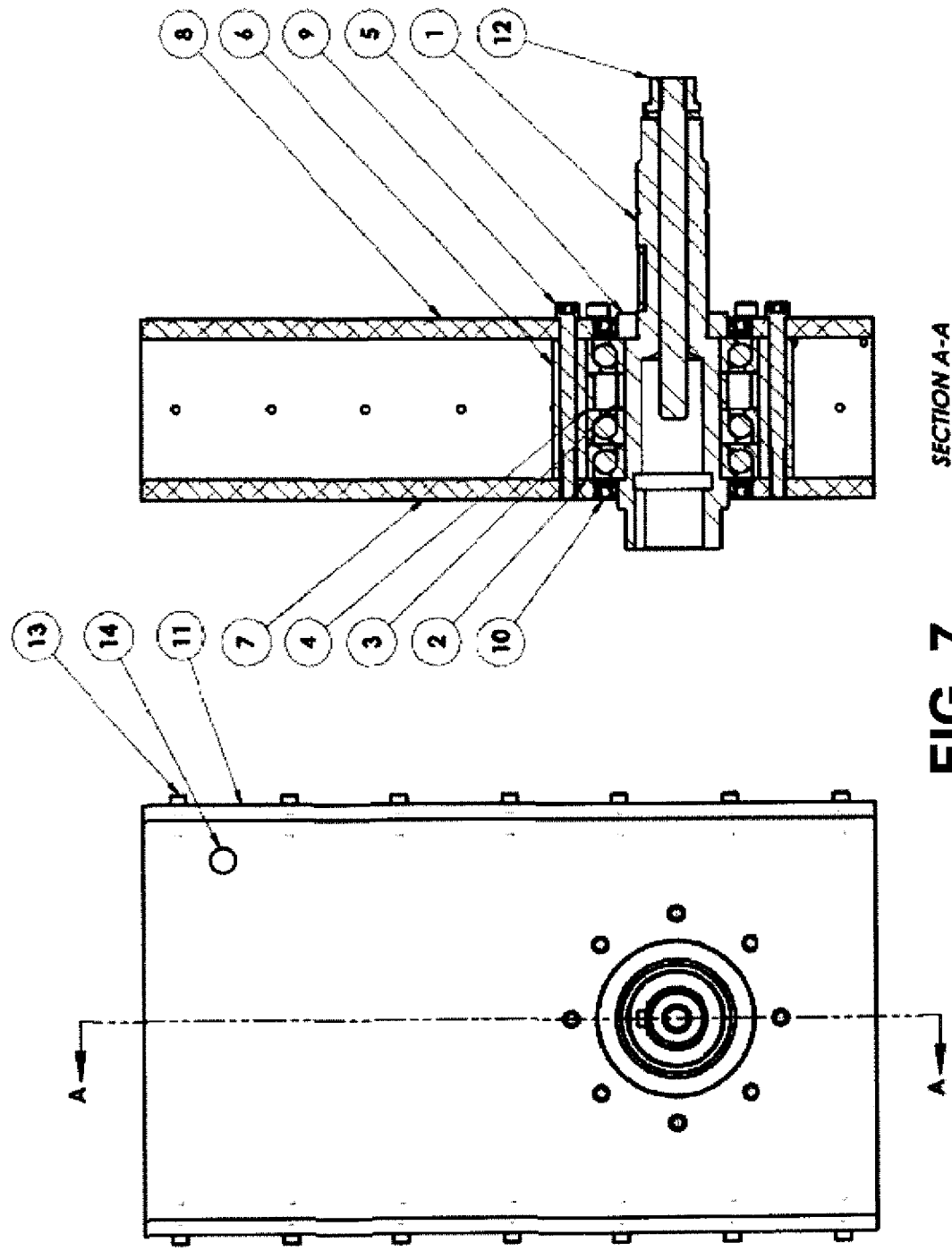
Figure 8:
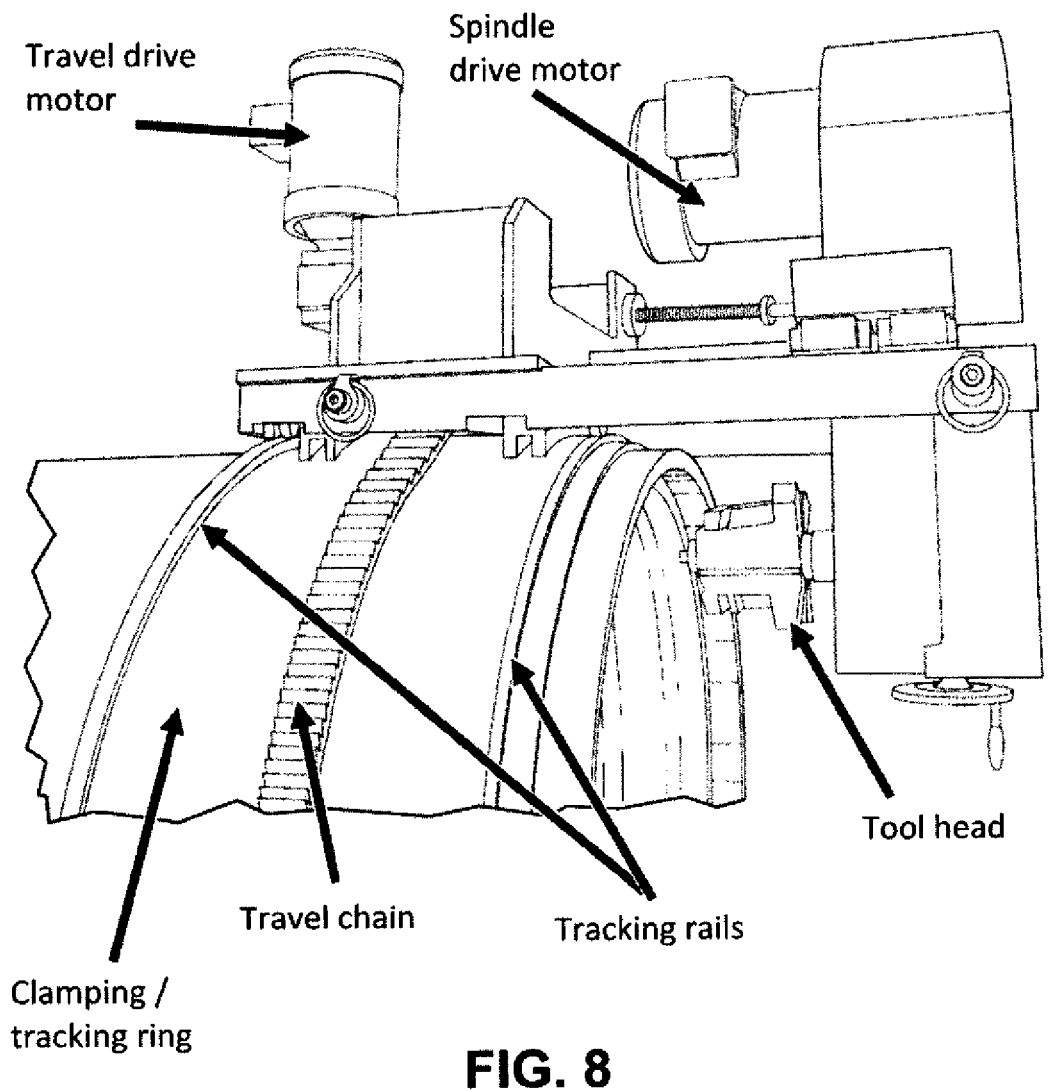
Figure 9:
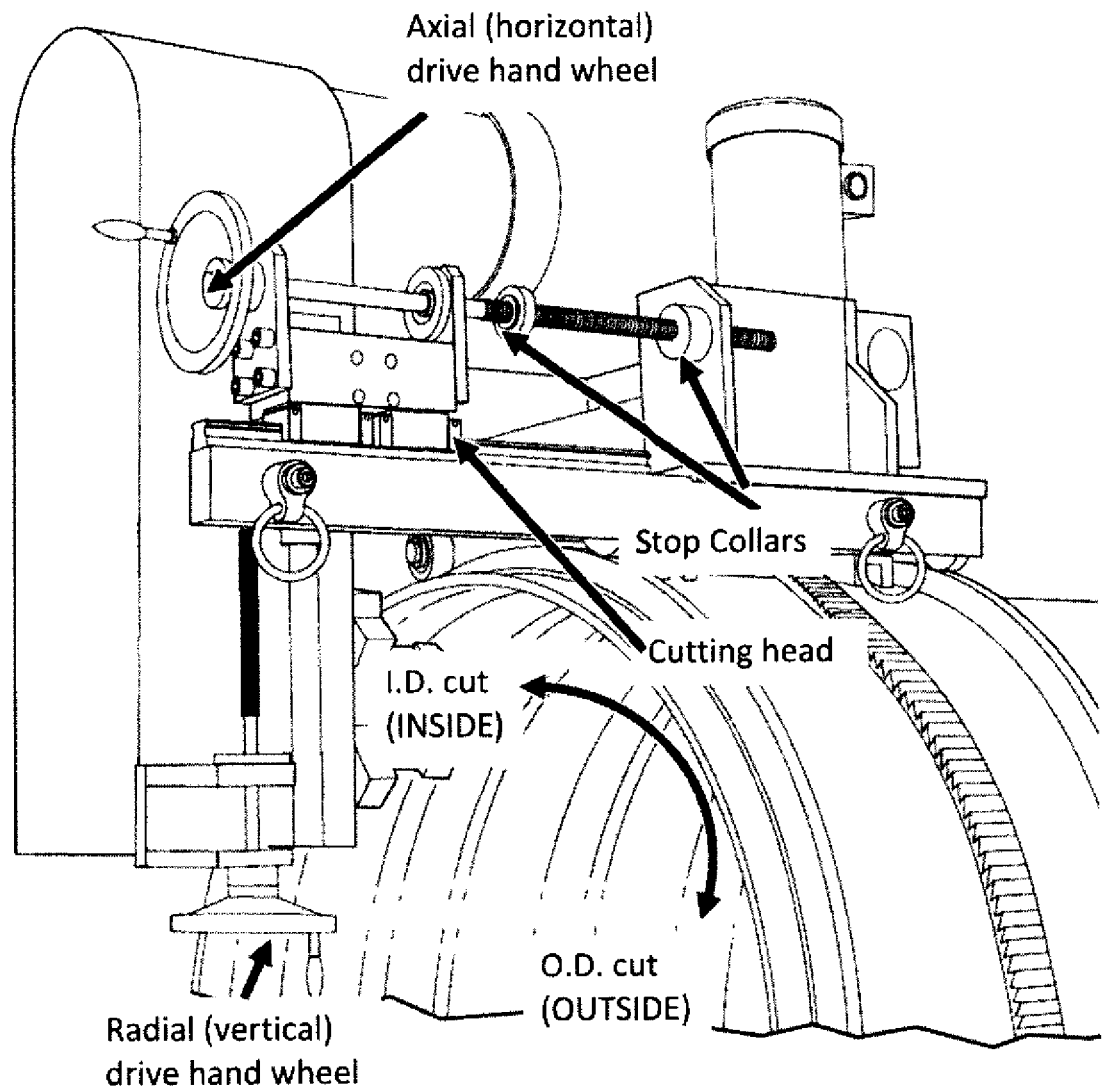
Figure 10:
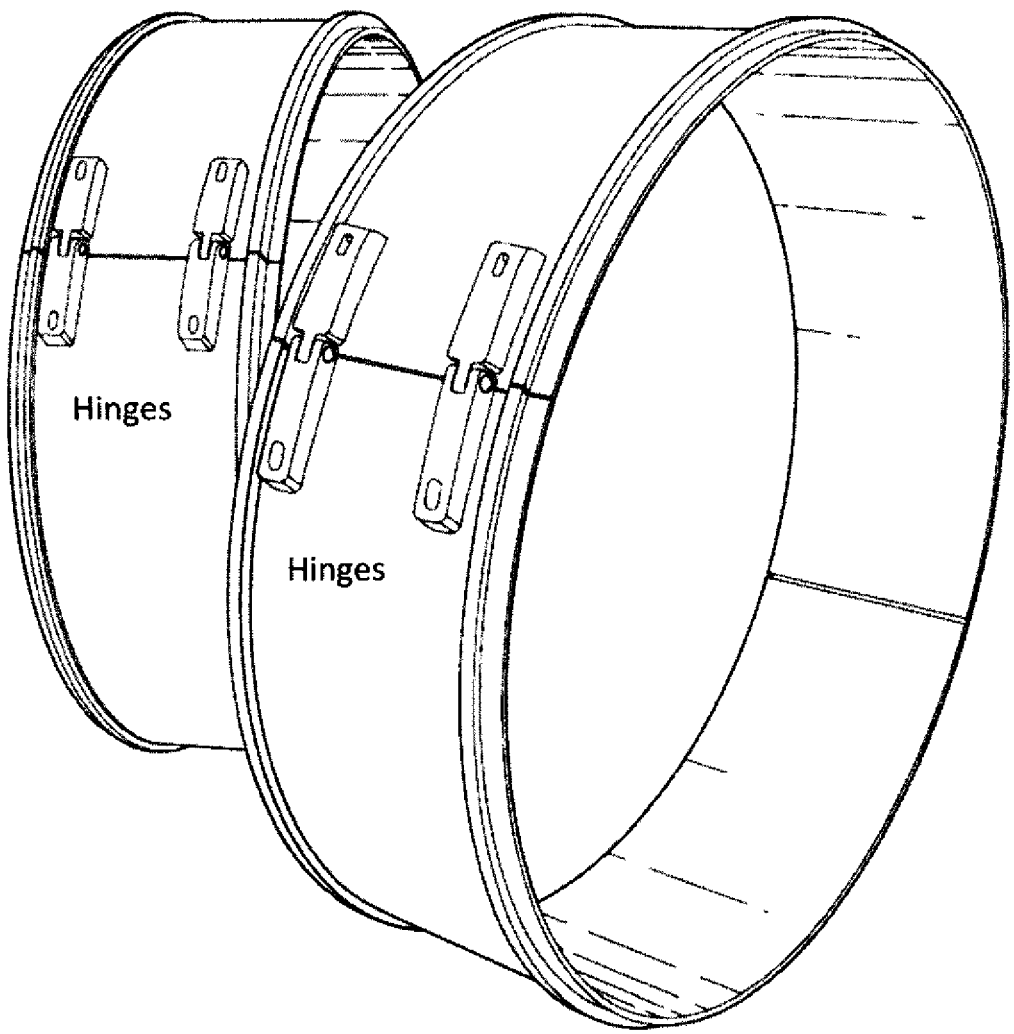
Figure 11:
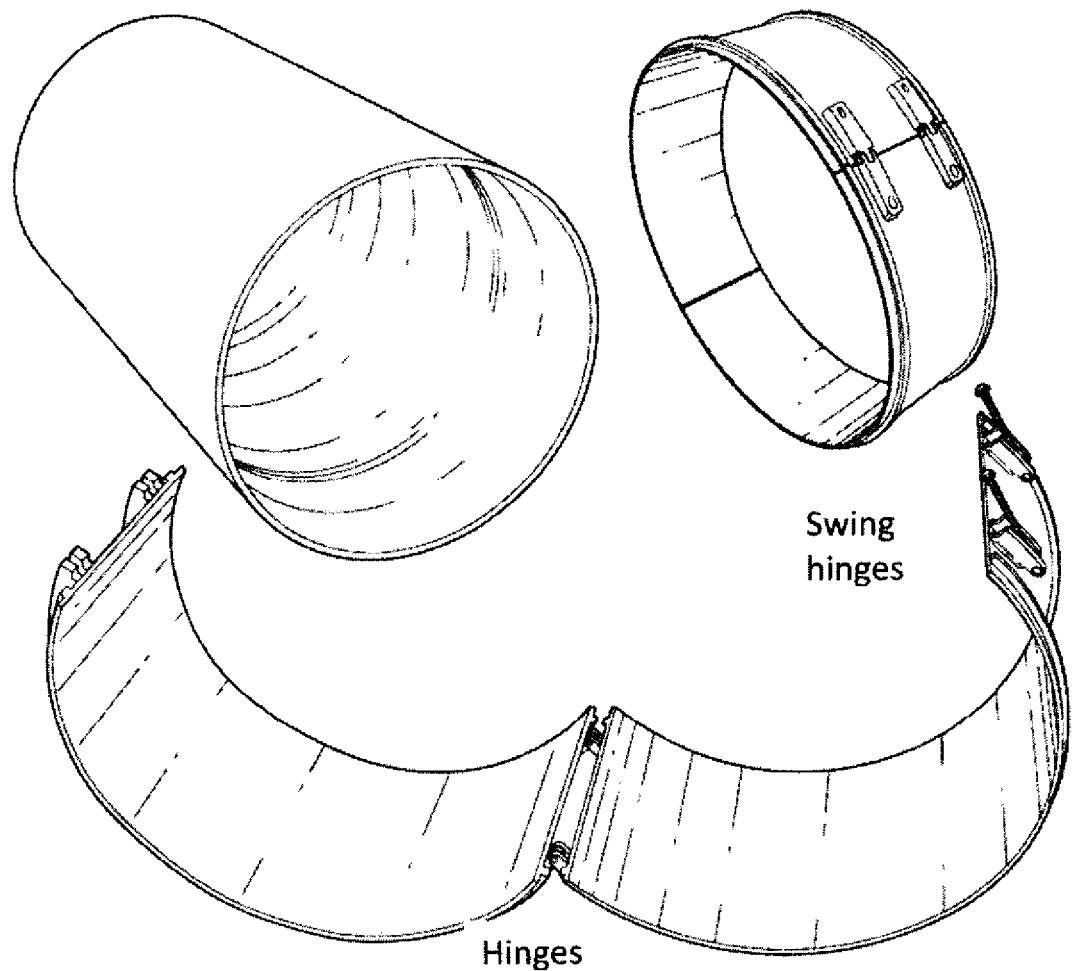
Figure 12:
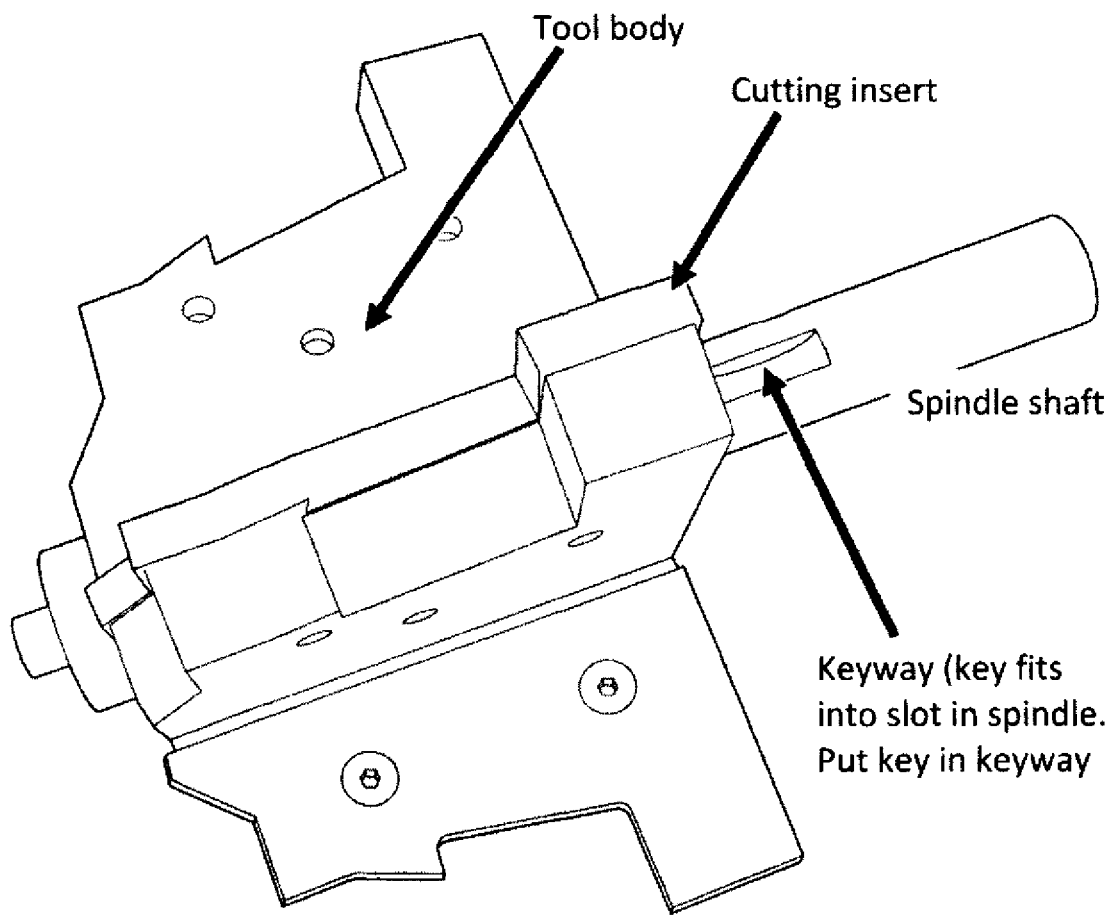
Figure 13:
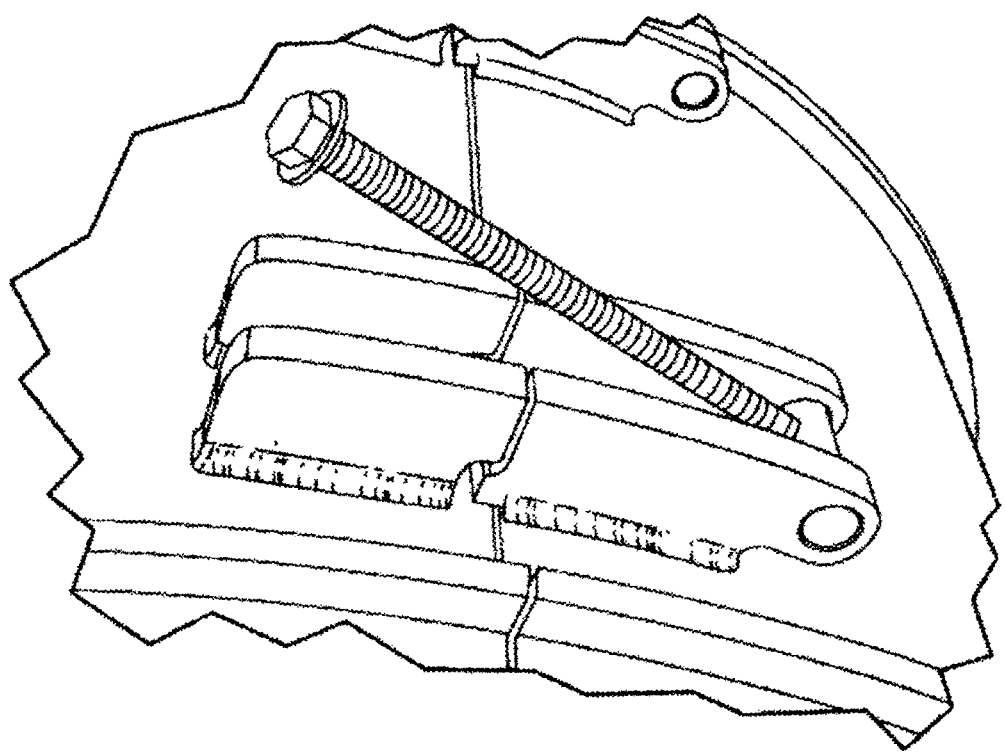
Figure 14:
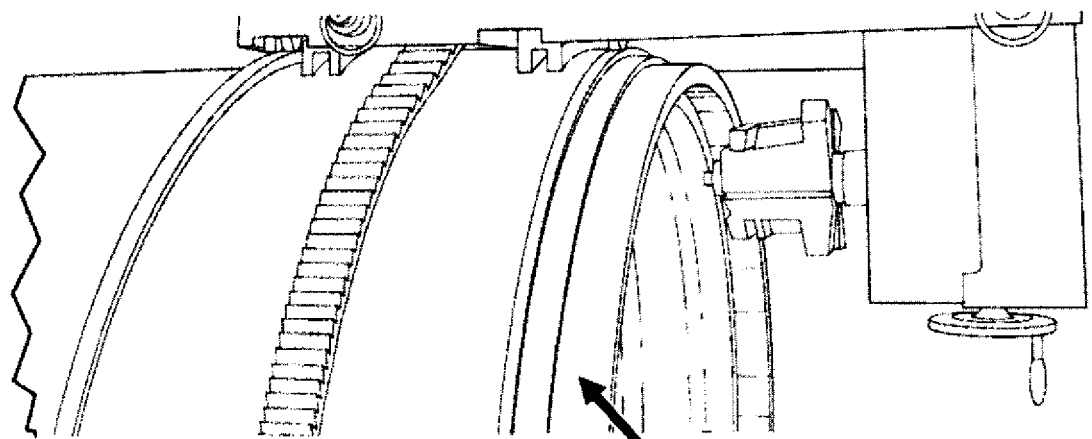
Figure 15:
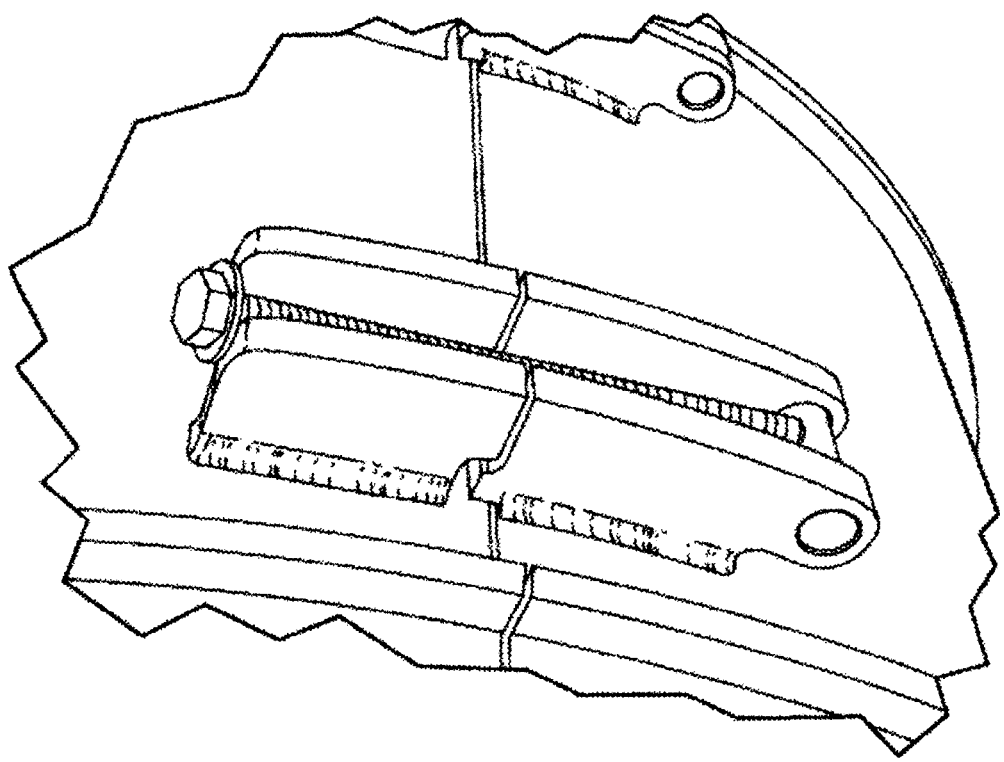
Figure 16:
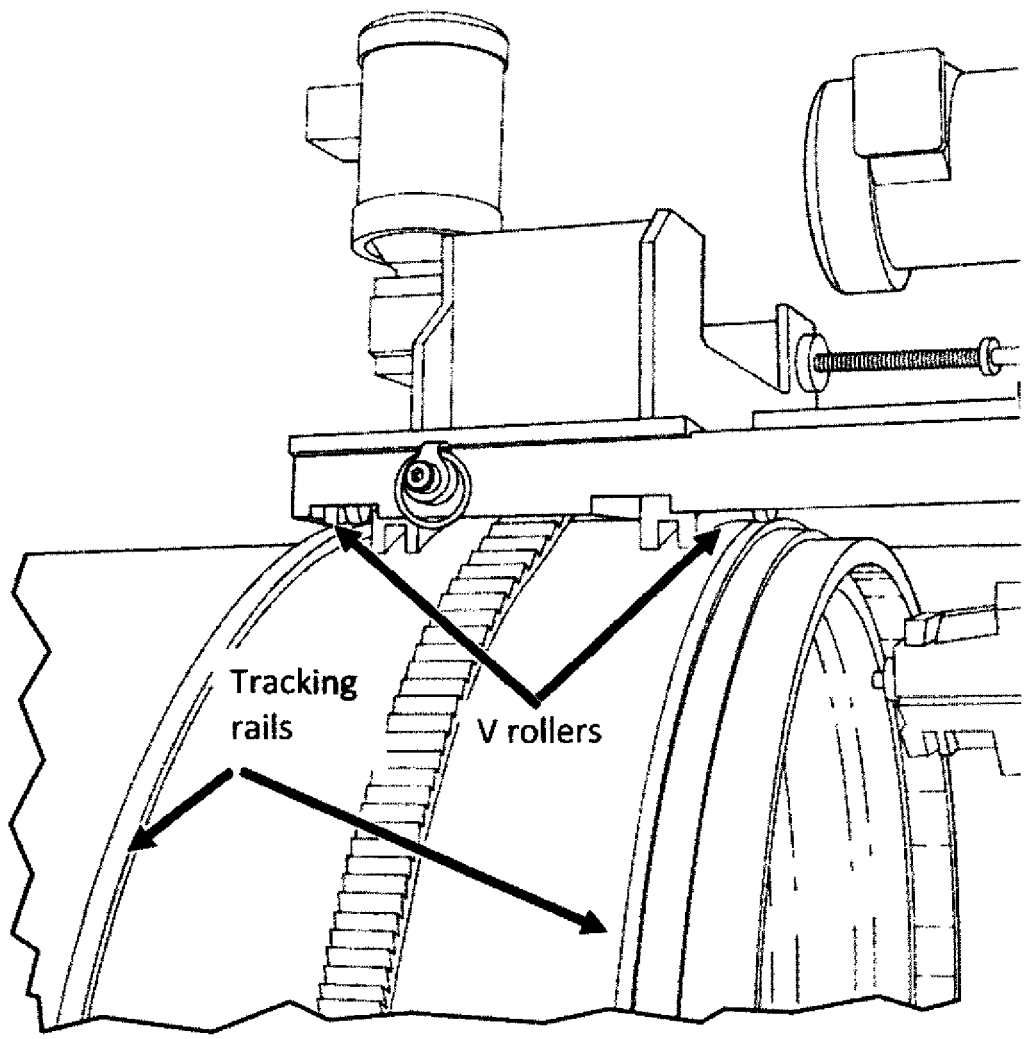
Figure 17:
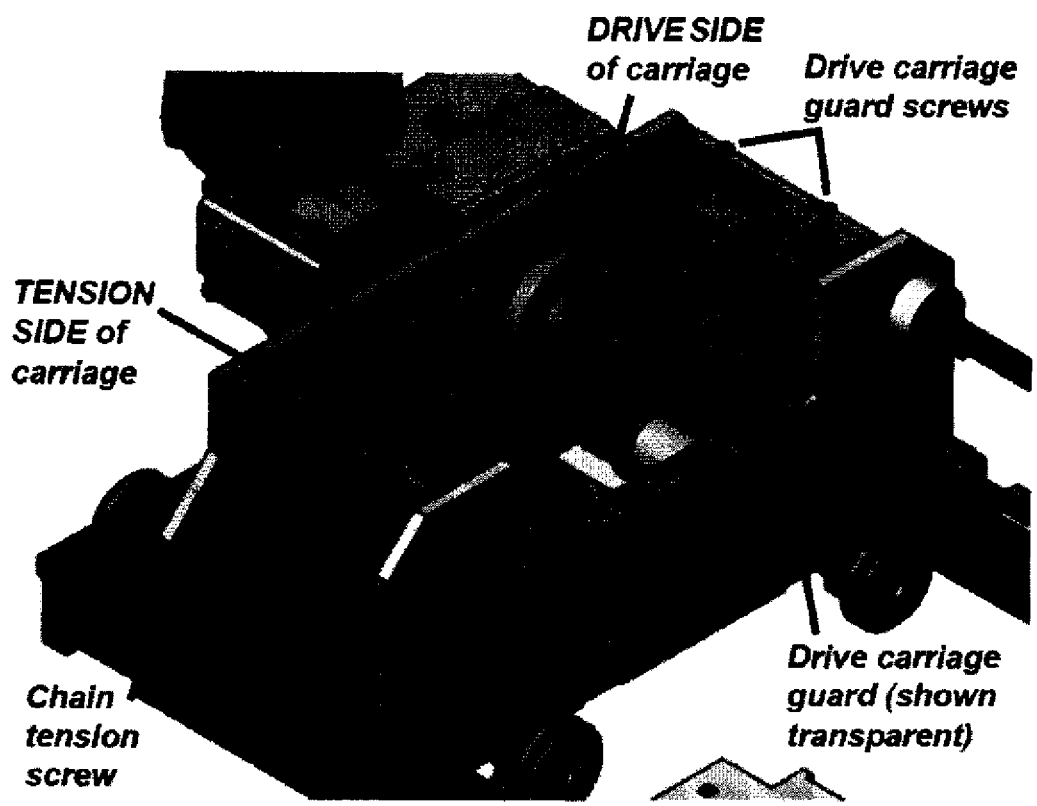
Figure 18:
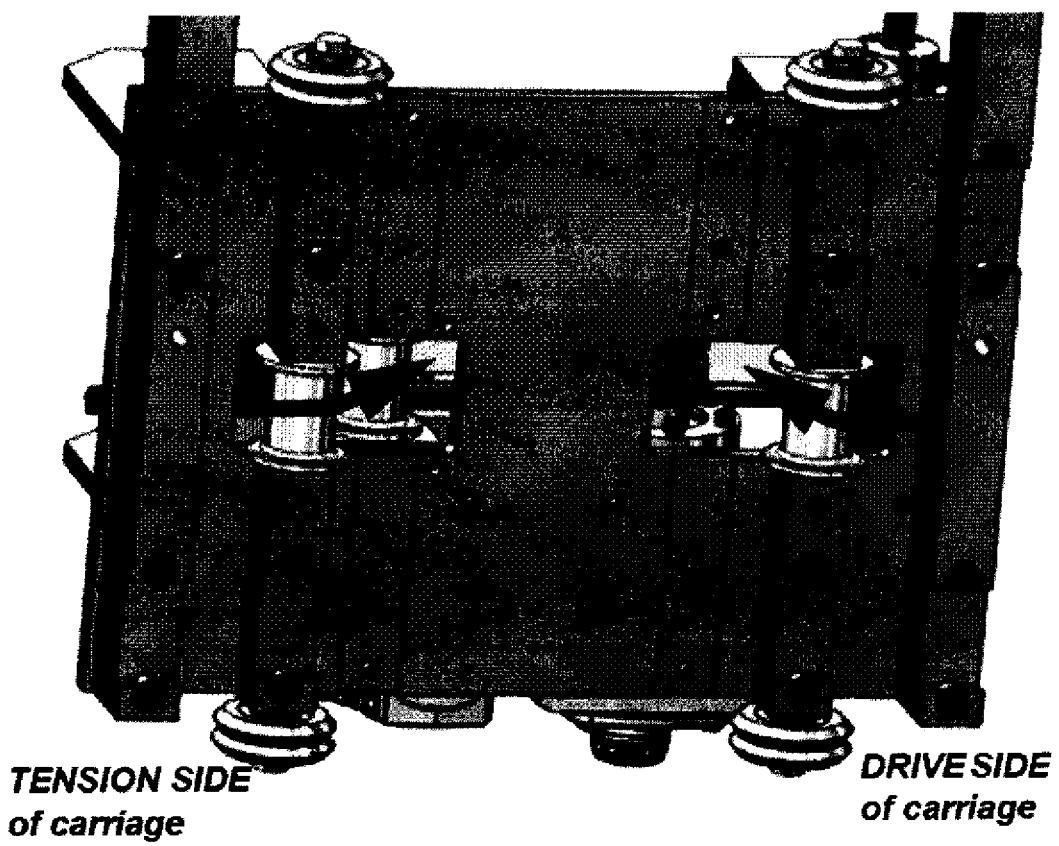
Figure 19:
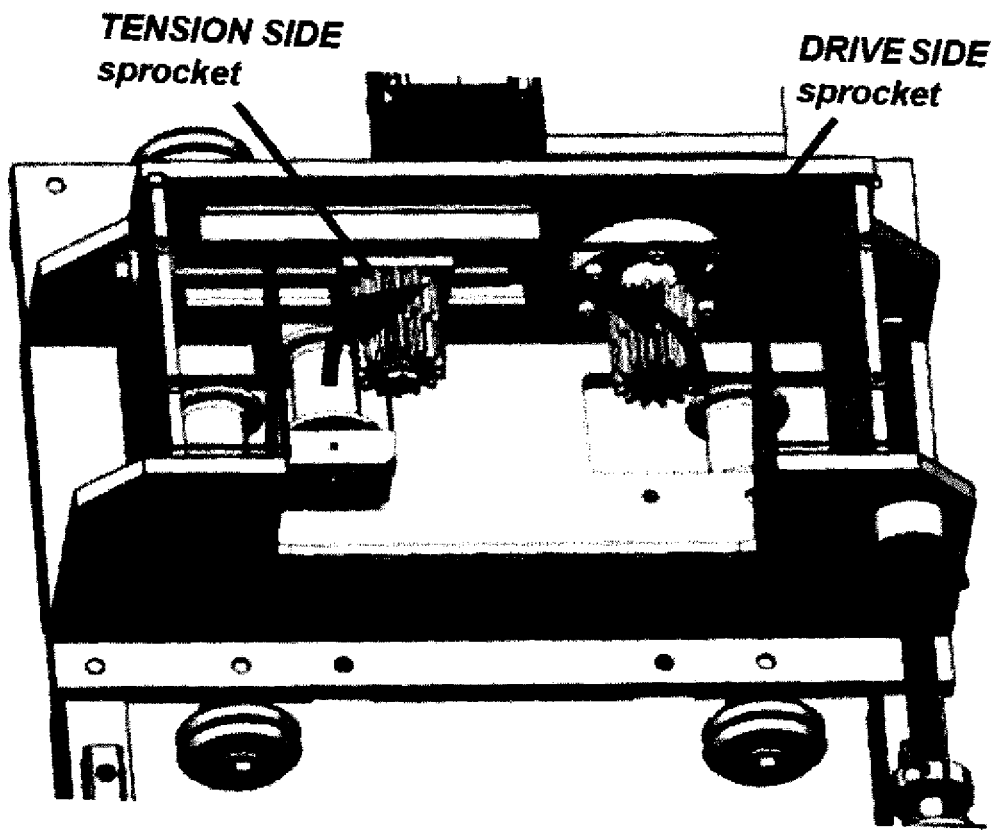
Figure 20:
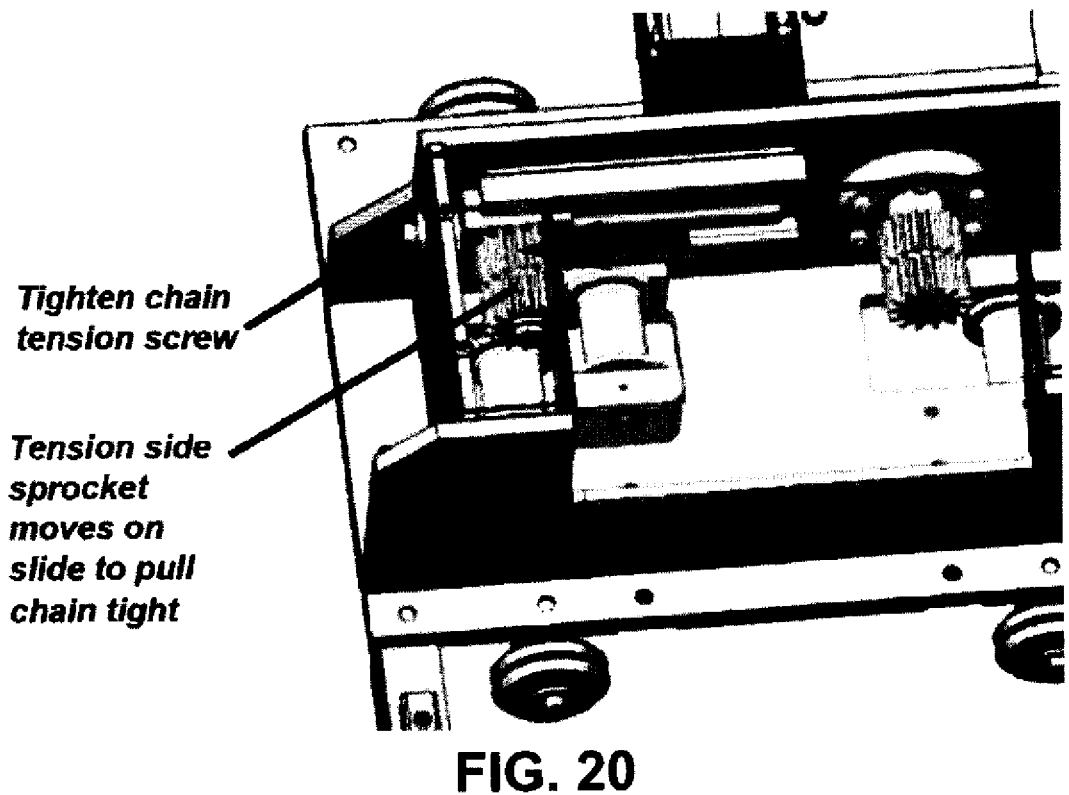

FIG. 17. Loosen the chain tension screw on the drive carriage.

FIG. 18. The drawing shows the bottom of the drive carriage. Wrap the travel chain beneath the rollers and up into the carriage.

FIG. 19. After wrapping the chain under the rollers, wrap it over the top of the sprocket on each side.

FIG. 20. Tighten the chain tension screw to tension the travel chain.

Figure 21:
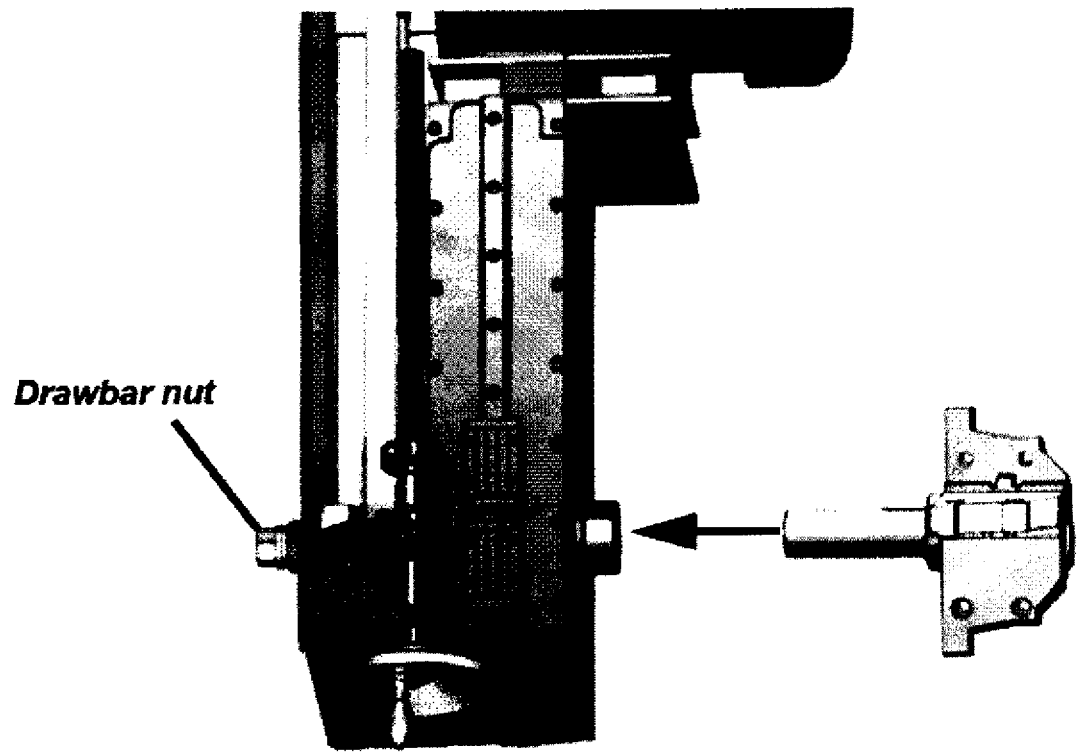

FIG. 21. Insert the spindle shaft into the spindle, and tighten the drawbar nut to secure the tool head.

Figure 22:
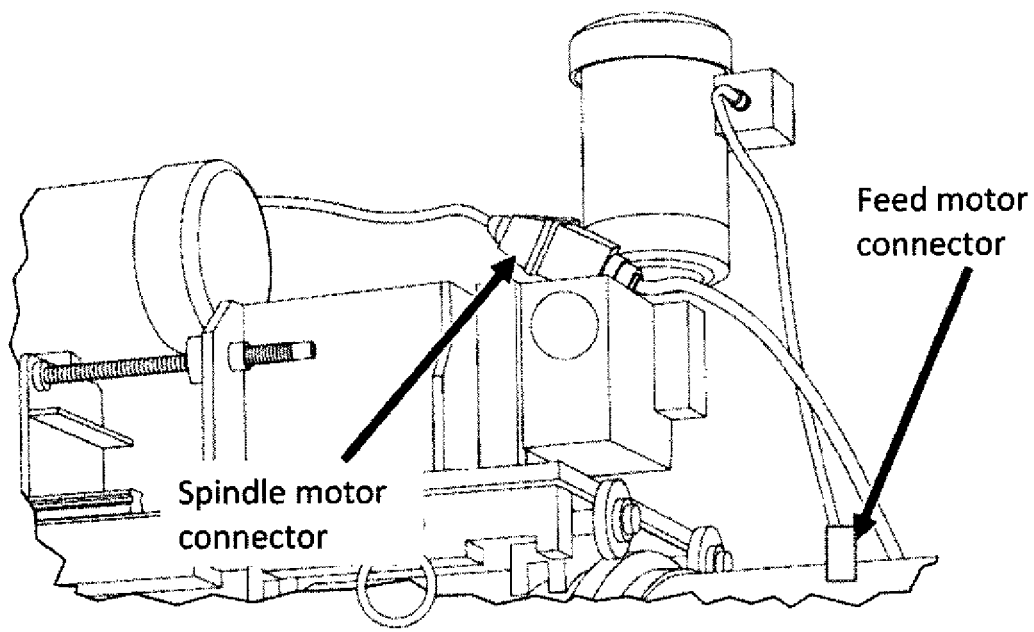

FIG. 22. Connect the power cables to the motors.

Figure 23:
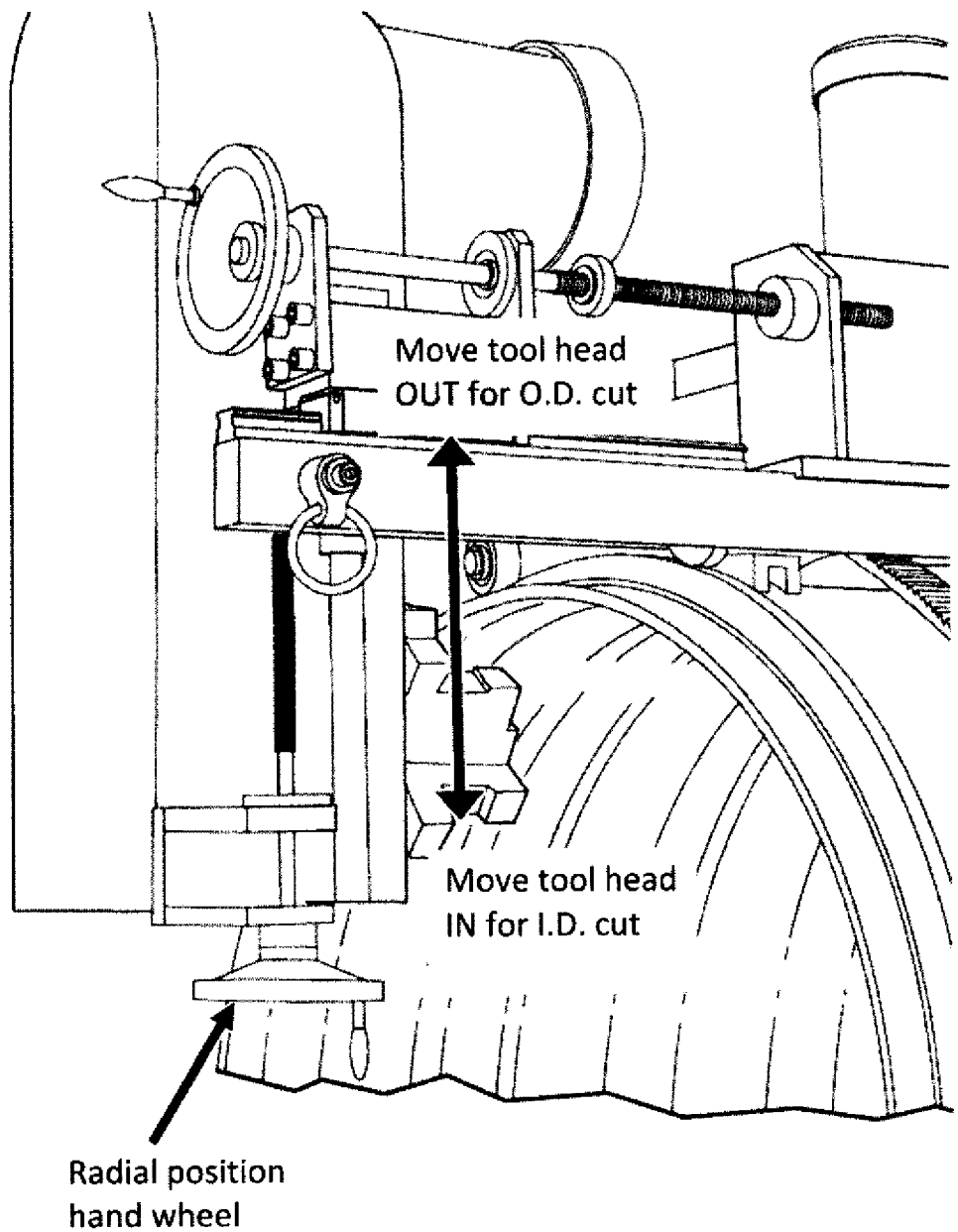

FIG. 23. Turn the radial hand wheel to position the tool head for either an O.D. cut or an I.D. cut.

Figure 24:
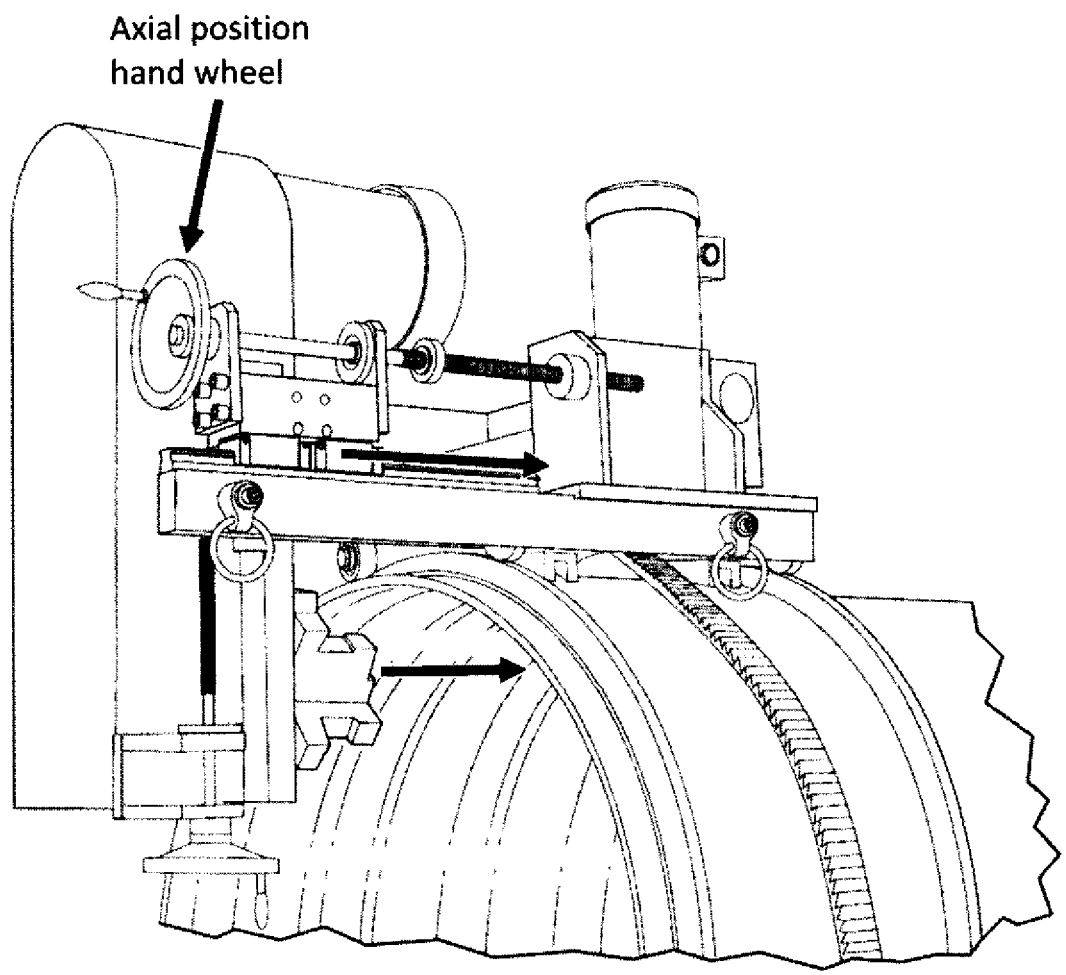

FIG. 24. Use the axial hand wheel to move the tool head into position for the cut.

Figure 25:
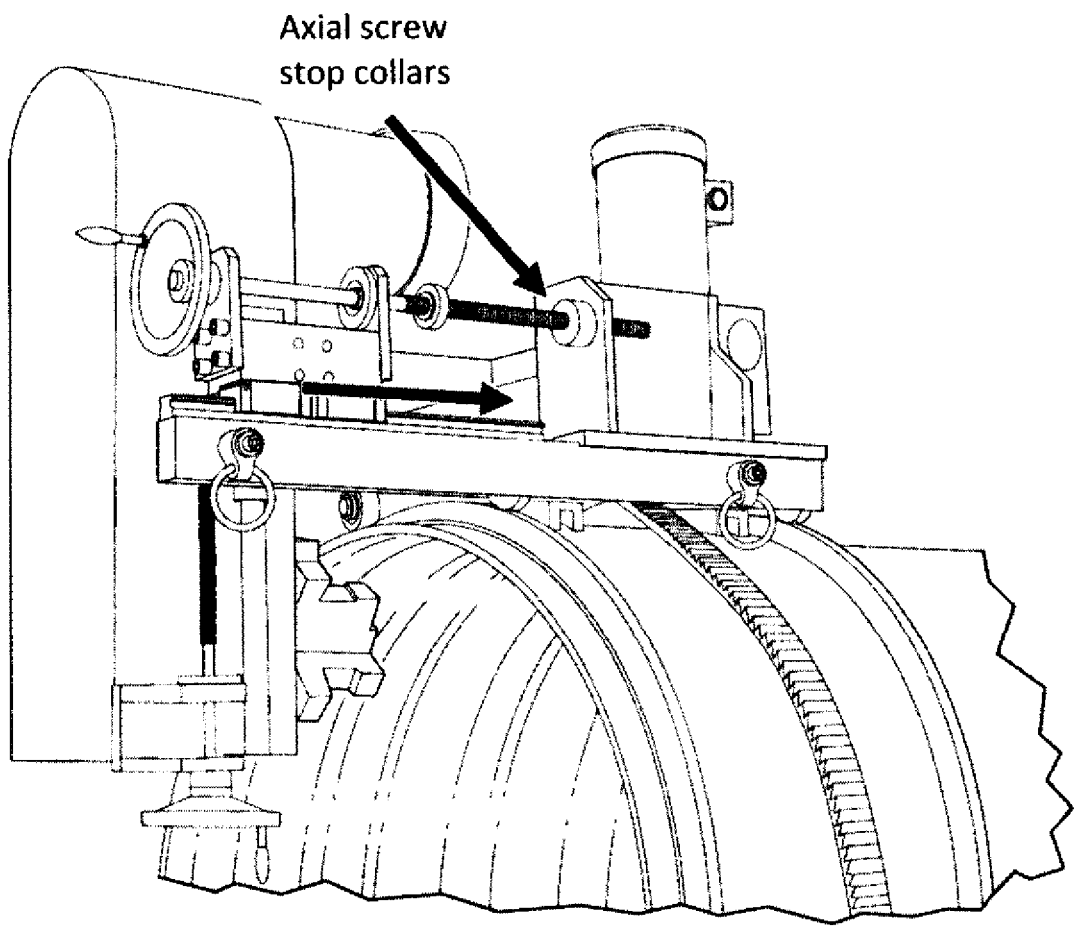

FIG. 25. Move the stop collars to both ends of the feed screw to hold the axial position.

Figure 26:
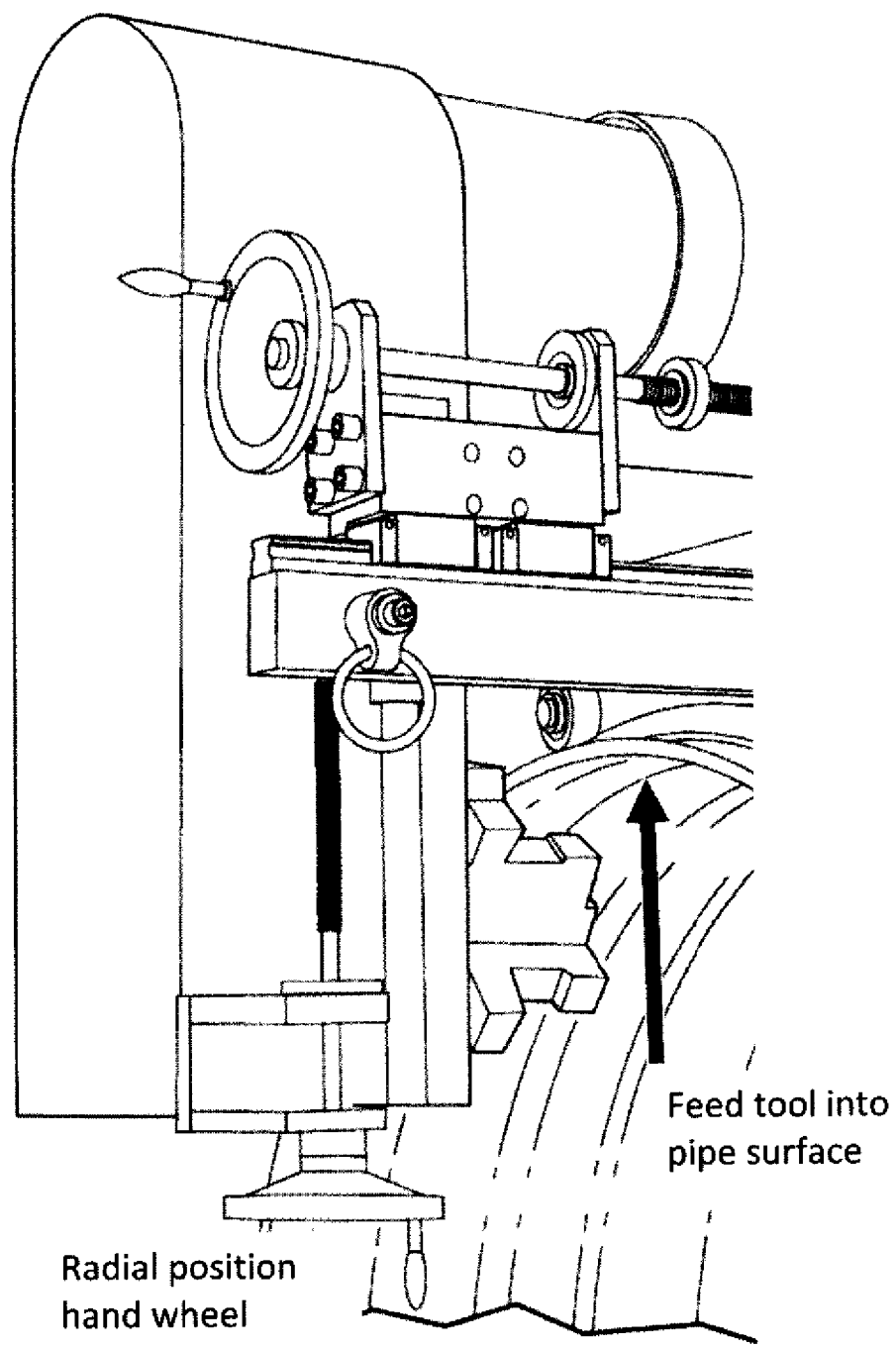

FIG. 26. Turn the radial hand wheel to feed the tool to the required cutting depth.

Figure 27:
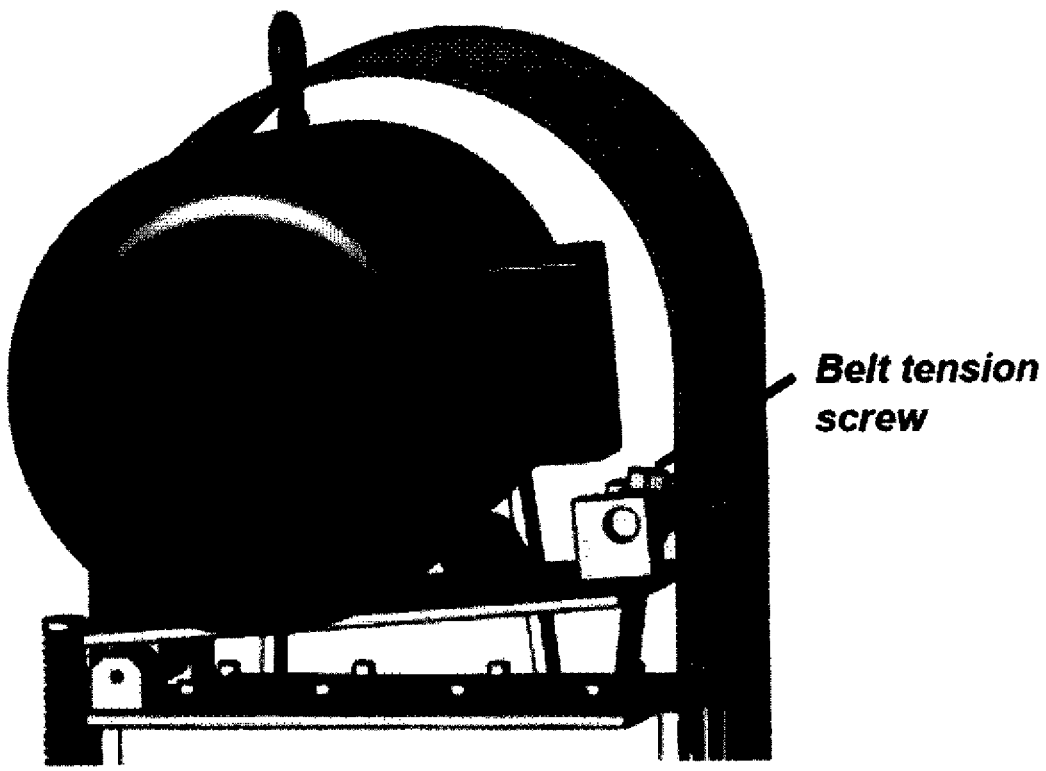

FIG. 27. Set the spindle drive belt tension using the belt tension screw.

DETAILED DESCRIPTION OF THE ILLUSTRATED EMBODIMENTS

For the purposes of promoting an understanding of the principles of the disclosure, reference will now be made to one or more embodiments illustrated in the drawings and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to "advantages" provided by some embodiments, other embodiments may not include those same advantages, or may include different advantages. Any advantages described herein are not to be construed as limiting to any of the claims.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Depicted in FIGS. 1-7 is a pipe cutter 100 according to one embodiment of the present disclosure. Pipe cutter 100 includes a clamp 110 and a cutting device 130. Clamp 110 securely mounts to the pipe that is being cut (pipe 190) and guides cutting device 130 as it travels radially around pipe 190. Although clamp 110 is depicted as connecting to the outer surface of 190, alternate embodiments provide a track that contacts the inner surface of pipe 190 and allows the cutting device 130 to move along the inner surface of pipe 190.

Clamp 110 can include two semicircular halves that are hinged to one another, and the non-hinged end of the each semicircular half may be connected to one another with a clamping mechanism that allows for secure attachment of clamp 110 to pipe 190. Clamp may be constructed of a sturdy material, such as sheet metal, to provide additional support to pipe 190 when clamp 110 is attached. Using a rigid clamp 110 can provide additional support to pipe 190, which may have particular benefits in situations where pipe 190 is manufacture from soft material, such as most plastics, and could otherwise bend while being shaped. Still other embodiments include alternate forms of clamp 110 that facilitate easy installation and removal of clamp 110 from pipe 190, such as clamps with more than two curved portions, or flexible clamps such as those manufacture from belt or chain type material.

In the illustrated embodiment, clamp 110 also includes optional guides 112 that maintain the location of cutting device 130 along the axis of pipe 190 as cutting device 130 rotates radially around pipe 190. In the illustrated embodiment guides 112 are raised sections that are received by guide rollers 132 on cutting device 130—the guide rollers 132 including complimentary grooves that receive guides 112. Alternate embodiments include other forms of guides, such as channels.

Cutting device 130 also includes a clamp connector 134 and a cutting head 136 (sometimes referred to as a milling head). Clamp connector 134 connects cutting device 130 to clamp 110, and cutting head 136 removes portions of pipe 190. Cutting device 130 may also include an axial adjustment 138 (sometimes referred to as a horizontal adjustment) and a radial adjustment 140 (sometimes referred to as a vertical adjustment) that moves cutting head 136 relative to connector 134 in the direction of the pipe's axis or in the direction of the pipe's radius, respectively.

Pipe cutter 100 also includes one or more motors for operating the cutting head 136 to remove portions of pipe 190 and moving cutting device 130 along clamp 110. Two separate motors (cutting tool motor 142 and travel motor 144) are depicted as being mounted to cutting device 130, although alternate embodiments include a single motor for both rotating cutting head 136 and moving cutting device 130 relative to clamp 110. FIG. 6 depicts the drive belt powered by cutting tool motor 142, which turns the cutting head 136 attachment mechanism and, as a result, turn the cutting head 136.

Also depicted in FIGS. 1-7 is a belt 150 that may be used in some embodiments to securely hold cutting device 130 to clamp 110 and allowing cutting device 130 to move along clamp 110. In the illustrated embodiment, belt 150 is constructed of metal links (and may be referred to as a chain), although in alternative embodiments belt 150 may be constructed of other types of materials that provide sufficient tensile strength to hold cutting device 130 to clamp 110, for example, various types of cables or cords that may or may not be coated with additional protective material such as those found in various types of engine and/or drive belts.

In use, clamp 110 is attached to pipe 190 with sufficient pressure to inhibit clamp 110 from moving with respect to pipe 190 as the cutting device 130 moves around clamp 110 (and, therefore pipe 190) and removes portions of pipe 190. The guide rollers 132 of cutting device 130 are registered with the corresponding guides 112 on clamp 110 and belt 150 is placed around clamp 110 and attached to cutting device 130. As an example of the connection between belt 150 and cutting device 130, belt 150 may be registered with drive gear 148 and tension sprocket 149 of cutting device 130 as depicted in FIG. 2. Belt 150 may also be fed around two rollers 146 (see FIG. 2). Tension sprocket 149 may be moved along tension track 147 until belt 150 is taught and holds cutting device 130 securely against clamp 110.

Once cutting device 130 is securely connected to clamp 110, an operator can move the axial adjustment 138 and the radial adjustment 140 to position cutting head 136 in an appropriate location to remove material from pipe 190. Cutting head 136 may be rotated while being positioned against pipe 190. Cutting head 136 is rotated about its axis 137 to remove material from pipe 190. Cutting head 136 is placed in the appropriate position to remove the desired amount of material from pipe 190 and, as cutting head 136 rotates about axis 137, the operator can engage the drive gear 148 and begin moving cutting device 130 along clamp 110 and around pipe 190. As cutting device 130 moves along clamp 110, the rotating cutting head 136 cuts away portions of pipe 190 to form the desired shape.

Depending on the location of cutting head 136 (as positioned using axial adjustment 138 and radial adjustment 140), cutting head 136 can remove material from the outer surface of pipe 190 (thereby forming the male end of a pipe fitting) or removing a portion of the inner surface of pipe 190 (thereby forming a female end of a pipe fitting).

Cutting head 136 may be removed and replaced by another cutting head with a different shape if a different shape is desired.

The shape of cutting head 136 determines the shape of the portion of the pipe shaped by cutting head 136. In at least one embodiment, the cutting head forms a multi-channeled surface. See, e.g., FIG. 3 and FIG. 12. In at least one embodiment, the multi-channeled surface is one portion of a snap fitting (also referred to as a snap coupling), wherein two pipe ends formed with complimentary portions of a snap fitting mate with one another and as the two pipes are moved together the force resisting the movement of the two pipes together increases (such as by the inner diameter of the female portion increasing and/or the outer diameter of the male portion decreasing) until the resistance rapidly decreases (or disappears) as the two pipes snap together. In some embodiments, the same cutting head may be used to form the male and female portions, the difference being whether the cutting head is positioned to remove material from the outer surface of the pipe to form a male portion or from the inner surface of the pipe to form a female portion. In other embodiments, one type of cutting head is used to form a male portion and another type of cutting head is used to form a female portion.

In the illustrated embodiment, cutting head 136 is a four-bladed cutting head. In alternate embodiments, cutting head may have more or less than four (4) blades. However, since many embodiments utilize cutting head 136 as a milling device (sometimes referred to as a router), cutting head 136 frequently has no more than eight (8) blades, and frequently has fewer blades than the number of teeth that would be used to cut through a pipe using a planar circular saw blade.

When cutting head is configured as a milling head (typically 16 or less blades), pipe 190 will typically be made of plastic or another type of relatively soft material that allows milling. Metal pipe (for example, steel or ductile iron) is frequently too robust of a material to lend itself to efficient milling.

Cutting device 130 may be attached to and operated on a stationary pipe (e.g., a pipe that does not rotate) with cutting device 130 moving radially around clamp 110 and pipe 190. Alternatively, pipe 190 may be rotated at the same speed that cutting device 130 is moving across the surface of pipe 190 to maintain cutting device 130 in the same radial and/or axial orientation with respect to pipe 190.

In at least one example embodiment, a mechanism to rotate pipe 190 includes a number of rollers supporting the bottom of pipe 190 with the rotational axis of the rollers being oriented parallel to the pipe axis. At least one of the rollers (which in some embodiments resemble wheels) may be powered such that rotation of the powered roller (wheel) rotates pipe 190. In still other embodiments, cutting device 130 may be held stationary (such as by connecting cutting device 130 to a rigid support member using a pole or rope) and allowing the travel motor 144 to rotate pipe 190.

Once pipe 190 has been cut/shaped to the desired configuration, pipe cutter 100 may be removed from pipe 190 by disconnecting belt 150, removing cutting device 130 and belt 150 from clamp 110, and removing clamp 110 from pipe 190. Pipe cutter 100 may then be attached to another pipe and the process repeated to cut and/or shape a second pipe.

At least one advantage realized by securely fastening clamp 110 to pipe 190 is that clamp 110 may serve as a stable reference for cutting device 130 as it travels along clamp 110 and pipe 190. This permits use of a relatively small and portable cutting device that may be easily moved to alternate locations. For example, pipe cutter 100 may easily be disassembled into the cutting device and the clamp 100, loaded on a truck and moved over the roadways to an alternate location without requiring additional expense and/or procedures that would be required when carrying an oversized load. With clamp 110 being securely fastened to pipe 190 and cutting device 130 being securely held to clamp 110, the shape cut by cutting head 136 may be accurately controlled facilitating a uniform profile around the entire circumference of the pipe. Moreover, since clamp 110 and cutting device 130 are mounted to the pipe, imperfections in the pipe's shape are automatically compensated, for example, cutting device 130 will provide a uniform shape on the end of pipe 190 even in situations where pipe 190 is not perfectly round. Moreover, when shaping soft materials such as plastic pipes, clamp 110 reinforces pipe 190 and increases the ability of pipe 190 to resist deformation as cutting head 136 is pressed against pipe 190, facilitating a more uniform shape since the removal of material is consistent around the pipe.

FIGS. 8 through 27 depict one or more embodiments of the present disclosure.

In FIG. 8, manual screw drives with hand wheels are provided for positioning the tool head radially and axially for the cut. Size-specific clamping/tracking rings are provided for each pipe size. These rings hold the HDPE pipe rigid when the machine is mounted, and guide the travel motion for a straight, accurate cut on the pipe end. Each clamping/tracking ring includes a travel chain that is the specific length required for the pipe size.

In FIG. 9, hand wheel drives allow you to position the tool/cutting head axially and radially.

In FIG. 9, the manual drive screws may have adjustable stop collars to set end stop positions. The user can loosen the screw in the collar, move it to the desired position, and retighten the screw.

In FIG. 10, the clamping/tracking rings can fit on the pipe to hold the pipe cutter and guide it as it travels around the pipe. Each ring can be sized for the pipe it mounts on.

In FIG. 11, the clamping rings may be hinged on one side and held together with swing latches on the opposite side. A user may loosen the swing latches to open the clamping ring for mounting on the pipe.

In FIG. 9, the machine can operate in both directions. It can rotate clockwise for an O.D. (OUTSIDE) cut. It can rotate counter-clockwise for an I.D. (INSIDE) cut.

In FIG. 12, the cutting head is made for the cutting profile required. The cutting head consists of a body with spindle shaft and replaceable cutting inserts.

In at least one embodiment, the clamp may be mounted to the pipe as follows:

1. Loosen the swing latch bolts and swing them open. See FIG. 13.
2. Open the clamping/tracking ring. See FIG. 11.
3. Using a lifting device, lift the clamping/tracking ring into place on the pipe. Position the ring near the end of the pipe. See FIG. 14. If you are making an O.D. cut, a user should generally place the ring far enough from the end to avoid contact with the tool head.
4. Close the clamping/tracking ring and swing the latches into place. See FIG. 15.
5. Tighten the swing bolts securely to clamp the ring on the pipe.

Important: Remove the tool head from the spindle before mounting the cutting device. The tool head could strike the pipe during mounting, causing damage to the head or other components.

In at least one embodiment, the cutting device may be mounted to the clamp as follows:

1. To mount the cutting device on the top of the pipe, a user can attach a lifting device (such as a winch) to lifting rings on the sides of the cutting device, at least one embodiment having four (4) lifting rings (one on each side).
2. To mount the cutting device on the side of the pipe, attach a lifting device (such as a winch) to the lifting rings on one side of the frame, at least one embodiment having two (2) lifting rings on one side of the cutting device.
3. Turn the axial hand wheel to extend the axial feed and the mount for the cutting head all the way out. This should provide adequate clearance for mounting the cutting head. See FIG. 9.
4. Lift the cutting device into place so that the guide rollers (V-rollers) are on the guides (tracking rails) on the clamp (which may be referred to as the clamping/tracking ring in some embodiments). See FIG. 16.
5. Loosen the chain (or belt) tension screw on the side of the drive carriage. See FIG. 17.
6. Remove the fasteners (e.g., 4 screws) holding the drive carriage guard in place. Remove the guard.
7. Select the correct length chain for the pipe size, and wrap it around the clamping/tracking ring under the drive carriage of the cutting device.
8. Pull the chain ends up into the drive carriage. Wrap the chain beneath the chain rollers and up into the carriage. See FIG. 18.
9. Connect the end links of the chain and insert a pin through the links to secure the chain.
10. Tighten the chain tension screw on the side of the drive carriage. See FIG. 20.
11. Replace the drive carriage guard. Insert and tighten the fasteners (e.g., 4 screws).
12. Remove the lifting device (e.g., winch) from the cutting device.

In at least one embodiment, the cutting head may be mounted to the cutting device as follows:

1. Assemble the tool inserts on the tool head as required. Put the key in the keyway in the spindle shaft. See FIG. 12.
2. Insert the spindle shaft of the tool head into the spindle, with the key aligned with the slot in the spindle. See FIG. 21.
3. Turn the drawbar nut to thread the drawbar into the spindle shaft. Hold the tool head and tighten the drawbar nut securely.

In at least one embodiment, the pipe cutter may be connected to the power as follows:

1. Turn the cabinet lock switch on the control panel to the OFF position.
2. Connect the control cabinet to electrical power. See FIG. 21.
3. Connect the power output cables from the control cabinet to the motors on the cutting device. (The cables may have different connectors and may not be interchangeable).
4. Position the control cabinet at a convenient location for operating the machine. Note that the power cables may wrap around the pipe during the cutting operation. Make sure the cabinet is close enough to the pipe to provide enough slack in the cables.

In at least one embodiment, the cutting head may be aligned as follows:

1. The user may turn the radial hand wheel to position the tool head. For an O.D. cut, move the tool head all the way past the O.D. of the pipe. For an I.D. cut, move the tool head all the way inside the I.D. of the pipe. See FIG. 23.
2. The user may turn the axial hand wheel to position the cutting head so that the cutter will contact the pipe at the required position for the profile being cut. The radial wheel may be used to move the cutting head close to the pipe to align the cutter. If an O.D. cut is being made, mount the clamp far enough back on the pipe so the tool head doesn't contact the clamp. See FIG. 24.
3. The user may move the stop collars on the axial feed screw to the ends of the screw and secure them. This inhibits the tool head from drifting during the cut. See FIG. 25.

In at least one embodiment, the end of the pipe may be machined as follows:

1. Engage and rotate the cutting head (also referred to as a spindle). In some embodiments, the spindle speed is pre-set, while in other embodiment the spindle speed is adjustable.
2. Turn the radial hand wheel to advance the cutting tool into the pipe surface. The tool will cut the pipe as the cutting tool is fed into the pipe. Feed the tool to the required depth. See FIG. 26.
3. Move the stop collars on the radial feed screw to the ends of the screw and secure them. This prevents the tool head from drifting during the cut.
4. Engage the travel drive and begin moving the cutting device along the clamp. In some embodiments the travel drive speed is preset, while in other embodiments it is adjustable.
5. When stopping the spindle, is may be advantageous to stop the movement of the cutting device before stopping the spindle. Operating the feed without spindle rotation can damage the pipe and/or the tool head. Some embodiments include an emergency stop that simultaneously stops cutting device movement and cutting head (spindle) rotation.
6. The cutting device is typically operated through a full rotation to fully form the shape. Overlapping the starting position can help ensure the proper shape is complete.
7. The user may then loosen the radial feed stop collars and use the radial feed wheel to retract the tool head from the surface of the pipe.

8. The user may then loosen the axial feed stop collars and use the axial hand wheel to retract the tool head from the pipe end.

9. If there is a need to perform another operation on the same pipe (for instance, both an O.D. and an I.D. prep), install the new tooling and set up the new position as described earlier.

In at least one embodiment, the pipe cutter may be removed from the pipe as follows:

1. Remove the tool head from the spindle. It may be important to ensure the machine is securely supported before loosening the chain tension screw—the machine could shift on the pipe or fall off, causing serious injury or death.

2. Attach a lifting device (e.g., winch) to the lifting rings on the cutting device frame. Raise the lift to support the weight of the cutting device.

3. Turn the belt tension screw to loosen it until the belt is loose on the clamping/tracking ring.

4. Remove the fasteners (e.g., 4 screws) holding the drive carriage guard in place and remove the guard.

5. Locate the chain link pin and remove it to disconnect the chain. Thread the chain back out of the drive carriage.

6. Lift the cutting device off the pipe and move it to its storage location.

7. Loosen the swing latch bolts on the clamping/tracking ring. Swing the latches out to release the ring.

8. Attach a lifting device to the clamping/tracking ring and lift the clamping/tracking ring off the pipe. Move the ring to its storage location and re-attach the swing latch bolts to hold it together.

Reference systems that may be used herein can refer generally to various directions (e.g., upper, lower, forward and rearward), which are merely offered to assist the reader in understanding the various embodiments of the disclosure and are not to be interpreted as limiting. Other reference systems may be used to describe various embodiments, such as referring to the direction of projectile movement as it exits the firearm as being up, down, rearward or any other direction.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Features of one embodiment may be used in combination with features of other embodiments as would be understood by one of ordinary skill in the art, whether or not explicitly described as such. One or more exemplary embodiments have been shown and described, and all changes and modifications that come within the spirit of the disclosure are desired to be protected.

What is claimed is:

1. A method, comprising:
   milling the end of a plastic pipe to form one half of a coupling that permits the two halves of the coupling to slide against one another and snap together to form a rigid coupling, wherein said milling includes
   attaching a clamp to the plastic pipe,
   attaching a milling tool to the clamp,
   contacting the pipe with the milling tool,
   moving the milling tool around the clamp, and
   forming a multi-channeled surface on the end of the plastic pipe during said moving, the multi-channeled surface including at least two channels of different depth, the shallower channel adjoining the end of the plastic pipe.

2. The method of claim 1, comprising:
   attaching a belt around the outer surface of the clamp,
   attaching the belt to the milling tool,
   adjusting the radial position of the milling tool with respect to the pipe while the milling tool is attached to the pipe,
   adjusting the axial position of the milling tool with respect to the pipe while the milling tool is attached to the pipe, and
   rotating the pipe during said moving.

3. The method of claim 1, comprising:
   adjusting the radial position of the milling tool with respect to the pipe after said attaching a clamp and after said attaching a milling tool.

4. The method of claim 1, comprising:
   adjusting the axial position of the milling tool with respect to the pipe after said attaching a clamp and after said attaching a milling tool.

5. The method of claim 1, comprising:
   rotating the pipe during said moving.

6. The method of claim 1, comprising:
   attaching a belt around the outer surface of the clamp, and attaching the belt to the milling tool.

7. The method of claim 1, comprising:
   milling the end of a second plastic pipe to form the other half of a coupling that permits the two pipe ends to slide against one another and snap together to form a rigid coupling, wherein said milling the end of a second plastic pipe includes
   attaching the clamp to the second plastic pipe,
   attaching a second milling tool to the clamp,
   contacting the second pipe with the second milling tool,
   moving the second milling tool around the clamp, and
   forming a multi-channeled surface on the end of the second plastic pipe during said moving the second milling tool.

8. The method of claim 7, comprising:
   sliding the multi-channeled pipe ends against one another, and
   snapping the two pipes together.

9. The method of claim 1, wherein said forming of the at least two channels occurs simultaneously.

10. The method of claim 1, wherein the deeper channel adjoins the shallower channel.

11. The method of claim 1, wherein:
    the milling tool is adjustable to selectively mill the outer surface or the inner surface of the plastic pipe while the milling tool is attached to the clamp,
    said contacting includes selectively contacting the outer surface or the inner surface of the pipe with the milling tool, and
    said forming includes forming a multi-channeled surface on the selected surface of the plastic pipe and adjacent the end of the plastic pipe during said moving.

* * * * *